US012003011B2

(12) United States Patent
Hollenbeck et al.

(10) Patent No.: US 12,003,011 B2
(45) Date of Patent: Jun. 4, 2024

(54) INTEGRATED TRACKING ANTENNA ARRAY

(71) Applicant: OPTISYS, Inc., West Jordan, UT (US)

(72) Inventors: Michael Hollenbeck, West Jordan, UT (US); Robert Smith, West Jordan, UT (US)

(73) Assignee: OPTISYS, Inc., West Jordan, UT (US)

( * ) Notice: Subject to any disclaimer, the term of this patent is extended or adjusted under 35 U.S.C. 154(b) by 15 days.

(21) Appl. No.: 17/810,763

(22) Filed: Jul. 5, 2022

(65) Prior Publication Data

US 2022/0416437 A1 Dec. 29, 2022

Related U.S. Application Data

(63) Continuation of application No. 17/069,202, filed on Oct. 13, 2020, now Pat. No. 11,381,006, which is a (Continued)

(51) Int. Cl.
*H01P 5/12* (2006.01)
*H01P 1/02* (2006.01)
(Continued)

(52) U.S. Cl.
CPC ................ *H01P 5/12* (2013.01); *H01P 1/025* (2013.01); *H01P 3/12* (2013.01); *H01P 5/16* (2013.01);
(Continued)

(58) Field of Classification Search
CPC ............ H01Q 1/02; H01Q 3/36; H01Q 13/02; H01Q 13/025; H01Q 15/242;
(Continued)

(56) References Cited

U.S. PATENT DOCUMENTS 4,467,294 A 8/1984 Janky et al.
4,473,828 A 9/1984 Morz et al.
(Continued)

FOREIGN PATENT DOCUMENTS

FR 3087954 A1 10/2018
WO 2017203568 A1 11/2017
(Continued)

OTHER PUBLICATIONS

Motomi Abe, et al., "Ka-Band Branch Line Coupler Applied Hexagonal Waveguide Suitable for Additive Manufacturing," IEICE Trans. Electron., vol. E101-C, No. 10, Oct. 2018, pp. 805-814, The Institute of Electronics, Information and Communication Engineers.
(Continued)

*Primary Examiner* — Hoang V Nguyen
(74) *Attorney, Agent, or Firm* — TechLaw Ventures, PLLC; Terrence J. Edwards

(57) ABSTRACT

A combiner network is provided. A combiner network may include a corporate combiner. The corporate combiner may include a first plurality of radiation elements. The corporate combiner may include a first H-plane combiner connected to the first plurality of radiation elements and connected by a U-bend to a first E-plane combiner. The corporate combiner may include a second H-plane combiner connected to the first E-plane combiner. The corporate combiner may further include a first port. A plurality of corporate combiners may be assembled together as a combiner network.

15 Claims, 39 Drawing Sheets

Related U.S. Application Data continuation of application No. 16/228,510, filed on Dec. 20, 2018, now Pat. No. 10,840,605.

(60) Provisional application No. 62/608,527, filed on Dec. 20, 2017.

(51) Int. Cl.

| | |
|---|---|
| ***H01P 3/12*** | (2006.01) |
| ***H01P 5/16*** | (2006.01) |
| ***H01Q 1/02*** | (2006.01) |
| ***H01Q 3/36*** | (2006.01) |
| ***H01Q 13/02*** | (2006.01) |
| ***H01Q 21/00*** | (2006.01) |
| ***H01Q 21/06*** | (2006.01) |

(52) U.S. Cl.

CPC ................. *H01Q 1/02* (2013.01); *H01Q 3/36* (2013.01); *H01Q 13/025* (2013.01); *H01Q 21/0025* (2013.01); *H01Q 21/0037* (2013.01); *H01Q 21/0087* (2013.01); *H01Q 21/064* (2013.01); *H01Q 21/068* (2013.01); *H01Q 13/02* (2013.01)

(58) Field of Classification Search

CPC ............. H01Q 21/0037; H01Q 21/064; H01Q 21/068; H01Q 21/08; H01P 1/025; H01P 3/12; H01P 5/12; H01P 5/16

See application file for complete search history.

(56) References Cited

U.S. PATENT DOCUMENTS

| | | | |
|---|---|---|---|
| 4,504,805 | A | 3/1985 | Ekelman, Jr. et al. |
| 4,743,915 | A | 5/1988 | Rammos et al. |
| 4,783,663 | A | 11/1988 | Rammos et al. |
| 4,952,894 | A | 8/1990 | Connerney et al. |
| 5,243,357 | A | 9/1993 | Koike et al. |
| 5,274,839 | A | 12/1993 | Kularajah et al. |
| 5,291,650 | A | 3/1994 | Carvalho et al. |
| 5,329,285 | A | 7/1994 | McCandless |
| 6,018,315 | A | 1/2000 | Ince et al. |
| 6,137,450 | A | 10/2000 | Bhattacharyya et al. |
| 6,198,730 | B1 | 3/2001 | Hogberg et al. |
| 6,201,508 | B1 | 3/2001 | Metzen et al. |
| 6,211,813 | B1 | 4/2001 | Dousset et al. |
| 6,297,774 | B1 | 10/2001 | Chung |
| 6,411,174 | B1 | 6/2002 | Crouch et al. |
| 6,501,434 | B1 | 12/2002 | Hollenstein et al. |
| 6,563,398 | B1 | 5/2003 | Wu |
| 6,839,029 | B2 | 1/2005 | Mendolia et al. |
| 7,564,421 | B1 | 7/2009 | Edwards et al. |
| 7,750,763 | B2 | 7/2010 | Praßmayer et al. |
| 8,537,068 | B2 | 9/2013 | Martin et al. |
| 8,988,294 | B2 | 3/2015 | Voss et al. |
| 9,112,255 | B1 | 8/2015 | Hollenbeck et al. |
| 9,142,872 | B1 | 9/2015 | Izadian |
| 9,253,925 | B1 | 2/2016 | Smith |
| 9,257,753 | B2 | 2/2016 | Milroy et al. |
| 9,343,795 | B1 | 5/2016 | Halligan et al. |
| 9,369,259 | B2 | 6/2016 | Mohamadi |
| 9,450,308 | B1 | 9/2016 | Lewis, Jr. |
| 9,537,212 | B2 | 1/2017 | Rosen et al. |
| 9,559,428 | B1 | 1/2017 | Jensen et al. |
| 9,728,862 | B2 | 8/2017 | Choi et al. |
| 9,742,069 | B1 | 8/2017 | Hollenbeck et al. |
| 9,859,597 | B2 | 1/2018 | Jensen et al. |
| 9,960,495 | B1 | 5/2018 | Hollenbeck et al. |
| 10,020,554 | B2 | 7/2018 | Parekh et al. |
| 10,170,833 | B1 | 1/2019 | Hollenbeck et al. |
| 10,181,645 | B1 | 1/2019 | Klein et al. |
| 10,468,773 | B2 | 11/2019 | Hollenbeck et al. |
| 10,481,253 | B1 | 11/2019 | Hollenbeck et al. |
| 10,680,341 | B1 | 6/2020 | Anderson et al. |
| 10,840,605 | B2 | 11/2020 | Hollenbeck et al. |
| 11,233,304 | B2 | 1/2022 | Hollenbeck et al. |
| 11,381,006 | B2 | 7/2022 | Hollenbeck et al. |
| 11,482,793 | B2 | 10/2022 | Hollenbeck et al. |
| 2006/0226931 | A1 | 10/2006 | Tavassoli Hozouri |
| 2008/0018420 | A1 | 1/2008 | Prassmayer et al. |
| 2009/0206473 | A1 | 8/2009 | Lopez et al. |
| 2010/0141543 | A1 | 6/2010 | Parekh et al. |
| 2010/0188304 | A1 | 7/2010 | Clymer et al. |
| 2011/0267250 | A1 | 11/2011 | Seifried et al. |
| 2012/0062335 | A1 | 3/2012 | Sherrer et al. |
| 2013/0141186 | A1 | 6/2013 | Nguyen et al. |
| 2013/0154764 | A1 | 6/2013 | Runyon et al. |
| 2015/0123862 | A1 | 5/2015 | Milroy et al. |
| 2015/0123867 | A1 | 5/2015 | Legay et al. |
| 2015/0229460 | A1 | 8/2015 | Mohamadi |
| 2015/0340752 | A1 | 11/2015 | Nantista et al. |
| 2016/0036113 | A1 | 2/2016 | Wu et al. |
| 2016/0351984 | A1 | 12/2016 | Jensen et al. |
| 2017/0047661 | A1 | 2/2017 | Parekh et al. |
| 2017/0077610 | A1 | 3/2017 | Bongard et al. |
| 2017/0117637 | A1 | 4/2017 | Jensen et al. |
| 2017/0256864 | A1 | 9/2017 | Jensen et al. |
| 2017/0263991 | A1 | 9/2017 | Jensen et al. |
| 2017/0302003 | A1 | 10/2017 | Elsallal et al. |
| 2018/0219277 | A1 | 8/2018 | Hirata et al. |
| 2019/0089035 | A1 | 3/2019 | Takahashi |
| 2019/0089058 | A1 | 3/2019 | Klein et al. |
| 2019/0190111 | A1 | 6/2019 | Hollenbeck et al. |
| 2019/0190161 | A1 | 6/2019 | Hollenbeck et al. |
| 2020/0127358 | A1 | 4/2020 | de Rijk et al. |
| 2020/0161738 | A1 | 5/2020 | de Rijk et al. |

FOREIGN PATENT DOCUMENTS

| | | | |
|---|---|---|---|
| WO | 2019203902 | A2 | 10/2019 |
| WO | 2019203903 | A2 | 10/2019 |
| WO | 2019226201 | A2 | 11/2019 |

OTHER PUBLICATIONS

Motomi Abe, et al., "A 3-D Metal-Direct-Printed, Low-Cost, and Light Hexagonal Waveguide Ka-Band Branch Line Coupler," Proceedings of the 47th European Microwave Conference, Oct. 2017, pp. 188-191, EuMA, Nuremberg Germany.

Zhang Kai, et al., "A Novel Design of Circularly Polarized Waveguide Antenna," 2014 3rd Asia-Pacific Conference on Antennas and Propagation, 2014, pp. 130-133, IEEE, Harbin, China.

James P. Becker, et al., "Toward a Novel Planar Circuit Compatible Silicon Micromachined Waveguide," Electrical Engineering and Computer Science, The University of Michigan, 1999, pp. 221-224, IEEE, Ann Arbor, Michigan.

INTEGRATED TRACKING ANTENNA ARRAY

CROSS-REFERENCE TO RELATED APPLICATIONS

This application is a continuation of co-pending U.S. patent application Ser. No. 17/069,202, filed Oct. 13, 2020 (now U.S. Pat. No. 11,381,006), entitled "INTEGRATED LINEARLY POLARIZED TRACKING ANTENNA ARRAY," which is a continuation of U.S. patent application Ser. No. 16/228,510, filed Dec. 20, 2018 (now U.S. Pat. No. 10,840,605), entitled "INTEGRATED LINEARLY POLARIZED TRACKING ANTENNA ARRAY," which claims the benefit under 35 U.S.C. § 119(e) of U.S. Provisional Patent Application No. 62/608,527 filed Dec. 20, 2017, entitled "INTEGRATED ANTENNA ASSEMBLY DESIGN PROCESS," which are incorporated herein by reference in their entirety, including but not limited to those portions that specifically appear hereinafter, the incorporation by reference being made with the following exception: In the event that any portion of the above-referenced applications are inconsistent with this application, this application supersedes said above-referenced applications.

TECHNICAL FIELD

The disclosure relates generally to systems, methods, and devices related to an antenna and its construction. An integrated tracking antenna array may be implemented with mechanical positioning elements, thermal dissipative elements, complex electromagnetic structures, structural strengthening features, and a variety of multi-physics features, all fabricated as a single integrated piece. Antennas and antenna arrays disclosed herein may be used in any implementation requiring the radiating or reception of an electromagnetic wave.

BACKGROUND

Antennas are ubiquitous in modern society and are becoming an increasingly important technology as smart devices multiply and wireless connectivity moves into exponentially more devices and platforms. An antenna structure designed for transmitting and receiving signals wirelessly between two points can be as simple as tuning a length of a wire to a known wavelength of a desired signal frequency. At a particular wavelength (which is inversely proportional to the frequency by the speed of light $\lambda=c/f$) for a particular length of wire, the wire will resonate in response to being exposed to the transmitted signal in a predictable manner that makes it possible to "read" or reconstruct a received signal. For simple devices, like radio and television, a wire antenna serves well enough.

Passive antenna structures are used in a variety of different applications. Communications is the most well-known application, and applies to areas such as radios, televisions, and internet. Radar is another common application for antennas, where the antenna, which can have a nearly equivalent passive radiating structure to a communications antenna, is used for sensing and detection. Common industries where radar antennas are employed include weather sensing, airport traffic control, naval vessel detection, and low earth orbit imaging. A wide variety of high performance applications exist for antennas that are less known outside the industry, such as electronic warfare and ISR (information, surveillance, and reconnaissance) to name a couple.

High performance antennas are required when high data rate, long range, or high signal to noise ratios are required for a particular application. In order to improve the performance of an antenna to meet a set of system requirements, for example on a satellite communications (SATCOM) antenna, it is desirable to reduce the sources of loss and increase the amount of energy that is directed in a specific area away from the antenna (referred to as 'gain'). In the most challenging applications, high performance must be accomplished while also surviving demanding environmental, shock, and vibration requirements. Losses in an antenna structure can be due to a variety of sources: material properties (losses in dielectrics, conductivity in metals), total path length a signal must travel in the passive structure (total loss is loss per length multiplied by the total length), multi-piece fabrication, antenna geometry, and others. These are all related to specific design and fabrication choices that an antenna designer must make when balancing size, weight, power, and cost performance metrics (SWaP-C). Gain of an antenna structure is a function of the area of the antenna and the frequency of operation. The only way to create a high gain antenna is to increase the total area with respect to the number of wavelengths, and poor choice of materials or fabrication method can rapidly reduce the achieved gain of the antenna by increasing the losses in the passive feed and radiating portions.

One of the lowest loss and highest performance RF structures is hollow metal waveguide. This is a structure that has a cross section of dielectric, air, or vacuum which is enclosed on the edges of the cross section by a conductive material, typically a metal like copper or aluminum. Typical cross sections for hollow metal waveguide include rectangles, squares, and circles, which have been selected due to the ease of analysis and fabrication in the $19^{th}$ and $20^{th}$ centuries. Air-filled hollow metal waveguide antennas and RF structures are used in the most demanding applications, such as reflector antenna feeds and antenna arrays. Reflector feeds and antenna arrays have the benefit of providing a very large antenna with respect to wavelength, and thus a high gain performance with low losses.

Traditional fabrication methods for array antennas using hollow metal waveguide have either been limited in size or cost, due to the complexity of fabricating all of the intricate features necessary for high performance in the small footprint required by physics. Further complicating the fabrication are system requirements for thermal dissipation for higher power handling, high strength to survive the shock and vibration of launch, addition of mechanical mounting interfaces, and close proximity to additional electronics boxes containing circuit card assemblies (CCAs) that perform various required active functions for the antenna (such as tracking, data, command, and control).

Every physical component is designed with the limitations of the fabrication method used to create the component. Antennas and RF components are particularly sensitive to fabrication method, as the majority of the critical features are inside the part, and very small changes in the geometry can lead to significant changes in antenna performance. Due to the limitations of traditional fabrication processes, hollow metal waveguide antennas and RF components have been designed so that they can be assembled as multi-piece assemblies, with a variety of flanges, interfaces, and seams. All of these joints where the structure is assembled together in a multi-piece fashion increase the size, weight, and part count of a final assembly while at the same time reducing performance through increased losses, path length, and reflections. This overall trend of increased size, weight, and part count with increased complexity of the structure have kept hollow metal waveguide arrays in the realm of applications where size, weight, and cost are less important than overall performance.

Satellites in particular are an area where the large sizes and weights of traditional antenna arrays fabricated with hollow metal waveguide structures are a challenge. There is finite volume and weight that can be allocated for an antenna on a satellite, but due to the long range and additional high performance requirements of a satellite the antenna performance becomes a limiting factor in overall satellite performance. Hollow metal waveguide structures on satellites have been used almost exclusively on large satellites, such as geosynchronous earth orbit (GEO) satellites, given the massive size, weight, and budgets allocated to these structures. In recent years the number of small satellites being launched has seen an exponential growth, and antenna performance on these satellites is a limiting factor due to SWaP constraints.

Currently, there is a significant financial cost associated with putting objects into orbit around the earth. For example, recent data in 2018 indicates that the financial cost of putting a satellite into orbit around the earth is on the order of approximately $15,000 per pound. Given that a weight of a digital communication satellite may be ponderous, a single satellite may cost anywhere between $10 million and $400 million dollars to be put in orbit around the earth making the financial viability of a particular satellite somewhat questionable. Thus, cost per pound of satellites is a compelling motivator to reduce physical size, to the extent allowed by physics, and weight of every component of a satellite, including antennas. Even in other applications, such as communicating with aircraft, ship to ship, unmanned aircraft drones, and other communication applications, it is similarly advantageous to reduce physical size and weight of an antenna.

It is therefore one object of this disclosure to provide an antenna of substantially reduced size and weight over conventional implementations. It is a further object of this disclosure to provide an antenna system which integrates multiple physical requirements, such as electromagnetic, structural, and thermal performance metrics, into a single integrated part. It is another object of this disclosure to provide a method of constructing an antenna using a three dimensional printing process in a manner that enables antennas that are consistent with the demands of physics in new shapes and sizes which reduce weight. It is another object of this disclosure to provide an array of antennas which may be integrated into a repositionable unit.

SUMMARY

A combiner network is provided. A combiner network may include a corporate combiner. The corporate combiner may include a first plurality of radiation elements. The corporate combiner may include a first H-plane combiner connected to the first plurality of radiation elements and connected by a U-bend to a first E-plane combiner. The corporate combiner may include a second H-plane combiner connected to the first E-plane combiner. The corporate combiner may further include a first port. A plurality of corporate combiners may be assembled together as a combiner network.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1A:
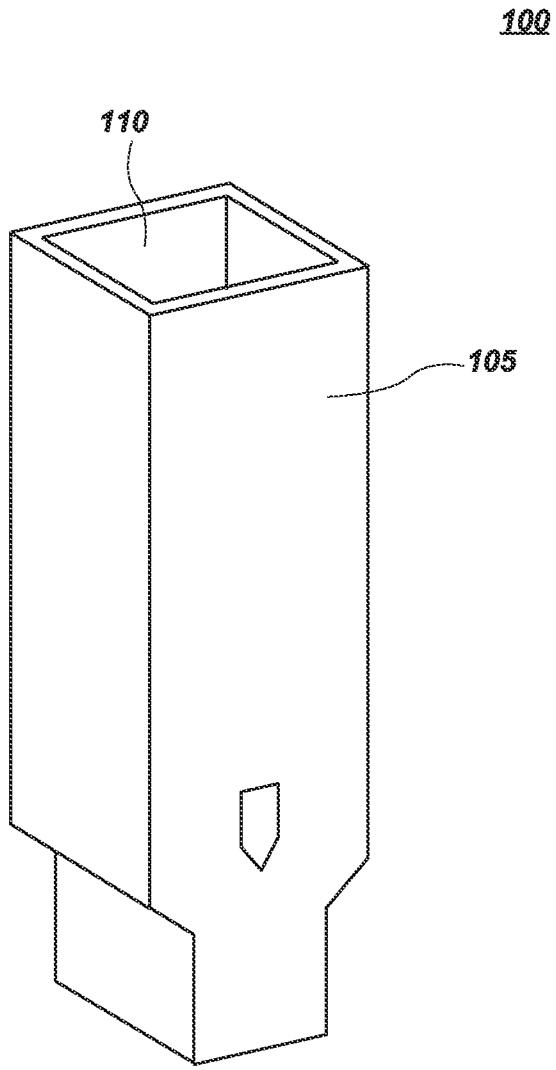
FIG. 1A illustrates a perspective view of a radiation element.

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Before the structure, systems, and methods for integrated marketing are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

It is also noted that many of the figures discussed herein show air volumes of various implementations of integrated portions of an antenna tracking array. In other words, these air volumes illustrate negative spaces of the components within an antenna tracking array which are created by a metal skin within the tracking array, as appropriate to implement the functionality described. It is to be understood that positive structures that create the negative space shown by the various air volumes are disclosed by the air volumes, the positive structures including a metal skin and being formed using the additive manufacturing techniques disclosed herein.

Referring now to the figures, FIG. 1A illustrates a perspective view of a radiating element 100. Radiating element 100 includes a body 105 which may be enveloped on all sides to create a void 110 within body 105 by a metal or metal composite. In one embodiment, body 105 may be a three dimensionally printed element that utilizes metallic substrate or that utilizes another substrate that bonds with metals as defined by the periodic table of elements (or other electrically conductive compositions), especially those metals which are known to have a high conductivity coefficient (e.g., copper, aluminum, gold etc.). In one embodiment, body 105, and other elements that will be described below, may be fabricated using a metal or metal alloy in an additive manufacturing process to produce a metal three dimensionally printed structure such that a minimum amount of metal is used to allow for the electrical, thermal, and mechanical requirements of the array which include receiving transmitted electromagnetic signals in the RF, microwave, and other signal bands.

Using virtually exactly the amount of metal required to create a surface area of body 105 reduces the amount of metal necessary to produce body 105 and, in this manner, reduces an overall weight of body 105. Exemplary processes used to form body 105 may include metal three dimensional printing using powder-bed fusion, selective laser melting, stereo electrochemical deposition, and any other processes whereby metal structures are fabricated using a three dimensional printing process where the components of body 105 are assembled as a discrete element as part of an integrated antenna array. As will be further discussed below, body 105 may be integrated into an assembly with other components by these three dimensional printing processes and formed together with the other components through the printing process in a manner that does not require a separate joining process of the various components. In other words, the components, which will be discussed below, may be formed together with body 105 as a single element with a plurality of indivisible constituent parts.

Figure 1B:
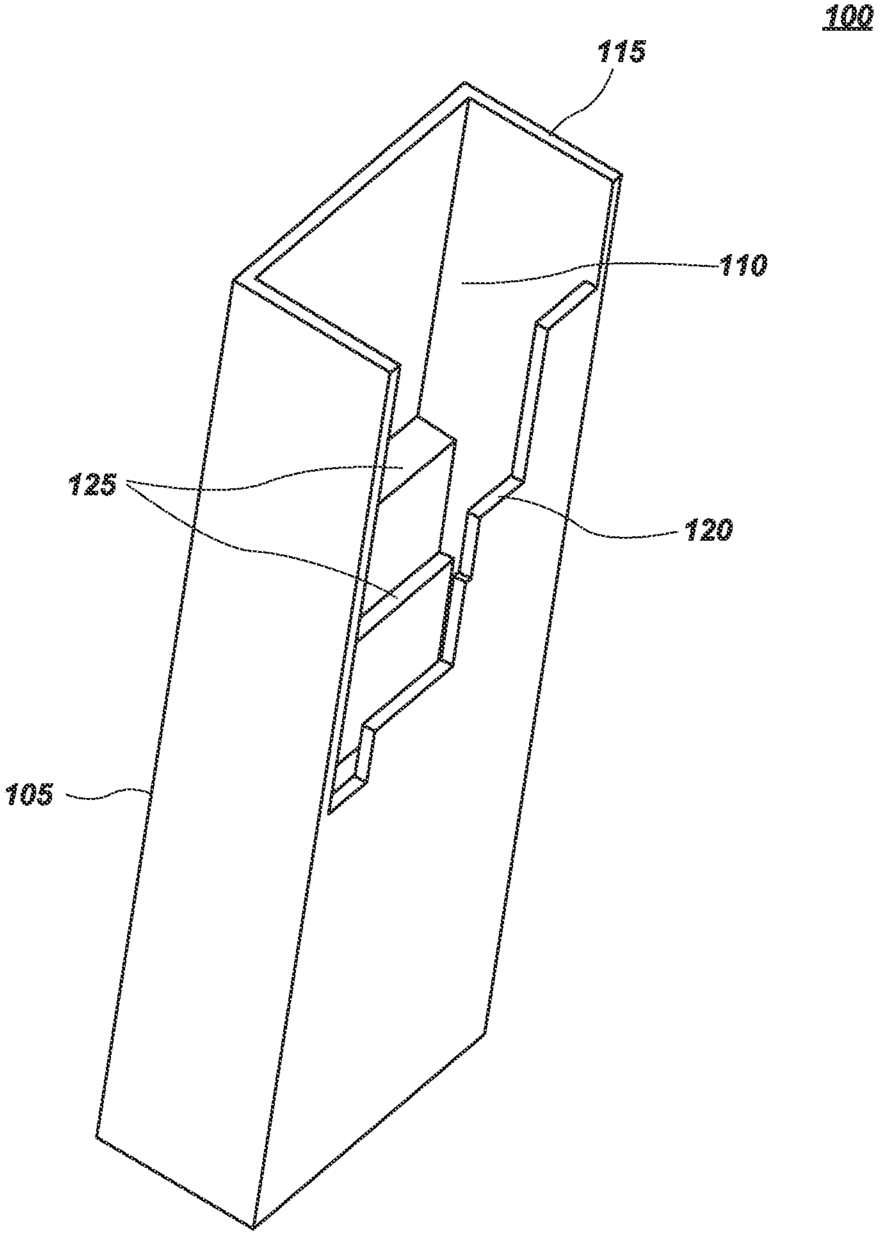
FIG. 1B illustrates perspective view of a cross section of the radiation element shown in FIG. 1A.

FIG. 1B illustrates a perspective view of a cross section of radiating element 100, shown in FIG. 1A. As before, radiating element 100 includes a body 105 that encloses a void 110 (only half of void 110 is shown in FIG. 1B because FIG. 1B is a cross sectional view).

Radiating element 100 includes a horn 115 which may be divided into two equal portions, referred to as waveguides, by a septum polarizer 120. Horn 115 may be the interface between an antenna array and the surrounding environment. Septum polarizer 120 converts a TE10 waveguide mode into equal amplitude and 90° phase shifted TE10 and TE01 modes at horn 115. Waveguide modes are essentially specified electric field orientations that carry various parts of a signal into radiating element 100, where the modes are discrete in quantity. The various waveguide modes which define the allowable ways a signal can propagate in a waveguide structure are designated as either TE, TM, or TEM based on the orientation of the electric and magnetic field with respect to the direction of propagation. In the majority of hollow metal waveguide structures the fundamental mode is used for propagation of energy, denoted as TE10 for rectangular waveguide, TE10 and TE01 for square waveguide, and TE11 for circular waveguide. The fundamental mode is the waveguide mode whose propagation starts at the lowest frequency supported by the waveguide. More simply, a waveguide mode refers to specific orientations of the signal that may be generated or received by radiating element 100. Septum polarizer 120 bisects the square waveguide geometry of radiating element 100 at horn 115.

Radiating element 100 may further include one or more impedance steps 125 which serve to match an impedance within radiating element 100. Impedance steps 125 provide an impedance transition based on a height of body 105, which will be discussed in more detail below. However, a number of impedance steps 125 implemented in radiating element 100 may be adjusted and varied based on the impedance of the surrounding environment for radiating element 100. For example, radiating element 100 may include 4 impedance steps 125 or as few as 2 impedance steps 125, although any number of impedance steps may be provided in radiating element 100 depending on desired bandwidth performance. Impedance steps 125 minimize reflections of the electromagnetic wave such that a majority of energy propagates into radiating element 100. Impedance steps 125 may be implemented at a height along radiating element 100 that is equal to a height of septum polarizer 120 or may be lower along a height of radiating element 100.

Horn 115 may be matched to space, air, a vacuum, water, or any other dielectric for the purpose of radiating a right handed circularly polarized ("RHCP") or left handed circularly polarized electromagnetic wave ("LHCP"). Septum polarizer 120 converts a TE10 waveguide mode into a circularly polarized wave at horn 115. A circularly polarized wave is generated with two orthogonal modes, which in the case of a square radiating element, such as radiating element 100, would be identified as the TE10 and TE01 mode. The TE10 and TE01 waveguide mode have an equal amplitude at horn 115 but are offset in phase by approximately 90° to form a circular polarization. Any offset from 90° causes the polarization to be elliptical to the degree of the offset and causes degradation of the signal, which is typical of any real structure. It is assumed that a signal which is elliptical (e.g, slightly offset from 90°, slightly unequal power split, or both) but majority RHCP will be referred to as RHCP. Similarly, a signal which is elliptical (e.g., slightly offset from 90°, slightly unequal power split, or both) but majority LHCP will be referred to as LHCP.

Figure 1C:
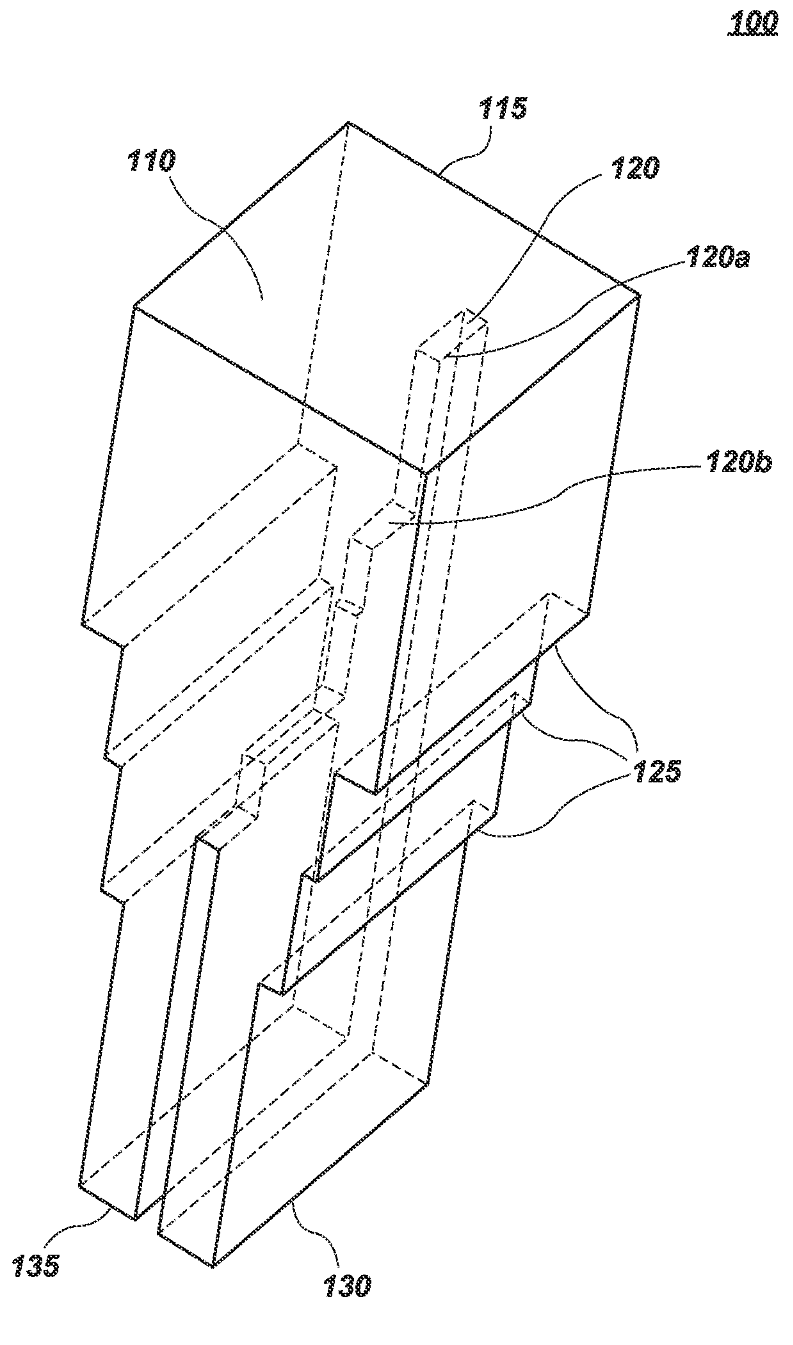
FIG. 1C illustrates a perspective view of an air volume corresponding to the radiation element shown in FIG. 1A.

FIG. 1C illustrates a perspective view of an air volume corresponding to the radiating element 100 shown in FIG. 1A. As previously discussed, radiating element 100 includes a body 105, a void 110, a horn 115, a septum polarizer 120, and impedance steps 125. FIG. 1C further illustrates a first waveguide port 130 and a second waveguide port 135 which support an LHCP and RHCP polarization, respectively. Septum polarizer converts the TE10 waveguide into equal amplitude and 90° phase shifted TE10 and TE01 waveguide modes at horn 115. It should be noted that "equal amplitude" and 90° phase is the ideal but rarely experienced in real world applications. Thus, the term "equal amplitude" or "equal" as used herein means substantially equal or that an amplitude of the TE10 waveguide mode is within 3 dB of an amplitude of the TE01 waveguide mode. Further, 90° means substantially 90° or within a range of plus or minus 15°. Impedance steps 125 match the impedance transition from waveguide ports, such as first waveguide port 130 and second waveguide port 135. Horn 115 may be matched to space, air, a vacuum, or another dielectric for the purpose of radiating an RHCP or LHCP electromagnetic wave.

First waveguide port 130 may be implemented as a "reduced height waveguide," meaning that the short axis of waveguide port 130 is less than one half of the length of the long axis of waveguide port 130. The purpose of a reduced height waveguide is to allow for a single combining layer by spacing waveguides closely enough to have multiple waveguide runs side-by-side (as will be discussed below). A length of the long axis of waveguide port 130 determines its frequency performance of the fundamental mode (TE10, for example), while a height of waveguide port 130 may be adjusted lower or higher to either make waveguide port 130 more compact and experience a higher loss or less compact and experience a lower loss. Typical values for waveguide height when propagating the fundamental (lowest order) mode is that the short axis is less than half the length of the long axis of waveguide port 130. A signal entering first waveguide port 130 may be converted into an electromagnetic wave that rotates with left-handedness at horn 115. Second waveguide port 135 may be oppositely, but similarly, implemented to produce an electromagnetic wave that rotates with right-handedness at horn 115.

More simply, a signal entering first waveguide port 130 is converted by various steps (120*a*, 120*b*) into a circularly polarized wave at horn 115. This is accomplished by impedance matching steps 125 and the septum polarizer steps 120*a*, 120*b*, that convert a unidirectional electric field at first waveguide port 130 into a rotating LHCP wave at horn 115. Although septum polarizer steps 120*a* and 120*b* are identified, a septum polarizer 120 may be implemented with any number of steps to meet specific application requirements. Horn 115 may be opened to free space, vacuum, air, water, or any dielectric for the purpose of radiating the electromagnetic wave. Similarly, a signal entering at second waveguide port 135 may be converted into a rotating RHCP wave at horn 115.

Figure 2A:
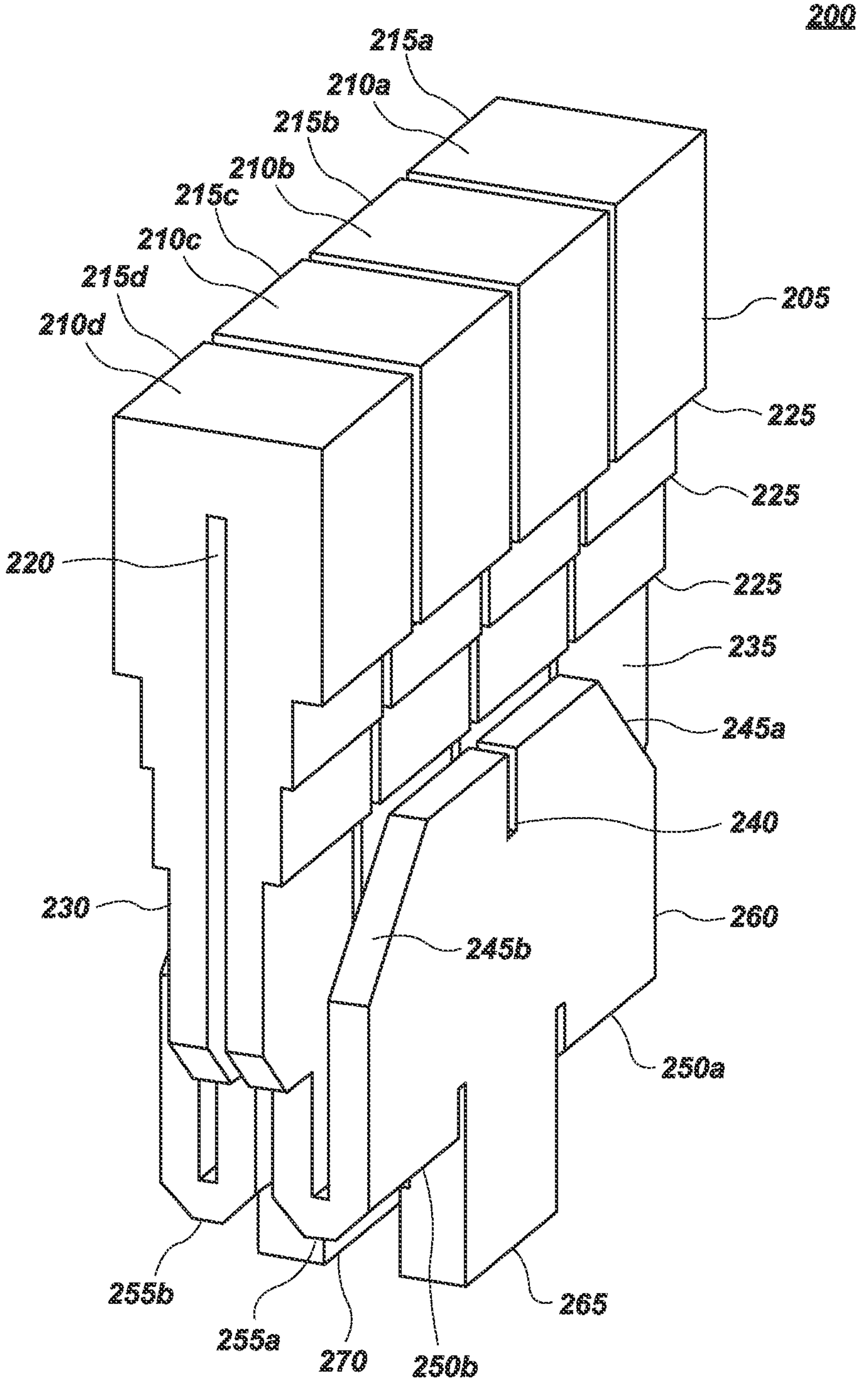
FIG. 2A illustrates a perspective view of an embodiment of an air volume of a 1×4 radiant element array.

FIG. 2A illustrates a perspective view of an embodiment of an air volume of a 1×4 radiating element array 200.

Radiating element array 200, as discussed above, is illustrated as an air volume created by negative space inside an antenna array. However, a positive structure implements the negative space shown as radiating element array 200 inside the antenna array. Illustrating the air volume of radiating element array 200 is merely for simplifying the explanation of the embodiments herein and convenience of description. Radiating element array 200 may be created, in part, using four of radiating element 100, shown in FIG. 1A to provide both RHCP and LHCP polarizations. Radiating element array 200 includes a body 205 which may be implemented in a manner similar to that of body 105, shown in FIG. 1A and discussed above, which forms four radiating element horns 215*a*, 215*b*, 215*c*, and 215*d* with corresponding voids 210*a*, 201*b*, 210*c*, and 210*d*. Radiating element array 200 may include a septum polarizer 220 in each of voids 210*a*-210*d* of horns 215*a*-215*d* which are similar in implementation and description to septum polarizer 120, shown in FIGS. 1A-1C and discussed above. Radiating element array 200 may further include impedance matching steps 225, which are also similar in implementation and description to impedance matching steps 225, shown in FIGS. 1A-1C and discussed above.

As shown in FIG. 2A, radiating element array 200 may further include a single mode rectangular waveguide 230 associated with an LHCP polarization and a single mode rectangular waveguide 235 associated with an RHCP polarization. Single mode rectangular waveguide 230 and single mode rectangular waveguide 235 may be similar in implementation and description to first waveguide port 130 and second waveguide port 135, respectively, as shown in FIGS. 1A-1C and discussed above. As shown in FIG. 2A, single mode rectangular waveguides 230 and 235 may also be implemented as a "reduced height" waveguide. Single mode rectangular waveguide 230 and 235 act as waveguide ports from radiating element horns 215*a*-215*d* and serve to combine signals (as will be discussed below) into two waveguide outputs that are provided through a U-bend 255*a* and 255*b*, respectively. U-bend 255*a* and 255*b* may be implemented in a manner that transitions a direction of the waveguide by 180 degrees, either vertically, as shown, or horizontally, as will be discussed below and splits power provided into combiner 260*a* in a symmetric manner. U-Bend 255*a* and 255*b* also provides a transition waveguide that provides a signal to (or carries a signal from) combiner 260*a*.

Combiner 260*a* may essentially act as a connector which connects a signal from horns 215*a*-215*d* into a single LHCP output 270 and a single RHCP output 265. Combiner 260*a* may be implemented with a septum which assists in the power combining or splitting of combiner 260*a*. Combiner 260*a* implements a chamfer 245*a* and a chamfer 245*b* which provides an impedance transition to combiner 260*a* for reduced height waveguides 250*a* and 250*b* such that energy in array 200 is combined into a single RHCP output 265. Combiner 260*a* may also be referred to as an H-plane "shortwall" combiner or H-plane "shortwall" connector. The "H-plane" is an electromagnetic field that relates a direction of a signal to the corresponding magnetic field of the signal. An "H-plane" "shortwall" combiner is a combiner that combines electromagnetic signals in the H-plane of a waveguide cavity, which is the short wall of the structure. Reduced height waveguides 250*a* and 250*b* combine two antenna elements into RHCP output port 265. In this manner, energy from radiating element horns 215*a*-215*d* are provided to a single output at RHCP output port 265. Since transmission and reception are equivalent in terms of discussion, energy entering antenna array 800 or being radiated from antenna array 800, are combined at RHCP port 265 to a substantially equal split in amplitude and phase to radiating element horns 215*a*-215*d*. While, due to perspective, LHCP output 270 may be similarly implemented with corresponding parts which will be discussed in FIG. 2B.

Figure 2B:
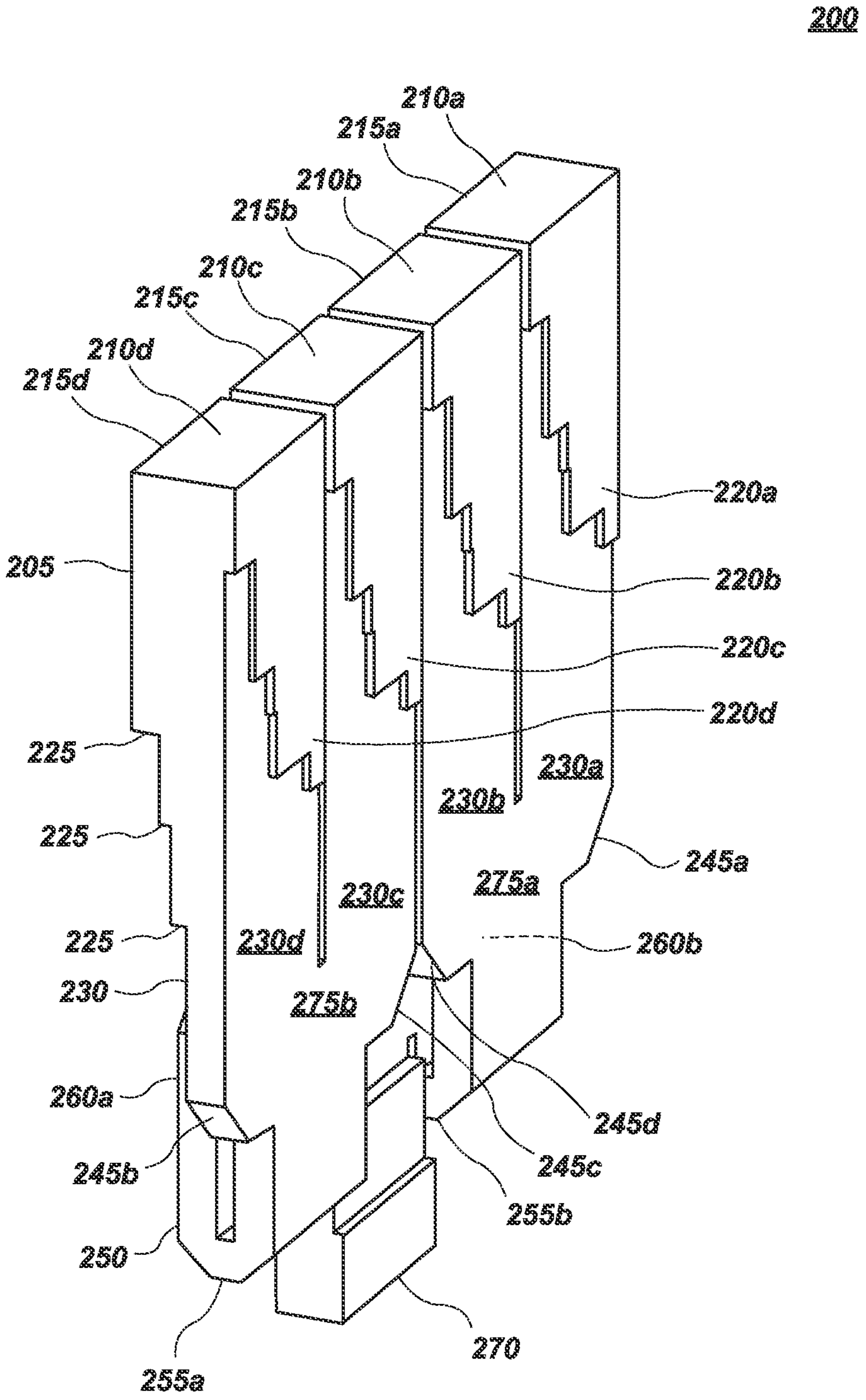
FIG. 2B illustrates a perspective view of a cross section of the embodiment of an air volume of a 1×4 radiant element array shown in FIG. 2A.

FIG. 2B illustrates a perspective view of a cross section of the embodiment of an air volume of a 1×4 radiating element array shown in FIG. 2A. As shown in FIG. 2B, radiating element array 200 is illustrated as a cross section provided for LHCP polarization. Further, as previously discussed with respect to FIG. 2A, radiating element array 200 includes a body 205 which may be implemented in a manner similar to that of body 105, shown in FIG. 1A and discussed above, which forms four radiating element horns 215*a*, 215*b*, 215*c*, and 215*d* with corresponding voids 210*a*, 201*b*, 210*c*, and 210*d*. Radiating element array 200 may include a septum polarizer 220*a*, 220*b*, 220*c*, and 220*d* in each of voids 210*a*-210*d* of horns 215*a*-215*d* which are similar in implementation and description to septum polarizer 120, shown in FIGS. 1A-1C and discussed above. Radiating element array 200 may further include impedance matching steps 225, which are also similar in implementation and description to impedance matching steps 225, shown in FIGS. 1A-1C and discussed above.

Radiating element array 200 further includes a single mode waveguide 230, as discussed above. However, as shown in FIG. 2B, single mode waveguide 230 is provided as four individual reduced height waveguides 230*a*, 230*b*, 230*c*, and 230*d*, which act as a transition element for each of radiating element horns 215*a*-215*d*, respectively. Radiating element array 200 further includes a septum 240, which due to perspective, is not illustrated in FIG. 2B. Each of waveguides 235*a*-235*d* are provided with a chamfer 245*a*-245*d*, as shown in FIG. 2B, which are provided to assist in power combining or splitting for an H-plane combiner stage 275*a* and an H-plane combiner stage 275*b*. Signals provided through H-plane combiner stages 275*a* may be provided to U-bend 255*a* and 255*b* into reduced height waveguide (not shown due to perspective) into combiner 260*b*. Similarly, signals provided through H-plane combiner stages 275*b* may be provided to U-bend 255*a* into reduced height waveguide 250 into combiner 260*b*. In this manner, an LHCP signal may be provided to LHCP output 270.

Finally, with respect to FIGS. 2A and 2B, it is noted that the direction of "flow" for a signal has largely been described as receiving the signal at radiating element horns 215*a*-215*d* and outputting the signal at RHCP output 265 or LHCP output 270. However, it should be noted that radiating element array 200 may act as both a transmitting or receiving antenna such that the "flow" may be reversed to transmit a signal instead of receiving a signal, as described.

Figure 3A:
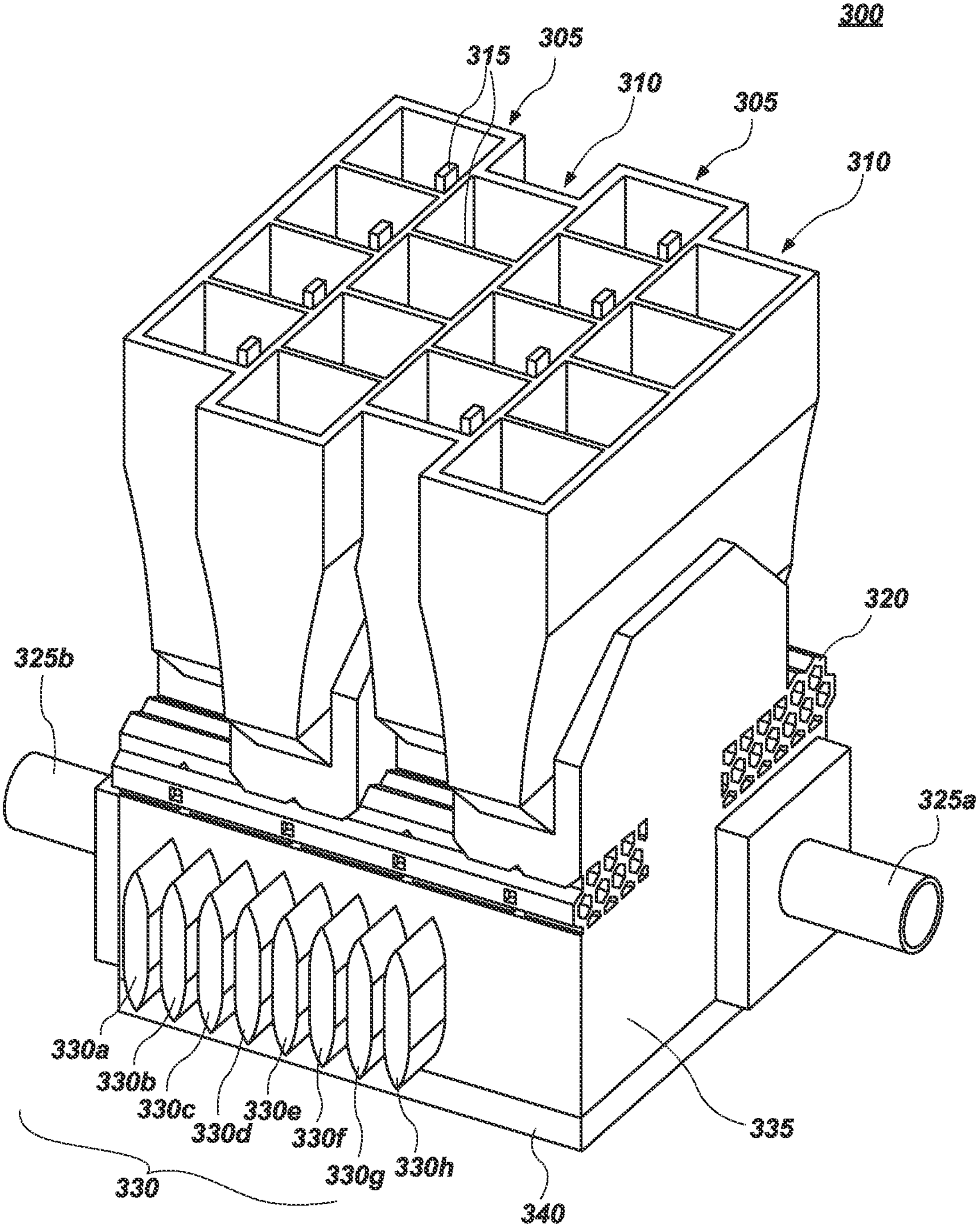
FIG. 3A illustrates a perspective view of one embodiment of an integrated antenna array.

FIG. 3A illustrates a perspective view of one embodiment of an integrated antenna array 300. Integrated antenna array 300 includes a plurality of radiating elements, 305/310, which as shown in FIG. 3, are implemented as offset radiating elements 305 and offset radiating elements 310. Integrated array 300, is formed using four of radiating element array 200, shown in FIG. 2A. Radiating elements 305/310 include a septum polarizer 315 which is similar in implementation and description to other septum polarizers described above. As shown, integrated antenna array 300 includes 16 radiating elements arranged in a 4 by 4 array of radiating elements (e.g., 4 of 4 element array columns). Integrated antenna array 300, therefore, provides 4 ports for RHCP and 4 ports for LHCP polarization, as will be further discussed below. In this configuration, integrated antenna array 300 may be used as a passively combined dual polarization array, or an actively combined dual-polarization single-axis phased array. Integrated antenna array 300 may include a structural lattice 320 that provides strength to the array while reducing weight by minimizing total metal material implemented in integrated antenna array 300. As shown in FIG. 3A, structural lattice 320 is implemented with a honeycomb shape, although other shapes and configurations are possible. For example, structural lattice 320 may be implemented as a mesh or may take on other shapes for the purpose of providing strength to the array while reducing a weight of integrated antenna array 300 to a point where integrated antenna array 300 is structurally rigid.

Integrated antenna array 300 may further provide connectors 325*a*/325*b* for receiving or transmitting a signal as an input or an output. As shown in FIG. 3, connector 325*a*, provides a connector for an RHCP signal while connector 325*b* provides a connector for an LHCP signal. Connectors 325*a*/325*b* may be implemented as coaxial connectors, BNC connectors, TNC connectors, N-type connectors, SMA connectors, SMP/GPO type connectors, or any appropriate size or other similar connectors known to ordinarily skilled artisans.

Integrated antenna array 300 may further provide a heat sink 330. Heat sink 330 is implemented as a plurality of heat sink fins 330*a*, 330*b*, 330*c*, 330*d*, 330*e*, 330*f*, 330*g*, and 330*h*. As shown in FIG. 3, heat sink 330 is implemented with 8 heat sink fins 330*a*-330*h*. However, a matching set of heat sink fins 330*a*-330*h* may be implemented on an opposite side of integrated antenna array 300. Further, any number of heat sink fins 330*a*-330*h* may be implemented on integrated antenna array 300 according to thermal dissipation requirements for integrated antenna array 300. A heat sink, or heat sink fins, may be placed on integrated antenna array in a location that corresponds to the area or areas of highest heat generation in integrated antenna array 300.

Integrated antenna array 300 may further include a circuit card chassis 335 which is integrated into integrated array 300. Circuit card chassis 335 provides a housing for a circuit card assembly that connects to connectors 325*a*/325*b* for transmitting or receiving a signal. The circuit card assembly may connect to connectors 325*a*/325*b* on an outside of circuit card chassis 335. Access to circuit card chassis 335 may be provided by a lid 340, which is fabricated as its own separate element. In this manner, a circuit card assembly may be inserted into circuit card chassis 335 and then sealed in by lid 340, with an appropriate sealant (gasket, liquid gasket, etc.), to protect the circuit card assembly from an external environment. A circuit card assembly may be used to provide, or receive, a signal to, or from, offset radiating elements 305 and offset radiating elements 310 by use of internal coaxial connectors, waveguide cavity transitions, or other techniques known to ordinarily skilled artisans.

It is to be noted that integrated antenna array 300, with the exception of lid 340, may be formed as a single piece which integrates each of the foregoing structures into a single element each of which are indivisible from each other. Formation of integrated antenna array 300 may be the result of an additive manufacturing process, such as those disclosed above particularly with respect to FIGS. 1A-1C, including one or more three dimensional printing techniques using powder-bed fusion, selective laser melting, stereo electrochemical deposition, and any other processes whereby metal structures are fabricated using a three dimensional printing process. Each element discussed with respect to FIGS. 3A and 3B, below, are individually and integrally formed to create integrated antenna array 300.

Figure 3B:
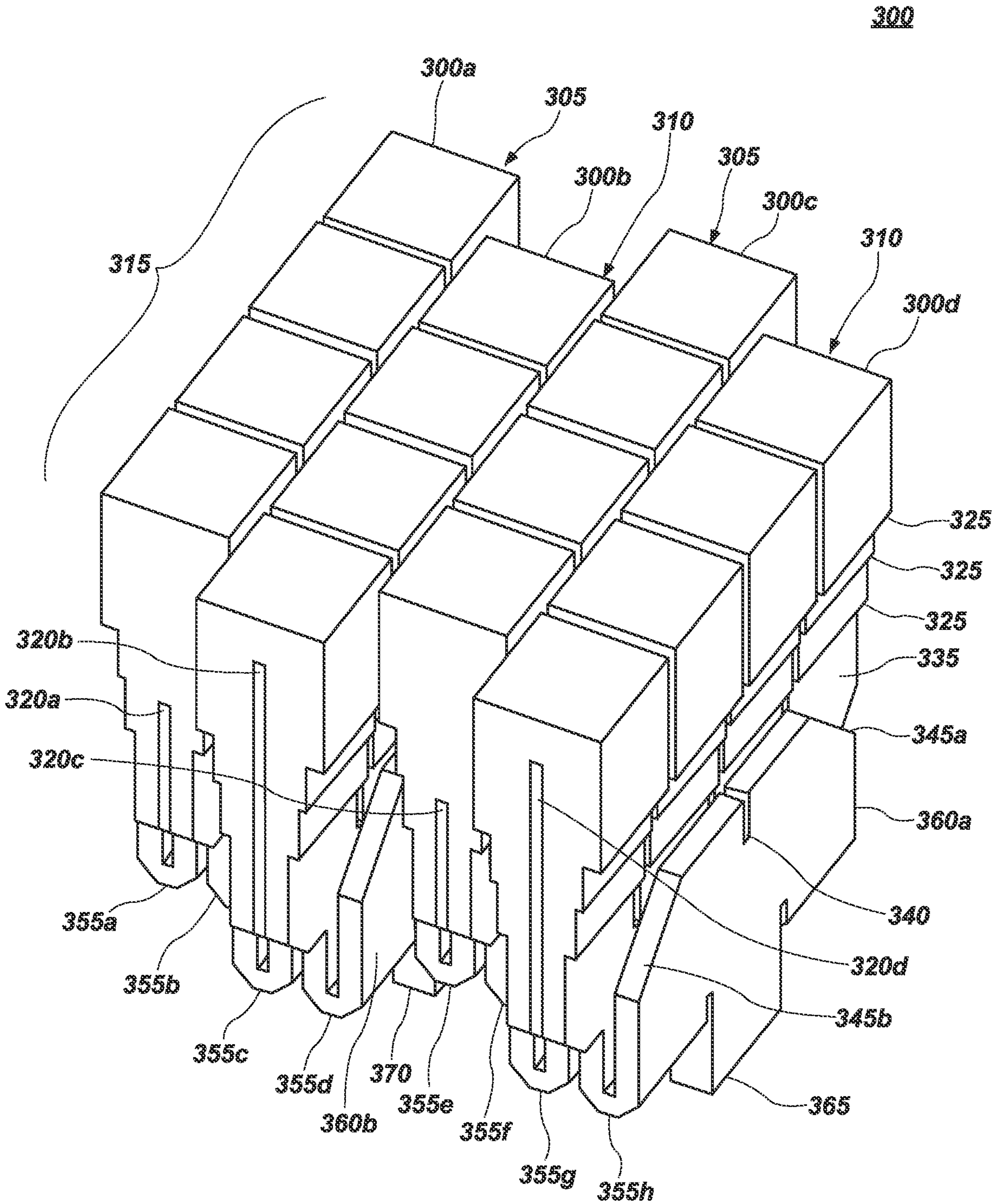
FIG. 3B illustrates an air volume corresponding to the integrated antenna array illustrated in FIG. 3A.

FIG. 3B illustrates an air volume corresponding to the integrated antenna array 300 illustrated in FIG. 3A. As shown in FIG. 3B, integrated antenna array 300 is implemented as four of radiating element array 200, shown in FIG. 2A, as radiating element column 300*a*, 300*b*, 300*c*, and 300*d* which are optionally offset (from zero up to half an element width) from each other to improve electronic scan performance and improved output port spacing. Accordingly, integrated antenna array 300 includes a plurality of radiating elements 305/310 which provide a plurality of radiating element horns 315 which are similar in implementation and description to radiating element horns 215*a*-215*d*, shown in FIG. 2A. Integrated antenna array 300 further includes septum polarizers 320*a*, 320*b*, 320*c*, and 320*d*, which are similar in implementation and description to septum polarizer 220, shown in FIG. 2A. Septum polarizers 320*a*-320*d* are optionally flipped between columns 300*a*-*d* (e.g., disposed on alternating sides of radiating element columns 300*a*-300*d* as shown in FIG. 3A) to provide a better performance match. Integrated array 300 includes a plurality of impedance steps 225 in each one of radiating element columns 300*a*-300*d* as shown and described above with respect to FIG. 2A. Further, a plurality of waveguides 335, which are similar in implementation and description to waveguides 230/235 shown in FIGS. 2A and 2B are provided. Each one of radiating element columns 300*a*-300*d* further include a septum 340, chamfers, such as 345*a* and 345*b*, and a combiners 360*a*, 360*b*, 360*c*, 360*d*. Further, each one of radiating element columns 300*a*-300*d* connect waveguides 335 to combiners 360*a*-360*d* by U-bends 355*a*, 355*b*, 355*c*, 355*d*, 355*e*, 355*f*, 355*g*, and 355*h*. Further, two ports, such as port 365 and 370 are provided with each one of radiating element columns 300*a*-300*d*, although not all are visible due to the perspective shown in FIG. 3B.

Accordingly, FIG. 3B illustrates an air volume of four radiating element columns 300*a*-300*d* connected together in a single piece integrated antenna array 300, which provides four ports for RHCP polarization and four ports for LHCP polarization in a manner that essentially combines four of radiating element array 200, shown in FIG. 2A into an integrated antenna array 300, shown in FIG. 3A.

Figure 4:
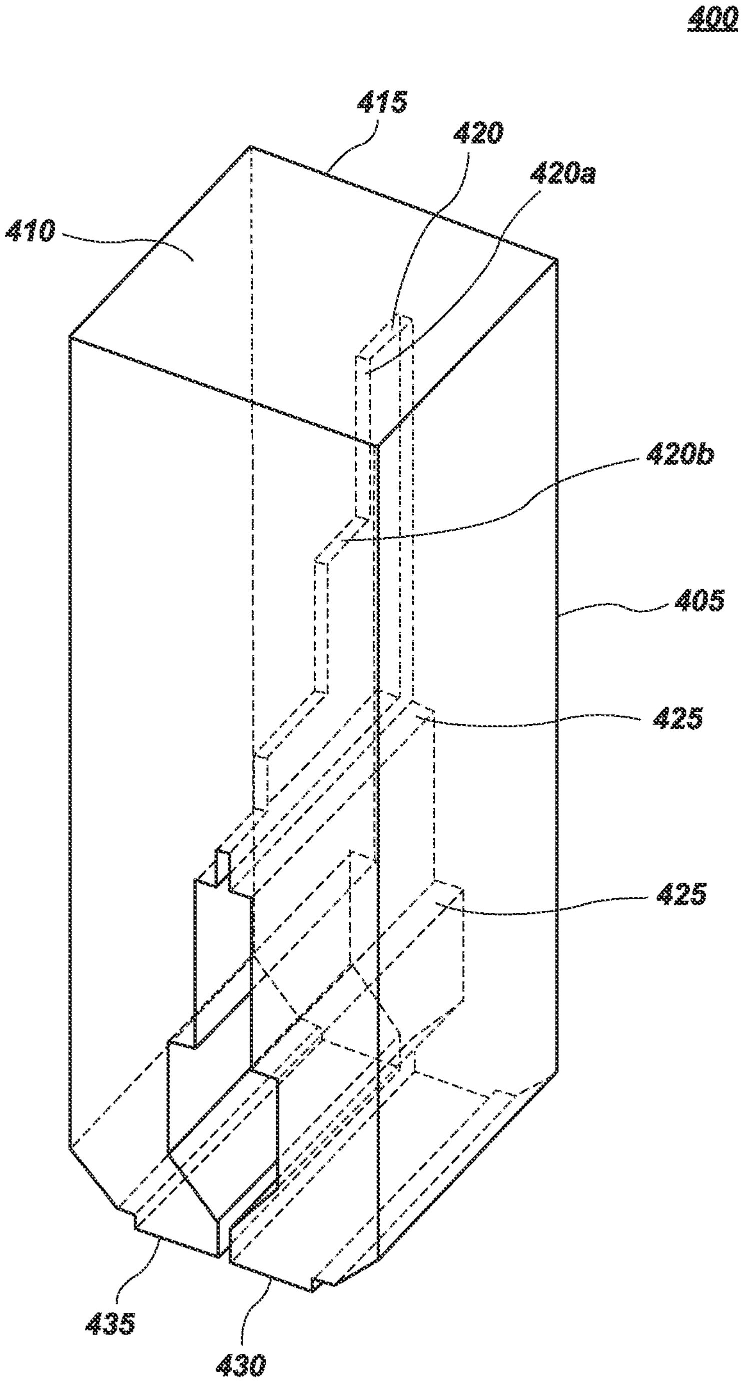
FIG. 4 illustrates a perspective view of an air volume corresponding to another embodiment of a radiation element.

FIG. 4 illustrates a perspective view of an air volume corresponding to another embodiment of a radiating element 400. Radiating element 400 is similar to radiating element 100, shown in FIG. 1C, in terms of air volume and corresponding physical structure. However, impedance steps 425 are disposed within void 410 of radiating element 400. For example, radiating element 400 includes a body 405, a void 410, a horn 415, a septum polarizer 420, which are all similar in implementation and description to the corresponding structures shown in FIG. 1C. Impedance steps 425 may be similar in description to impedance steps 125 shown in FIG. 1C, with the exception that impedance steps 425 are disposed within void 410 as part of septum polarizer 420, to provide alternative mechanisms for matching the impedance of radiating element 400 to septum polarizer 420. Horn 415 matches the impedance radiating element 400 to the surrounding environment. Radiating element 400 further includes a first waveguide port 430 and a second waveguide port 435 which support an LHCP and RHCP polarization, respectively. Septum polarizer 420 converts the TE10 waveguide into equal amplitude and 90° phase shifted TE10 and TE01 waveguide modes at horn 415. Impedance steps 425 match the impedance transition from waveguide ports, such as first waveguide port 430 and second waveguide port 435.

Horn 415 may be matched to space, air, a vacuum, or another dielectric for the purpose of radiating an RHCP or LHCP electromagnetic wave.

First waveguide port 430 may be implemented as a "reduced height waveguide," meaning that the short axis of waveguide port 430 is less than one half of the length of the long axis of waveguide port 430. The purpose of a reduced height waveguide is to allow for a single combining layer by spacing waveguides closely enough to have multiple waveguide runs side-by-side (as will be discussed below). A length of the long axis of waveguide port 430 determines its frequency performance of the fundamental mode (TE10, for example), while a height of waveguide port 430 may be adjusted lower or higher to either make waveguide port 430 more compact and experience a higher loss or less compact and experience a lower loss. Typical values for waveguide height when propagating the fundamental (lowest order) mode is that the short axis is equal to or less than half the length of the long axis of waveguide port 430. A signal entering first waveguide port 430 may be converted into an electromagnetic wave that rotates with left-handedness at horn 415. Second waveguide port 435 may be oppositely, but similarly, implemented to produce an electromagnetic wave that rotates with right-handedness at horn 415.

More simply, a signal entering first waveguide port 430 is converted by various steps (420*a*, 420*b*) into a circularly polarized wave at horn 415. This is accomplished by impedance matching steps 425 and the septum polarizer steps 420*a*, 420*b*, that convert a unidirectional electric field at first waveguide port 430 into a rotating LHCP wave at horn 415. Steps 420*a* and 420*b* are merely representative. Any number of septum polarizer steps may be implemented for any specific application. Horn 415 may be opened to free space, vacuum, air, water, or any dielectric for the purpose of radiating the electromagnetic wave. Similarly, a signal entering at second waveguide port 435 may be converted into a rotating RHCP wave at horn 415.

Figure 5:
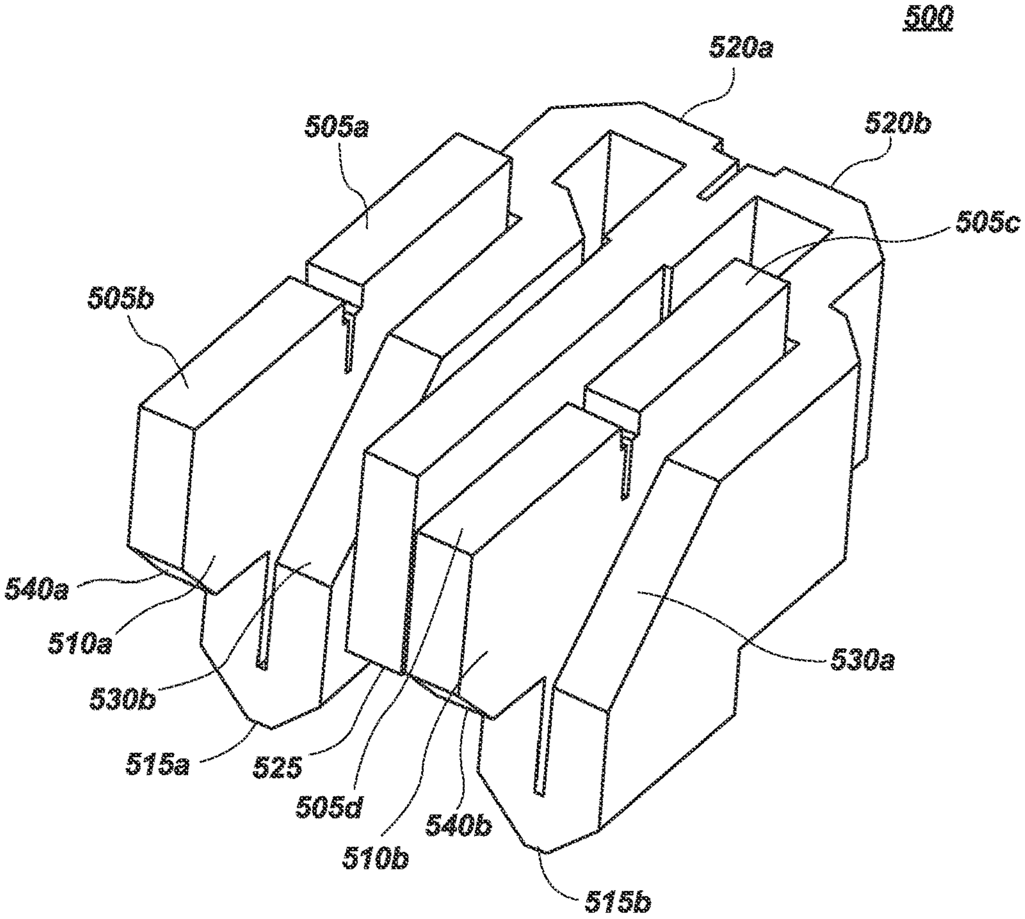
FIG. 5 illustrates a perspective view of an air volume corresponding to a 4 to 1 combiner.

FIG. 5 illustrates a perspective view of an air volume corresponding to a 4 to 1 combiner 500. Combiner 500 may also be referred to as a "quad combiner," or a "corporate feed." Combiner 500 includes four "reduced height" waveguide ports 505*a*, 505*b*, 505*c*, and 505*d*. In the embodiment of combiner 500, waveguide ports 505*a* and 505*b* are combined in an H-plane "shortwall" combiner stage 510*a*. Likewise, ports 505*c* and 505*d* are combined in an H-plane "shortwall" combiner stage 510*b*. H-plane "shortwall" combiner stages 510*a* and 510*b* combine an electromagnetic wave from rectangular waveguides 505*a*-505*d* into two output rectangular waveguides that flow into U-bends 515*a* and 515*b*, respectively. U-bends 515*a* and 515*b* are similar to other U-bends disclosed herein and provide a symmetric power split from combiner stages 510*a* and 510*b*. In this manner, an electromagnetic wave received at waveguide ports 505*a*-505*d* is propagated through U-bends 515*a* and 515*b*, as shown and into an E-plane "broadwall" combiner stage 520*a* or 520*b*. The E-plane is a plane that is orthogonal to the H-plane, and is a common term of art to refer to the long axis of the waveguide. E-plane "broadwall" combiner stage 520*a* receives an electromagnetic wave received at waveguide ports 505*a* and 505*b* while E-plane "broadwall" combiner stage 520*b* receives an electromagnetic wave received at waveguide ports 505*c* and 505*d*. E-plane "broadwall" combiner stage 520*a* and 520*b* flow together into a port 525 where an electromagnetic wave may be received into or output from combiner 500, depending on whether or not a signal is being received or transmitted from an antenna array associated with combiner 500.

Thus, combiner 500 may be implemented in a single layer. Four reduced height waveguide ports 505*a*-505*d*, are combined with two H-plane "shortwall" combiner stages 510*a* and 510*b* which transition through U-bends 515*a* and 515*b* into E-Plane "broadwall" combiner stages 520*a* and 520*b* to provide a combined signal at port 525. Alternatively, if the "flow" is reversed, an electromagnetic signal provided to port 525 may be split into four equal amplitude signals at waveguide ports 505*a*-505*d*. In one embodiment, a chamfer, such as chamfer 530*a* may be provided between U-bend 515*b* and E-plane "broadwall" combiner stage 520*b* to provide an impedance transition to allow the electromagnetic wave to match as it propagates around corners, bends, and combiner stages. Other chamfers, such as chamfers 540*a* and 540*b* may be installed in the combiner stages 510*a*, and 510*b*, for similar reasons.

Figure 6:
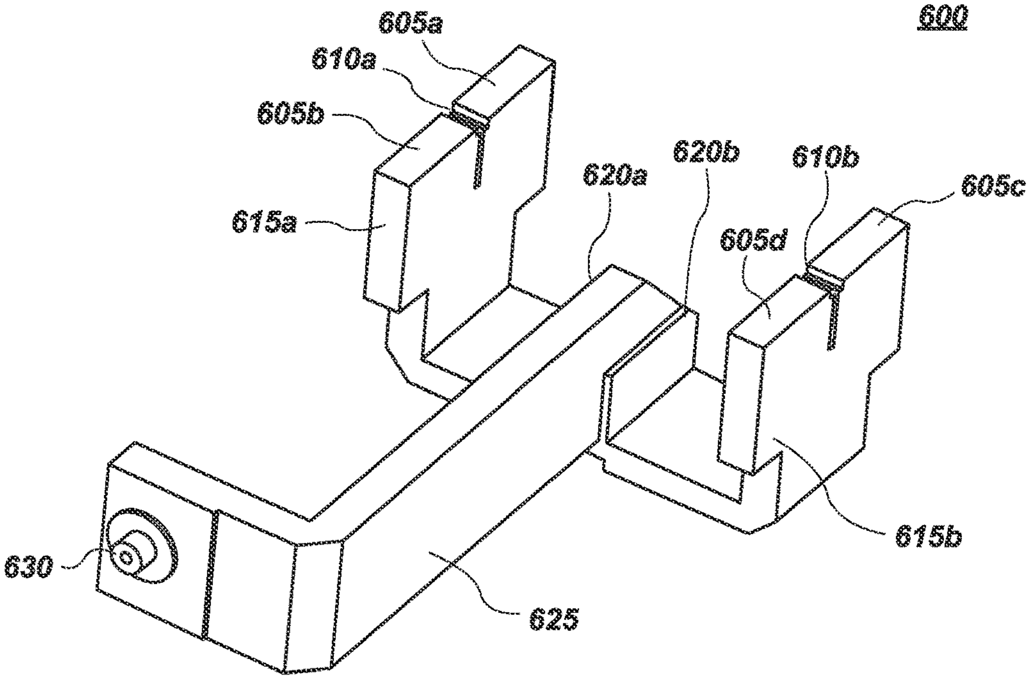
FIG. 6 illustrates a perspective view of another embodiment of an air volume corresponding to a 4 to 1 combiner.

FIG. 6 illustrates a perspective view of another embodiment of an air volume corresponding to a 4 to 1 combiner 600. Combiner 600 may also be referred to as a "quad combiner," a "connector" or a "corporate feed." Combiner 600 includes four "reduced height" waveguide ports 605*a*, 605*b*, 605*c*, and 605*d*. Waveguide ports 605*a* and 605*b* may be divided by a septum 610*a* which assists in combining/splitting for H-plane combiner stage 615*a*. Similarly, waveguide ports 605*c* and 605*d* may be divided by a septum 610*b* which assists in combining/splitting for H-plane combiner stage 615*b*. Combiner 600 further includes an E-plane combining stage 620*a*, associated with waveguide ports 605*a* and 605*b* which combines the electromagnetic waves received by waveguide ports 605*a* and 605*b* into a single waveguide 625. Similarly, combiner 600 includes a second E-plane combining stage 620*b*, associated with waveguide ports 605*c* and 605*d* which combines the electromagnetic waves received by waveguide ports 605*c* and 605*d* into a single waveguide 625. Waveguide 625 may be accessed via a connector port 630 which may be a coaxial connector, a BNC connector, a TNC connector, or any other connector disclosed herein or known to ordinarily skilled artisans.

It should be noted that, an electromagnetic wave may be provided to or received through combiner 600, in a manner similar to that described above, based on the intended "flow" of the electromagnetic wave for transmission or reception. Further, while not explicitly shown, combiner 600 may or may not be implemented with chamfers as described herein.

Figure 7:
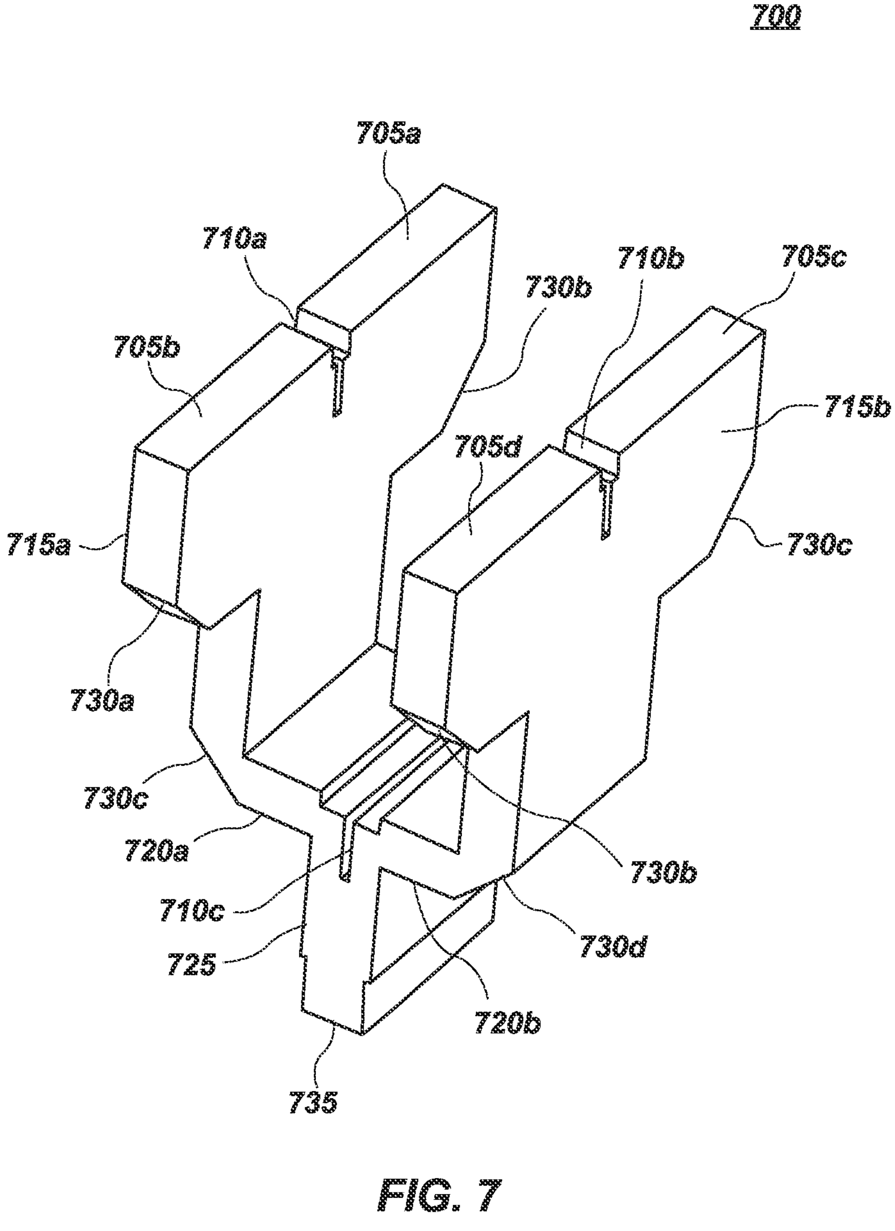
FIG. 7 illustrates a perspective view of another embodiment of an air volume corresponding to a 4 to 1 combiner.

FIG. 7 illustrates a perspective view of another embodiment of an air volume corresponding to a 4 to 1 combiner 700. Combiner 700 may also be referred to as a "quad combiner," a "connector" or a "corporate feed." Combiner 700 includes four "reduced height" waveguide ports 705*a*, 705*b*, 705*c*, and 705*d* which are divided by two step septums 710*a*, and 710*b*, as shown in FIG. 7. In the embodiment of combiner 700, waveguide ports 705*a* and 705*b* are combined in an H-plane "shortwall" combiner 715*a*. Likewise, ports 705*c* and 705*d* are combined in an H-plane "shortwall" combiner 715*b*. H-plane "shortwall" combiners 715*a* and 715*b* combine an electromagnetic wave from rectangular waveguides 705*a*-705*d* into two waveguides which are joined at E-plane "broadwall" combiner 720*a* or 720*b*. E-plane "broadwall" combiners 720*a* and 720*b* are divided from each other by a septum 710*c*, which is implemented as a two-step septum. The two-step septums 710*a*-710*c* are divided from each other by notches, one being wider than the other as shown in FIG. 7. E-plane "broadwall" combiner 720*a* receives an electromagnetic wave received at waveguide ports 705*a* and 705*b* while E-plane "broadwall" combiner 720*b* receives an electromagnetic wave received at waveguide ports 705*c* and 705*d*. E-plane "broadwall" combiner 720*a* and 720*b* flow together into waveguide 725 and a port 735 where an electromagnetic wave may be received into or output from combiner 700, depending on whether or not a signal is being received or transmitted from an antenna array associated with combiner 700.

Thus, combiner 700 may be implemented with four reduced height waveguide ports 705*a*-705*d*, are combined with two H-plane "shortwall" combiner 715*a* and 715*b* into E-Plane "broadwall" combiners 720*a* and 720*b* to provide a combined signal at port 735. Alternatively, if the "flow" is reversed, an electromagnetic signal provided to port 735 may be split into four equal amplitude signals at waveguide ports 705*a*-705*d*. In one embodiment combiners 715*a* and 715*b* may include a chamfer, such as chamfers 730*a*, 730*b*, 730*c*, and 730*d* to provide an impedance transition to allow the electromagnetic wave to match as it propagates around corners, bends, and combiners. Other chamfers, such as chamfers 730*c* and 730*d* may be installed between combiners 715*a* and 715*b* and combiners 720*a* and 720*b* for similar reasons.

Figure 8A:
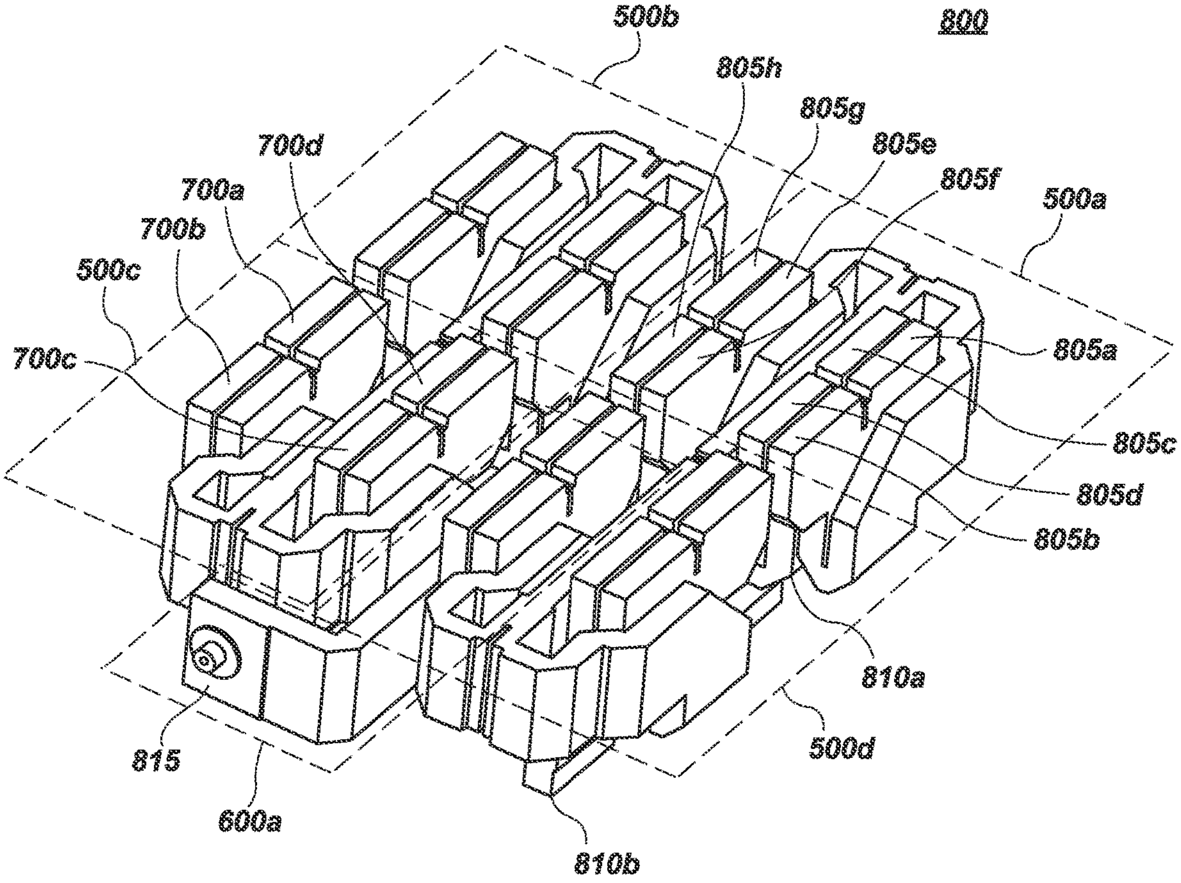
FIG. 8A illustrates a perspective view of an air volume corresponding to a 16 to 1 combiner.

FIG. 8A illustrates a perspective view of an air volume corresponding to a 16 to 1 combiner 800. Combiner 800 comprises four of 4 to 1 combiners 500, shown and described with respect to FIG. 5, assembled together, a 4 to 1 combiner 600, as shown in FIG. 6, and four 4 to 1 combiners 700, shown in FIG. 7. As shown in FIG. 8A, combiner 800 is comprised of combiner 500*a*, 500*b*, 500*c*, and 500*d* which are similar in implementation and description to combiner 500 shown in FIG. 5, combiner 600 which is similar in implementation and description to combiner 600, shown in FIG. 6, and four 4 to 1 combiners 700 which are similar in implementation and description to combiner 700, shown in FIG. 7. However, as shown in FIG. 8A, each one of combiners 500*a*-500*d* include waveguide ports in combiner 800*a* to support LHCP polarization in an integrated array. Similarly, each one of combiners 700*a*, 700*b*, 700*c*, and 700*d*, are interleaved with combiners 500*a*-500*d* and support RHCP polarization in an integrated array. For example, as shown in FIG. 8, combiners 500*a*-500*d* of combiner 800 may include waveguide ports 805*a*, 805*b*, 805*e*, and 805*f* which can be connected to LHCP polarization ports of a horn radiating element in an integrated array while combiners 700*a*-700*d* of combiner 800 may include waveguide ports 805*c*, 805*d*, 805*g*, and 805*h* can be connected to RHCP polarization ports of a horn radiating element in an integrated array.

Figure 8B:
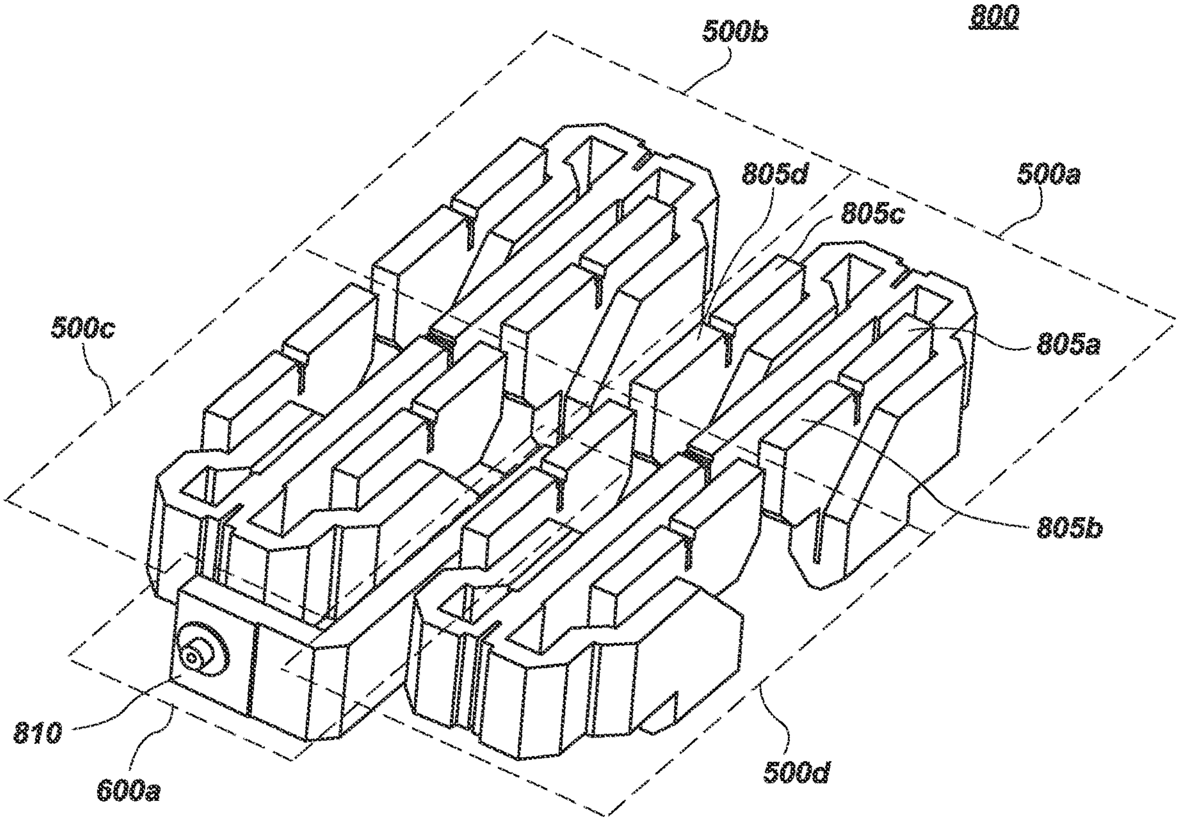
FIG. 8B illustrates a perspective view of another embodiment of an air volume corresponding to a 16 to 1 combiner.

FIG. 8B illustrates a perspective view of another embodiment of an air volume corresponding to a 16 to 1 combiner 800, shown in FIG. 8A, that implements four of combiners 500, shown in FIG. 5 with combiner 600, shown in FIG. 6. For example, as shown in FIG. 8, combiner 500*a* of combiner 800 may include waveguide ports 805*a*, 805*b*, 805*c*, and 805*d*. Combiners 500*b*, 500*c*, and 500*d* may be similarly implemented to provide 16 total waveguide ports in combiner 800. However, the ports of combiners 500*a*-500*d* are combined by combiner 600 to implement combiner 800, as shown in FIG. 8B. In other words, output/input ports of combiners 500*a*-500*d* act as, for example inputs into waveguide 625, shown in FIG. 6 to provide an electromagnetic wave into or out of coaxial connector 810, as shown in FIG. 8B. Combiner 800 shown in FIG. 8B is referred to as a "multi-stage" combiner because it implements combiners 500*a*-500*d* as well as combiner 600*a*. A multi-stage combiner may be implemented as a single layer and may be extendable to any size array by addition of subsequent combiner stages, allowing for simple scaling by multiples of 2 (e.g., 16, 32, 64, 128, etc.).

Figure 8C:
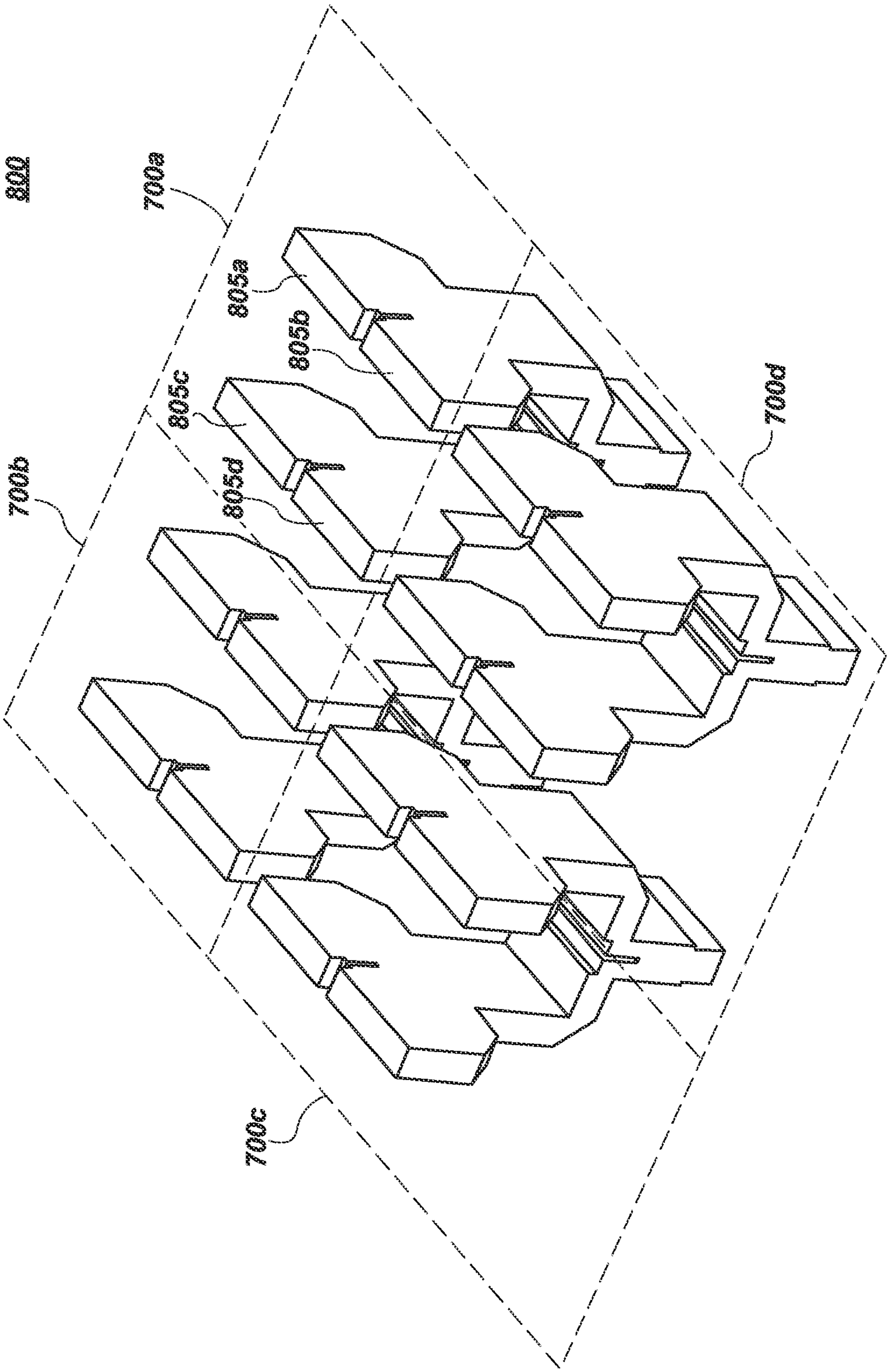
FIG. 8C illustrates a perspective view of another embodiment of an air volume corresponding to a 16 to 1 combiner.

FIG. 8C illustrates a perspective view of another embodiment of an air volume corresponding to four 4 to 1 combiners 800 ("combiner 800") that implements four of combiners 700, shown in FIG. 7, each having four waveguide ports, representatively illustrated as 805*a*, 805*b*, 805*c*, and 805*d* with respect to combiner 700*a*. For example, combiner 800 provides a combiners 700*a*, 700*b*, 700*c*, and 700*d* in a manner consistent with that described with respect to FIG. 7, above. Here, combiners 700*a*-700*d* may be connected to inputs on a waveguide dual-axis monopulse (shown in FIG. 9 and discussed below). This routing of ports from combiners 700*a*-700*d* into the waveguide dual-axis monopulse allows for an integrated antenna array to be implemented with combiner 800 on an upper layer while the waveguide dual axis monopulse is installed on a lower layer in the integrated antenna array while occupying a minimal volume relative to what has been previously known. Combiner 800 may also be easily scaled or be extendable to any size array by addition of subsequent combiner stages, allowing for simple scaling by multiples of 2 (e.g., 16, 32, 64, 128, etc.).

Figure 9:
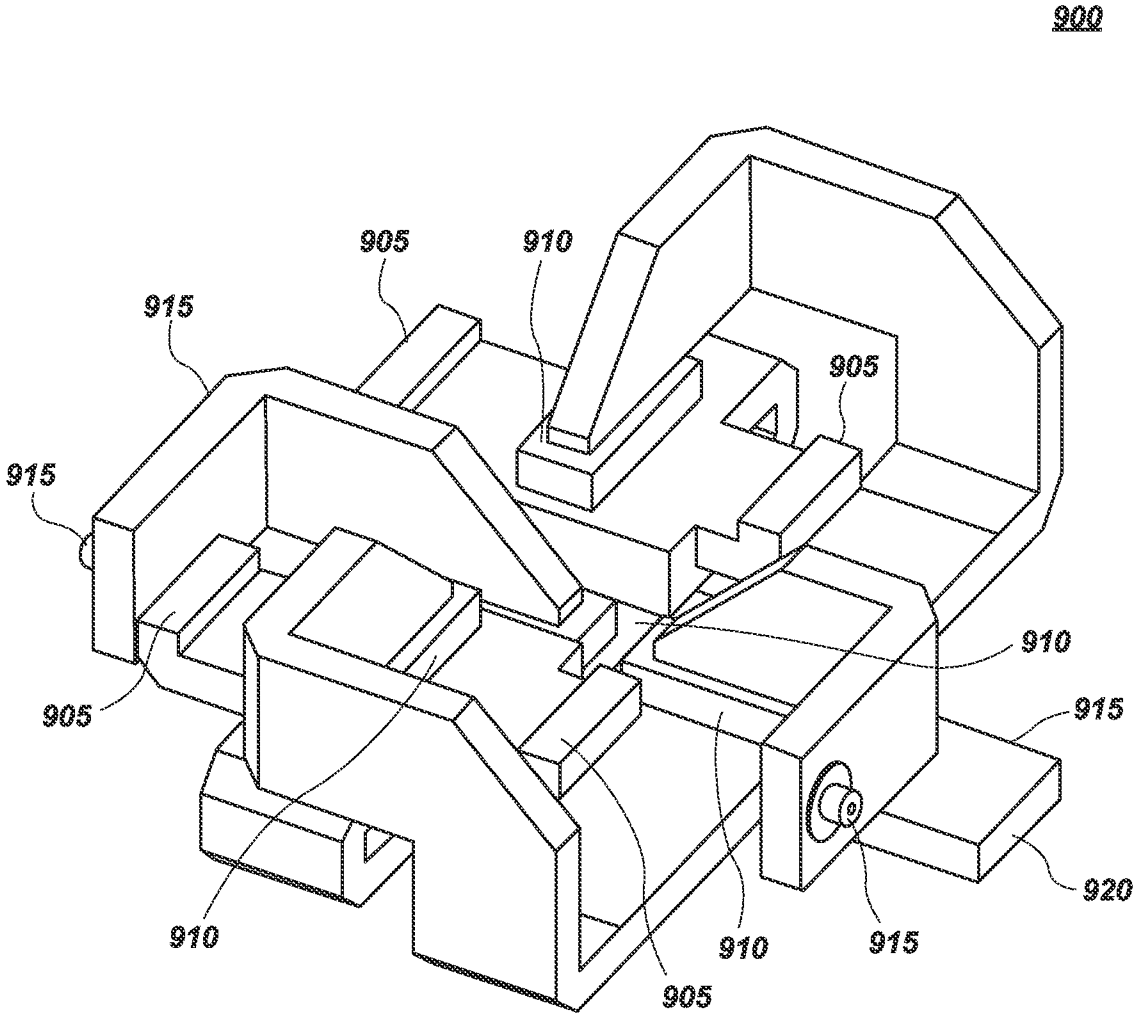
FIG. 9 illustrates a perspective view of an air volume of an air volume of a waveguide dual-axis monopulse.

FIG. 9 illustrates a perspective view of an air volume of a waveguide dual-axis monopulse 900. Waveguide dual-axis monopulse 900 is comprised of four single mode rectangular waveguides 905 which are connected to four magic tees, which combine the four signals from waveguide 905 into four outputs referred to as one sum and three difference signals, in a manner such input ports 915 result in combined ports 920 that are one sum channel (all 4 ports 915, only two of which are visible in FIG. 9 due to perspective). In other words, all four single mode rectangular waveguides 905 may be added together in phase and three difference (delta) channels (which are pairs of single mode rectangular waveguides 905 are combined and then subtracted from the remaining pairs). Ports 915 are transitioned to a plurality of coaxial connectors 915 (or other connectors known in the art) or may be implemented as rectangular waveguide outputs. Simply put, waveguide dual-axis monopulse 900 may receive electromagnetic waves as an input and may then sum the waves into a single sum channel and generate three tracking delta channels. It should be noted that other monopulses, such as single axis monopulses could also be used in lieu of a dual-axis monopulse.

Figure 10A:
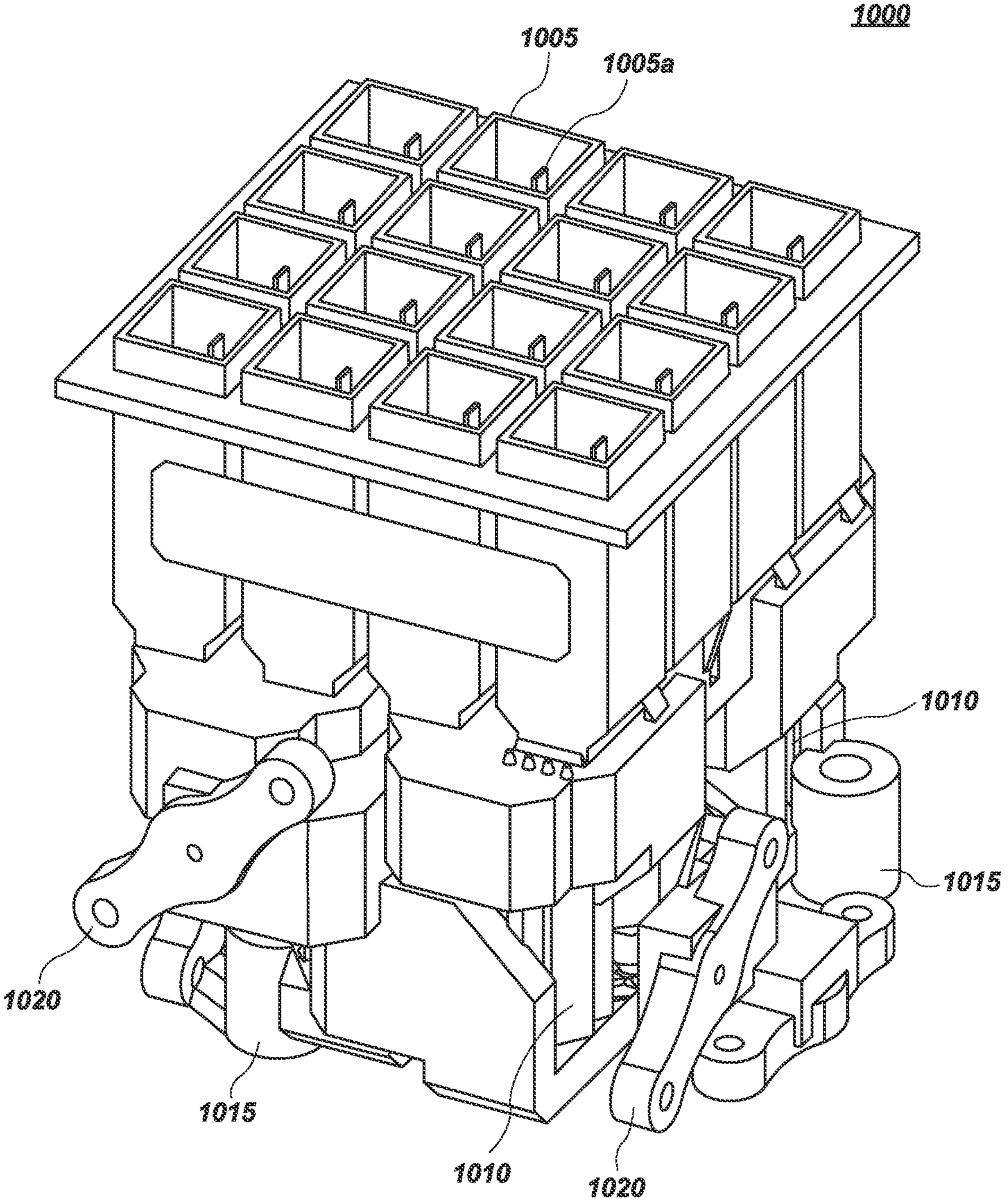
FIG. 10A illustrates a perspective view of an integrated tracking antenna array.

FIG. 10A illustrates a perspective view of an integrated tracking antenna array 1000. As shown in FIG. 10A, tracking antenna array 1000 includes 16 radiating elements 1005 that are integrated into a single piece tracking antenna array 1000. Tracking antenna array 1000 includes each of an antenna array, one or a plurality of combiners, a dual-axis waveguide monopulse, heat fins 1010, mechanical mounting holes 1015, and connectors 1020, which may be coaxial connectors, GPO connectors, or other connectors described herein and known to ordinary artisans. Each of these components discussed above may be formed as part of a single piece integrated array in which these components are literally printed, three dimensionally, into their relative positions in integrated tracking array 1000, such that integrated tracking array 1000 contains each of these components and exists a single form, with each component being indivisible from any other.

More specifically, radiating elements 1005 may be similar to other radiating elements discussed herein and implemented with septum polarizers 1005*a* as discussed above. As shown in FIG. 10A, the 16 radiating elements 1005 generate 16 LHCP reduced height rectangular waveguide ports that are connected to a 16 to 1 combiner network, and 16 RHCP reduced height rectangular waveguide ports that are connected to four, 4 to 1 combiners that feed a waveguide dual-axis monopulse. Further details for this arrangement are shown in FIG. 10B.

Tracking antenna array 1000 may further include heat fins 1010 that may be printed as part of the single-piece structure of tracking antenna array 1000 and may be located on tracking antenna array in an area where the most heat may be generated. Heat fins 1010 may be implemented in a tapered shape on the leading and trailing edges that allows for improved heat flow and ease of fabrication. Heat fins 1010 may also serve as structural supporting ribs that aids in fabrication and provides rigidity and strength for applications that have a shock or vibration requirement. Heat fins 1010 may be tapered from base to tip to increase fin efficiency and may change in thickness at a base of the fin to distribute heat in high heat generation areas while allowing air to flow elsewhere. In addition, or alternatively, thicker fins may be disposed in some regions to maximize conduction where temperature gradients are highest and allow air flow elsewhere around tracking antenna array 1000.

Tracking antenna array 1000 may further include mechanical mounting holes 1015 which are implemented into the single-piece structure of tracking antenna array 1000 which are positioned to allow mechanical attachment of tracking antenna array 1000 to a larger assembly, such as a satellite, for example. Tracking antenna array 1000 may further include a plurality of connector ports 1020. Tracking antenna array may include a connector port 1020 for an LHCP output of a 16 to 1 combiner and for one of each of four ports on a waveguide dual-axis monopulse integrated into tracking antenna array 1000.

Figure 10B:
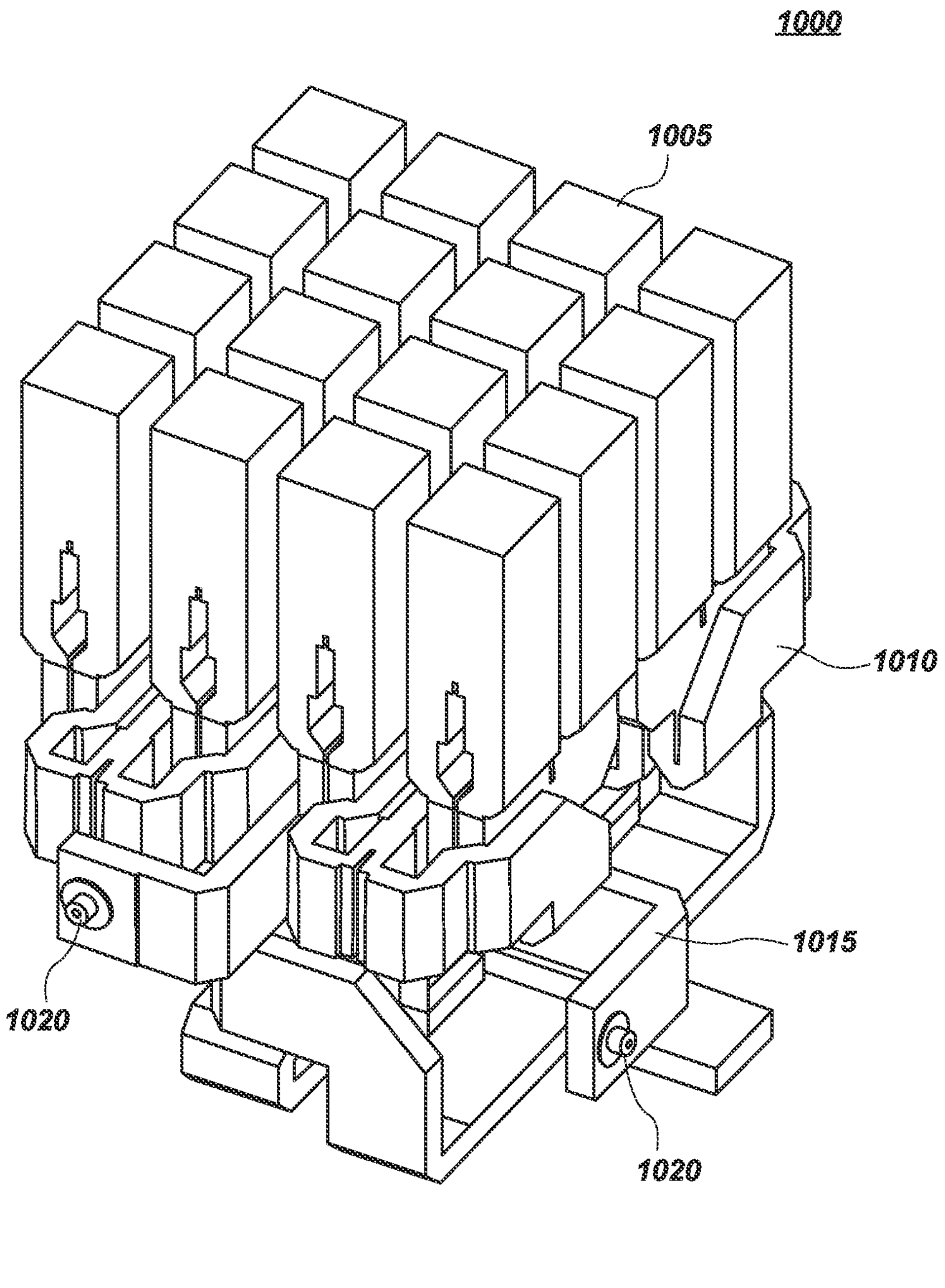
FIG. 10B illustrates a perspective view of an air volume corresponding to the integrated tracking antenna array shown in FIG. 10A.

FIG. 10B illustrates a perspective view of an air volume corresponding to the integrated tracking antenna array 1000 shown in FIG. 10A. FIG. 10B more clearly shows elements such as radiating elements 1005, four 4 to 1 combiners 1010, a waveguide dual axis monopulse, 1015, and a plurality of connectors 1020. Each of the elements shown in FIGS. 10A and 10B are integrally formed as a single piece to implement integrated tracking array 1000.

Figure 11A:
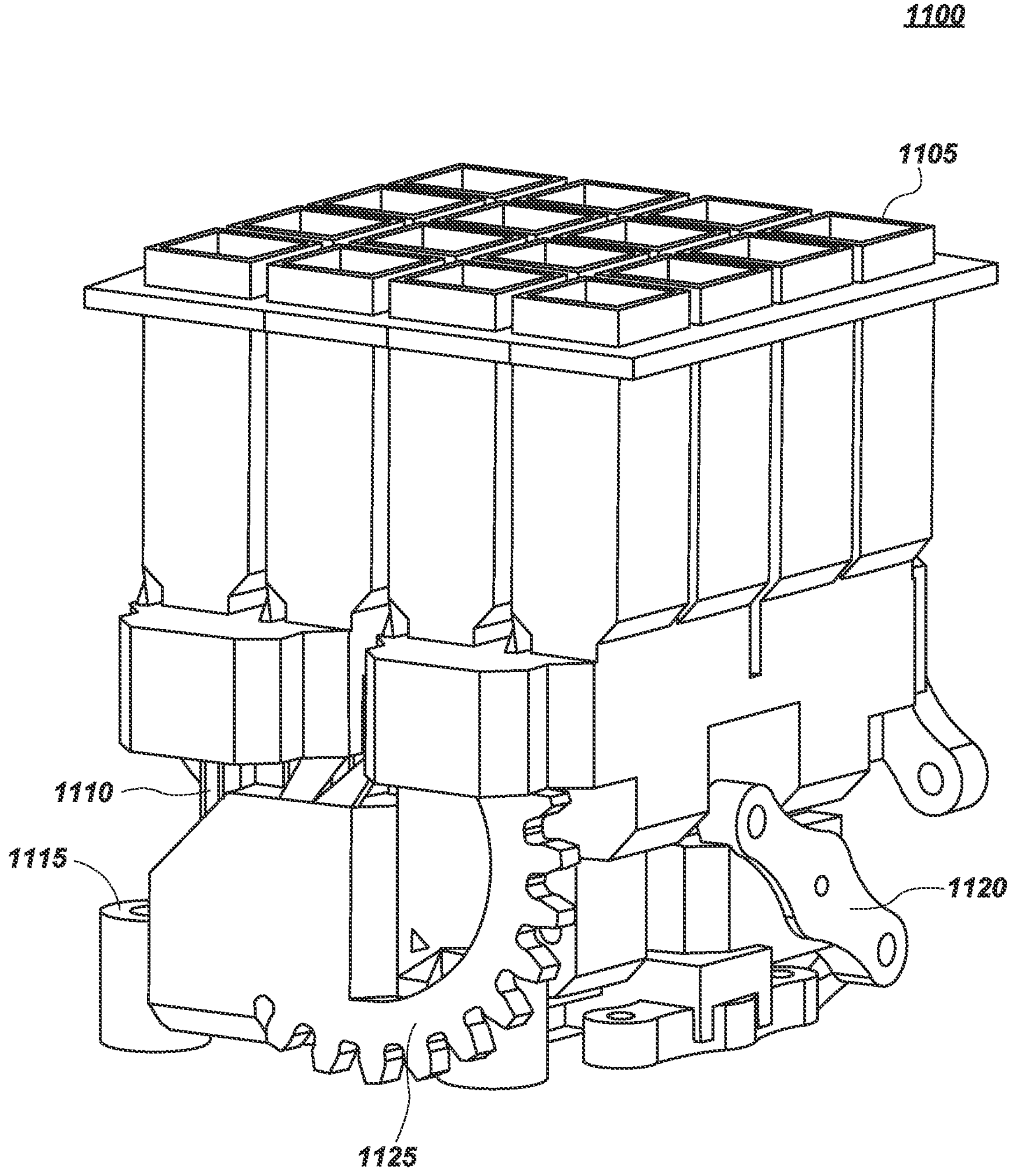
FIG. 11A illustrates a perspective view of one embodiment of an integrated tracking antenna array.

FIG. 11A illustrates a perspective view of one embodiment of an integrated tracking antenna array 1100, which is similar in most respects to integrated tracking array 1000, shown in FIG. 10A and FIG. 10B. As shown in FIG. 11A, tracking antenna array 1000 includes 16 radiating elements 1105 that are integrated into a single piece tracking antenna array 1100. Tracking antenna array 1100 includes each of an antenna array, one or a plurality of combiners, a dual-axis waveguide monopulse, heat fins 1110, mechanical mounting holes 1115, and connectors 1120, which may be coaxial connectors, GPO connectors, or other connectors described herein and known to ordinary artisans. Each of these components discussed above may be formed as part of a single piece element array in which these components are literally printed, three dimensionally, into their relative positions in integrated tracking array 1100, such that integrated tracking array 1100 contains each of these components and exists a single form, with each component being indivisible from any other. Integrated tracking array 1125 may be implemented with an integral gear 1125, which, when accompanied by positioning elements, which will be discussed below, allows integrated tracking array 1125 to change pointing angle of the antenna beam along one axis of movement, for example to maintain a "line of sight" with another transmitting or receiving antenna.

Figure 11B:
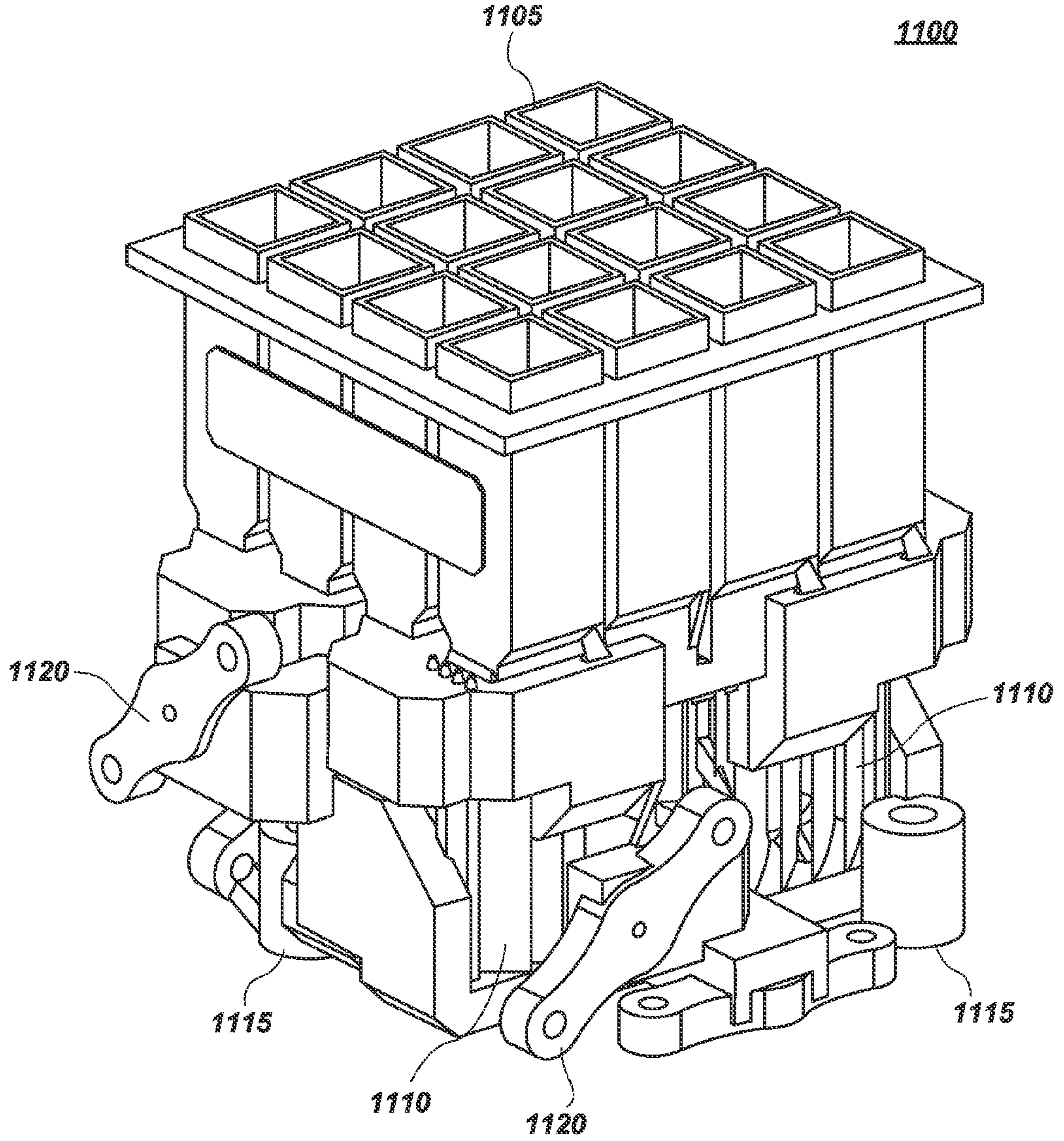
FIG. 11B illustrates a perspective view of another embodiment of an integrated tracking antenna array.

FIG. 11B illustrates a perspective view of another embodiment of an integrated tracking antenna array 1100. Tracking antenna array 1100 includes each of an antenna array, one or a plurality of combiners, a dual-axis waveguide monopulse, heat fins 1110, mechanical mounting holes 1115, and connectors 1120, which may be coaxial connectors, GPO connectors, or other connectors described herein and known to ordinary artisans. Each of these components discussed above may be formed as part of a single piece element array in which these components are literally printed, three dimensionally, into their relative positions in integrated tracking array 1100, such that integrated tracking array 1100 contains each of these components and exists a single form, with each component being indivisible from any other. Tracking antenna array 1100 may further include heat fins 1110 that may be printed as part of the single-piece structure of tracking antenna array 1100 and may be located on tracking antenna array in an area where the most heat may be generated. Heat fins 1110 may be implemented in a tapered shape on the leading and trailing edges that allows for improved heat flow and ease of fabrication. Heat fins 1110 may also serve as structural supporting ribs that aids in fabrication and provides rigidity and strength for applications that have a shock or vibration requirement. Heat fins 1110 may be tapered from base to tip to increase fin efficiency and may change in thickness at a base of the fin to distribute heat in high heat generation areas while allowing air to flow elsewhere. In addition, or alternatively, thicker fins may be disposed in some regions to maximize conduction where temperature gradients are highest and allow air flow elsewhere around tracking antenna array 1100.

Figure 11C:
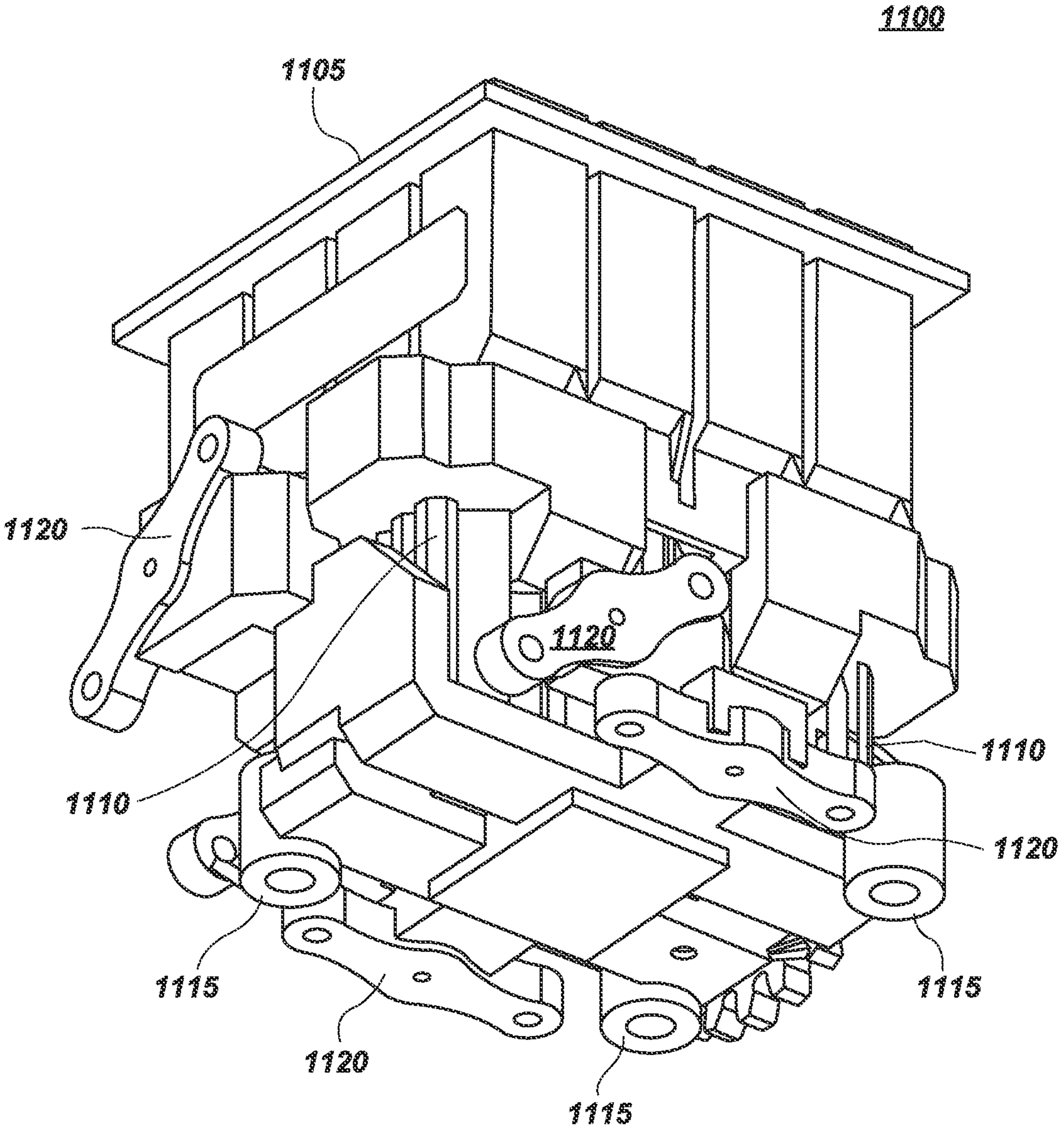
FIG. 11C illustrates a bottom perspective view of the integrated tracking arrays illustrated in FIG. 11A and FIG. 11B.

FIG. 11C illustrates a bottom perspective view of the integrated tracking arrays 1100 illustrated in FIG. 11A and FIG. 11B. Tracking antenna array 1100 includes each of an antenna array, one or a plurality of combiners, a dual-axis waveguide monopulse, heat fins 1110, mechanical mounting holes 1115, and connectors 1120, which may be coaxial connectors, GPO connectors, or other connectors described herein and known to ordinary artisans. Each of these components discussed above may be formed as part of a single piece element array in which these components are literally printed, three dimensionally, into their relative positions in integrated tracking array 1100, such that integrated tracking array 1100 contains each of these components and exists a single form, with each component being indivisible from any other. Tracking antenna array 1100 may further include heat fins 1110 that may be printed as part of the single-piece structure of tracking antenna array 1100 and may be located on tracking antenna array in an area where the most heat may be generated. Heat fins 1110 may be implemented in a tapered shape on the leading and trailing edges that allows for improved heat flow and ease of fabrication. Heat fins 1110 may also serve as structural supporting ribs that aids in fabrication and provides rigidity and strength for applications that have a shock or vibration requirement. Heat fins 1110 may be tapered from base to tip to increase fin efficiency and may change in thickness at a base of the fin to distribute heat in high heat generation areas while allowing air to flow elsewhere. In addition, or alternatively, thicker fins may be disposed in some regions to maximize conduction where temperature gradients are highest and allow air flow elsewhere around tracking antenna array 1100.

Figure 12:
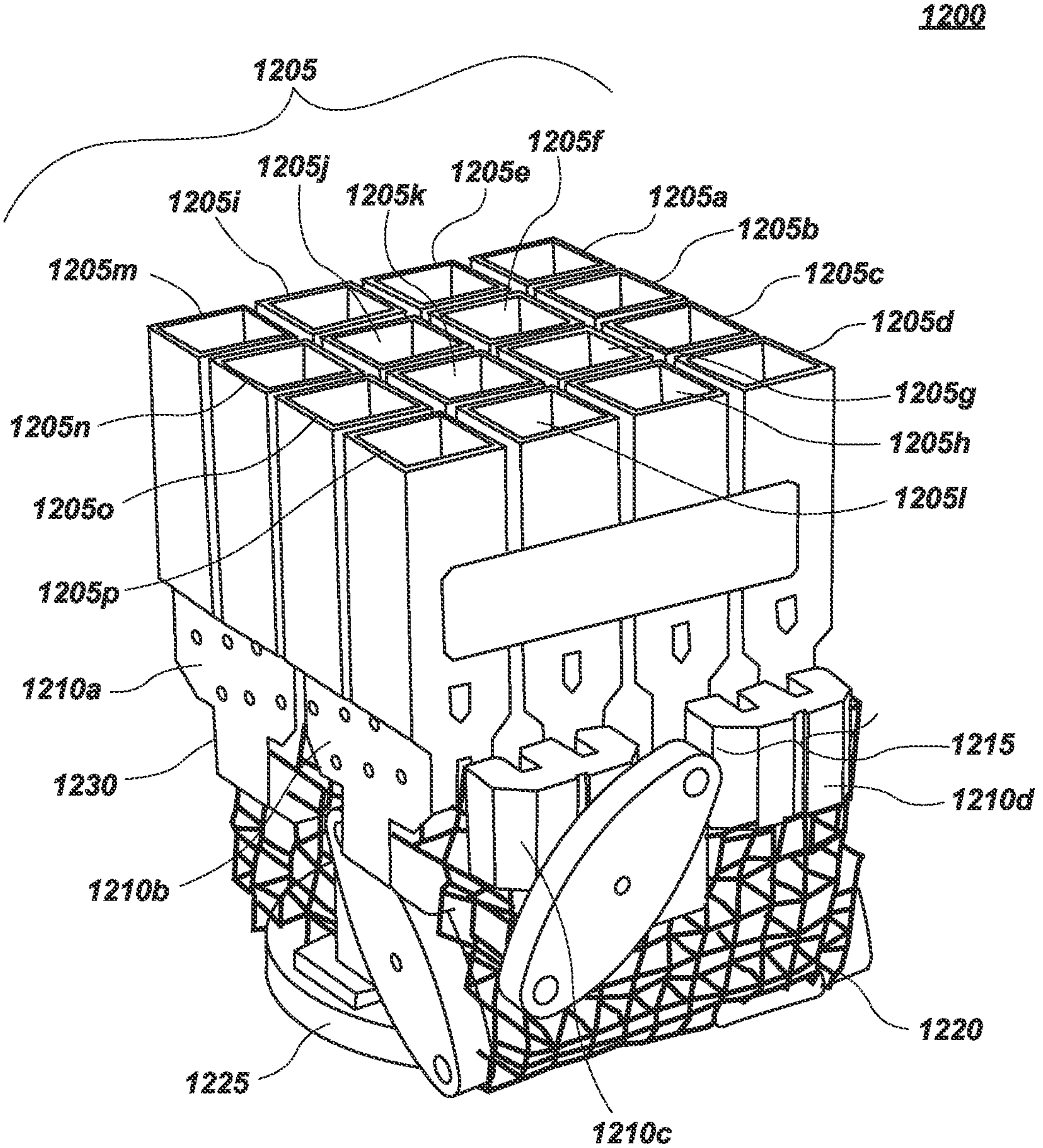
FIG. 12 illustrates a perspective view of another embodiment of an integrated tracking array.

FIG. 12 illustrates a perspective view of another embodiment of an integrated tracking array 1200. Integrated antenna array 1200 includes a plurality of radiating elements 1205 (collectively referred to as radiating elements 1205) which are each formed together as a single connected element, as described herein. Radiating elements 1205 include radiating elements 1205*a*, 1205*b*, 1205*c*, 1205*d*, 1205*e*, 1205*f*, 1205*g*, 1205*h*, 1205*i*, 1205*j*, 1205*k*, 1205*l*, 1205*m*, 1205*n*, 1205*o*, and 1205*p*. Radiating elements 1205, in this example, are shown in a 4 element by 4 element array of radiating elements 1205, having 16 total radiating elements. This is purely exemplary as any number of arrays may be built with any number of radiating elements. For example, 1 element arrays, 2 element by 2 element arrays, 8 element by 8 element arrays, 16 element by 16 element arrays, 32 by 32 element arrays, and so on are all conceived and possible depending on a particular use or implementation. Further, asymmetrical arrays are also possible and conceived of, such as 4 element by 16 element arrays, 8 element by 16 element arrays, and etc. are possible. Typically, preferable arrays are arranged in elements that are multiples of 2 (e.g., 2, 4, 8, 16, 32, 64, etc.).

Certain radiating elements 1205 may be connected together by a waveguide, referred to as a combiner 1210, as described herein. A waveguide is a hollow channel, a wire, or another conductive element that allows signals to pass through and into a particular end or location. As disclosed herein, a waveguide may be a hollow metal cavity which allows an electromagnetic signal to propagate through the hollow metal cavity by a conductive plane. Waveguide use and design, like virtually all electromagnetic signal related mathematics and physics, includes concepts that are difficult to understand for many. For example, the geometry of a waveguide dictates, based on the underlying physics and mathematics, how electromagnetic waves propagate through the waveguide. Accordingly, certain geometries are better than other geometries for a particular waveguide implemented for a specific purpose. Further, since the calculations to design a waveguide require some of the most advanced mathematical techniques known to man, waveguide design is highly technical and difficult, even with modern software tools. However, new geometries for waveguides, previously never thought possible, may be created by three dimensional printing techniques discussed herein.

Exemplary processes used to form array 1200, including radiating elements 1205 and combiners, or "corporate feeds" 1210*a*, 1210*b*, 1210*c*, and 1210*d* (collectively referred to as combiners 1210), may include metal three dimensional printing using powder-bed fusion, selective laser melting, stereo electrochemical deposition, and any other processes whereby metal structures are fabricated using a three dimensional printing process (aka additive manufacturing) where the components of array 1200 are assembled as a single integrated structure. As will be further discussed below, array 1200 may be integrated into a single piece assembly, which includes the foregoing elements, by these three dimensional printing processes. For example, the radiating elements 1205 of array 1200 may be formed together with the combiners 1210 through the printing process in a manner that does not require a separate joining process of the various components. In other words, all necessary components of array 1200 may be formed together with array 1200 as a single element with a plurality of indivisible constituent parts.

Array 1200 may further, and optionally, include a structural lattice 1220, which provides structural rigidity to array 1200. Structural lattice 1220 may provide other benefits, such as adding to surface area of array 1200, in a high strength, light weight application. Structural lattice 1220 may further assist in fabrication of the array 1200 in a single piece and indivisible array 1200. Structural lattice 1220 may also serve as a thermal cooling path to radiate heat away from portions of array 1200 where heat may be generated. Structural lattice 1220 may also be integrally formed as an indivisible constituent element of array 1200 and may be formed using uniform or non-uniform lattice structures (e.g., uniform squares or deformed squares) as appropriate for a particular implementation.

Array 1200 may further include a heat sink 1225 which may serve to dissipate heat created in receiving signals in, particularly, high frequency applications. Heat sink 1225 may also be optionally included in array 1200 and may be integrally formed as an indivisible constituent element of array 1200. Heat sink 1225 may further act as a connector for attaching various connections, such as a coaxial connection, and may serve as a body for a coaxial connector radio frequency path. Heat sink 1225 may also be formed using a three dimensional mesh, similar to structural lattice 1220, which allows heat to be dissipated through heat sink 1225 as air passes over the three dimensional mesh.

Figure 13:
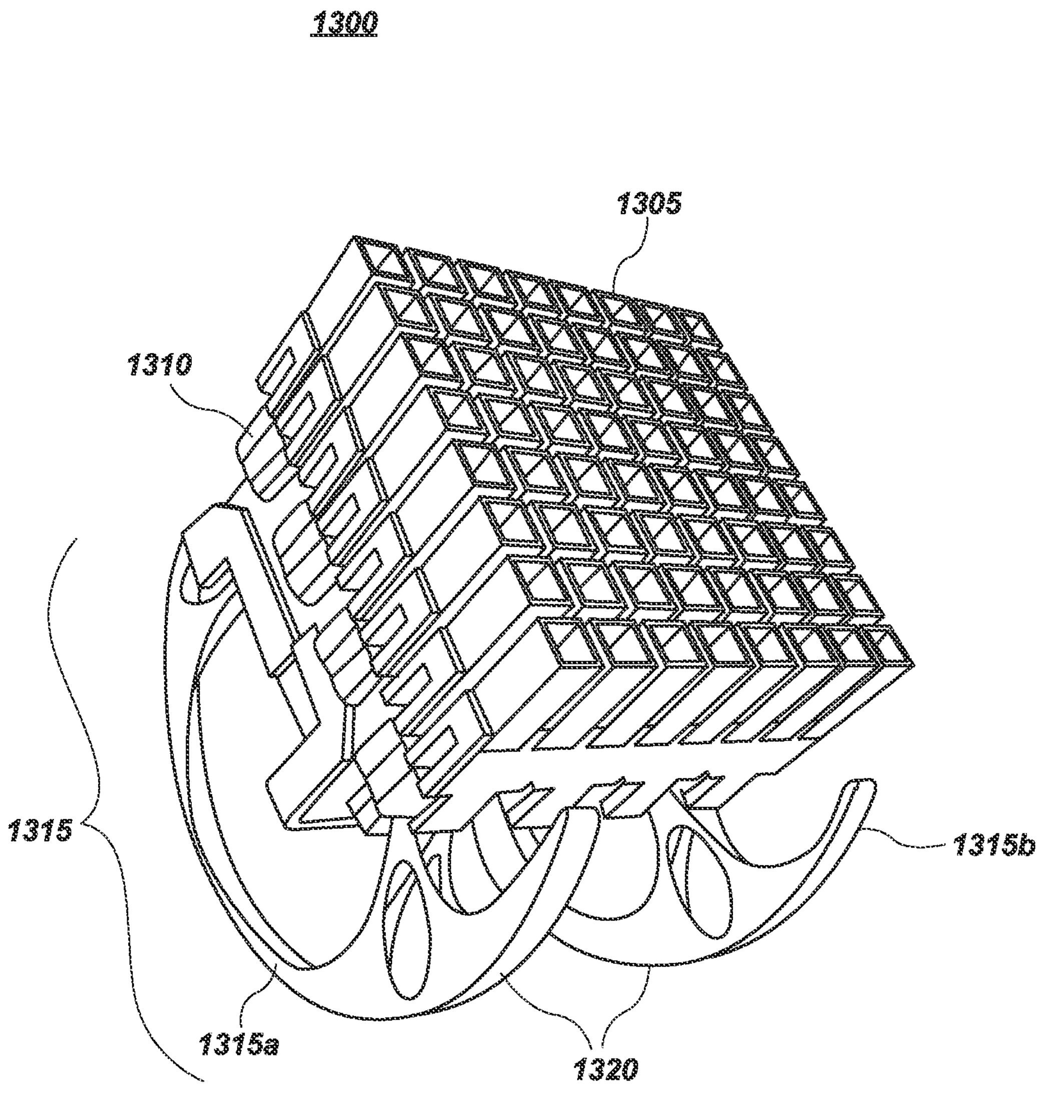
FIG. 13 illustrates a front perspective view of an integrated tracking array with repositioning elements.

FIG. 13 illustrates a front perspective view of an integrated tracking array 1300 with repositioning elements 1315. Integrated tracking array 1300 may be implemented, in this embodiment with any number of radiating elements 1305 and corresponding combiners 1310, which have been discussed in detail above. As shown in FIG. 13, a first curved positioning element 1315*a* and a second curved positioning element 1315*b* may be implemented as single pieces of any integrated tracking array disclosed herein. In other words, repositioning elements 1315, referring to both first curved positioning element 1315*a* and second curved positioning element 1315*b*, may be printed to be an integral component of an integrated tracking array disclosed herein, such as integrated tracking array 1300. Integrated tracking array 1300 may further include one or more gear teeth 1320, which allow definite, known, movement with rotation of a positioning gear (not shown) on the inside of first curved positioning element 1315*a* and/or second curved positioning element 1315*b*. Repositioning elements 1315 allow integrated tracking array 1300 to change pointing angle of the antenna beam along one axis of movement, for example to move to maintain a line of sight with another transmitter/receiving antenna, as will be discussed below with respect to FIG. 14.

Figure 14:
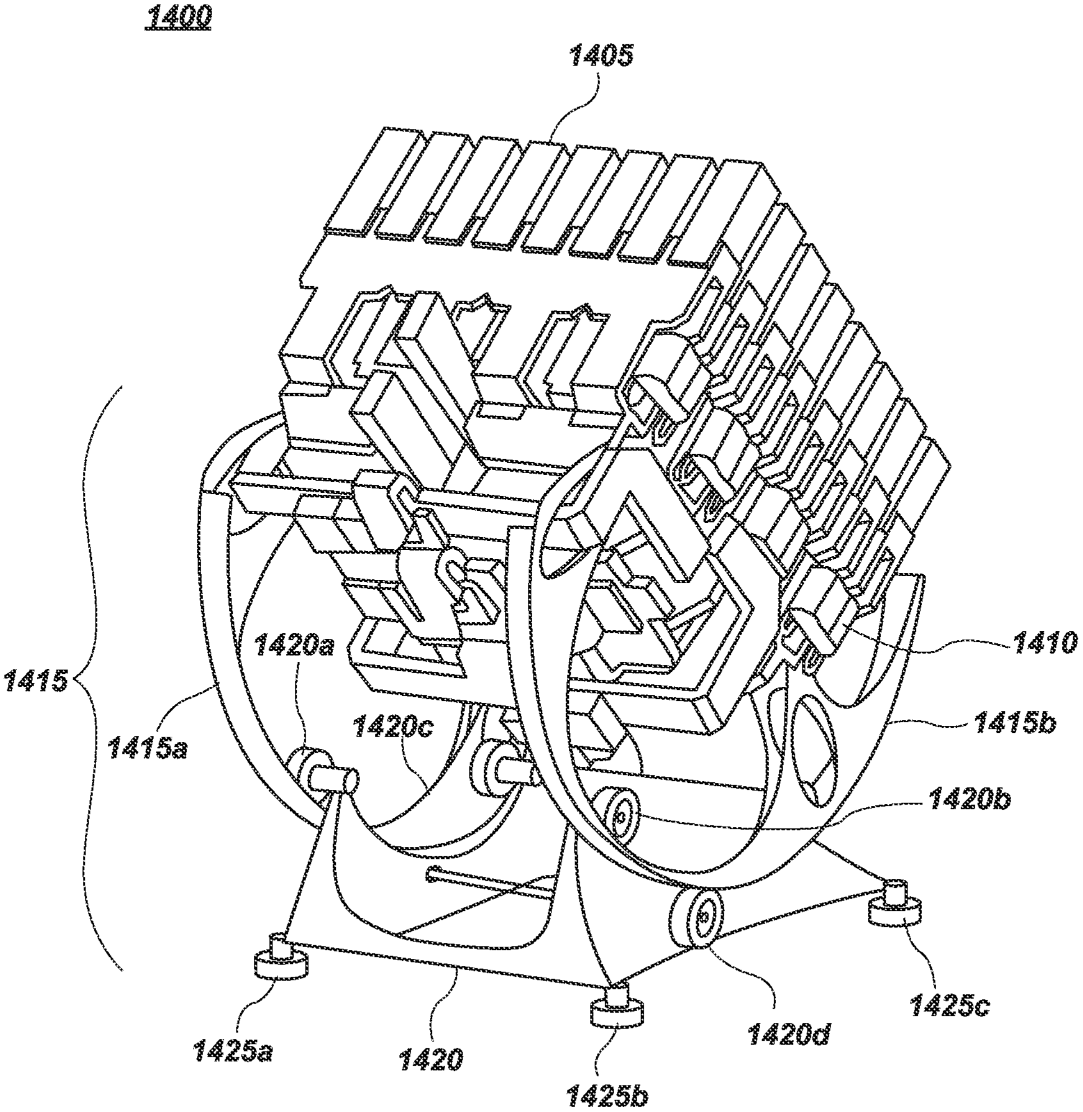
FIG. 14 illustrates a rear perspective view of the integrated tracking array with repositioning elements shown in FIG. 13.

FIG. 14 illustrates a rear perspective view of the integrated tracking array 1400 with repositioning elements 1415, which are similar to repositioning elements 1315 shown in FIG. 13. Array 1400 may include a plurality of radiating elements 1405 (FIG. 14 illustrates tracking array 1400 as being implemented as an 8 element by 8 element array for a total 64 radiating elements in this example) which may be similar in description and implementation to other radiating elements discussed herein. Array 1400 may further include a plurality of combiners 1410 which may be similar in description and implementation to other combiners discussed herein.

As shown in FIG. 14, a positioning element 1415 is shown. Positioning element 1415 may include a left positioning element 1415*a* and a right positioning element 1415*b* which are both attached to array 1400. Left positioning element 1415*a* and right positioning element 1415*b* may be integrally formed with array 1400 as an indivisible single component. Left positioning element 1415*a* and right positioning element 1415*b* may be generally arcuate in order to provide movement in a first dimension for array 1400. Left positing element 1415*a* and right positioning element 1415*b* may be attached to a base 1420 which allows array 1400 to move in the first dimension of movement by a first roller 1420*a*, a second roller 1420*b*, a third roller 1420*c*, and a fourth roller 1420*d*.

As shown in FIG. 14, left positioning element 1415*a* may be implemented as a rocker which may transit between first roller 1420*a* and third roller 1420*c* to provide an arc of movement that is determined by a length of left positioning element 1415*a*. Right positing element 1415*b* may be implemented as a rocker which may transit between second roller 1420*a* and fourth roller 1420*d* to provide an arc of movement that is determined by a length of right positioning element 1415*b*. In this example, array 1400 may move in a first dimension by 180 degrees by causing left positioning element 1415*a* and right positioning element 1415*b* to transit between their respective rollers and adjust the direction of the array. In this manner array 1400 may be repositioned to ensure that a line of sight may be established with another antenna to receive a transmitted signal or to transmit a signal, as appropriate.

Base 1420 may include a first foot 1425*a*, a second foot 1425*b*, a third foot 1425*c*, and a fourth foot 1425*d* which may serve as a base for antenna 1400. Base 1420 may be formed using the same three dimensional printing processes described above. It may be that first foot 1425*a*, a second foot 1425*b*, a third foot 1425*c*, and a fourth foot 1425*d* are extendible to provide movement of array 1400 in a second dimension of movement by gearing (not shown) associated with first foot 1425*a*, a second foot 1425*b*, a third foot 1425*c*, and a fourth foot 1425*d* attached to base 1420.

Figure 15:
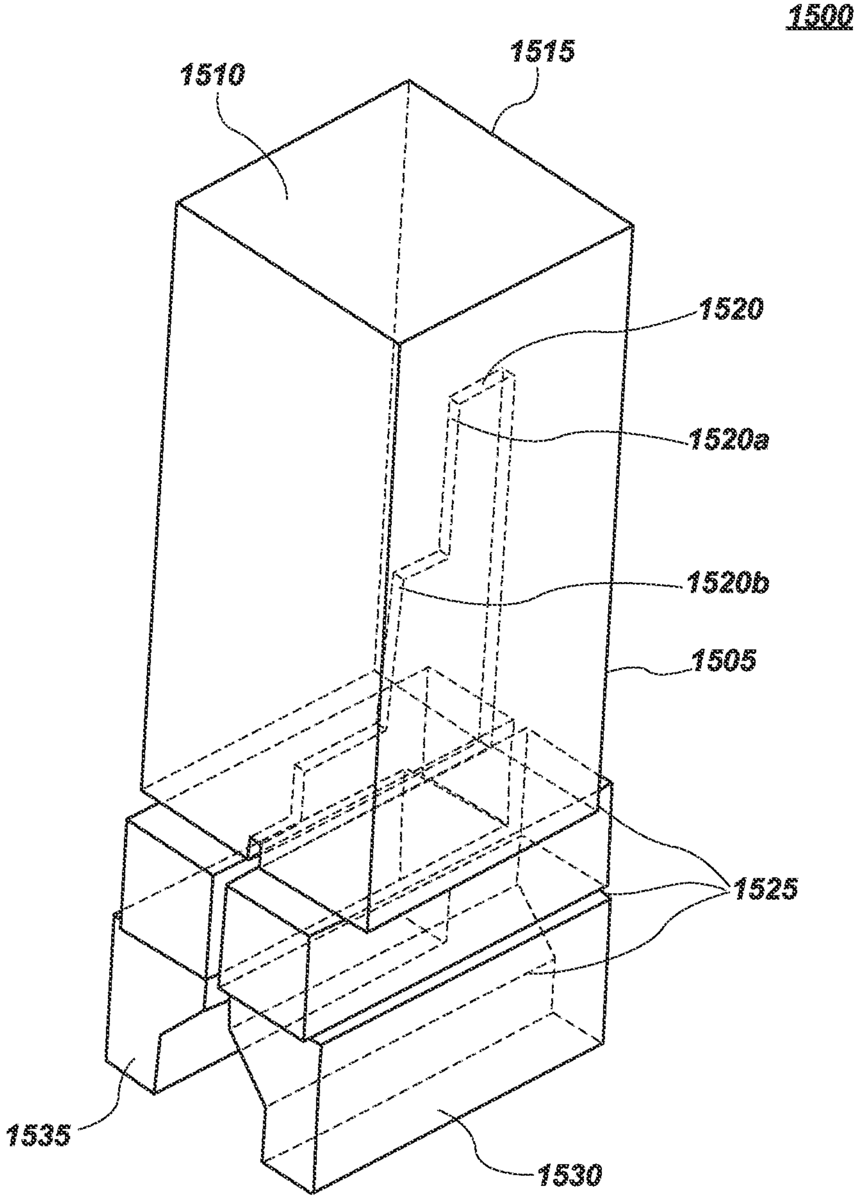
FIG. 15 illustrates a perspective view of an air volume of a radiation element.

FIG. 15 illustrates a perspective view of an air volume of a radiating element 1500. Radiating element 1500 is similar to radiating element 400, shown in FIG. 4, in terms of air volume and corresponding physical structure. However, impedance features 1525, examples of which are chamfers and steps, are disposed within void 1510 of radiating element 1500. For example, radiating element 1500 includes a body 1505, a void 1510, a horn 1515, a septum polarizer 1520, which are all similar in implementation and description to the corresponding structures shown in FIG. 4. Impedance features 1525 may be similar in description to impedance steps 425 shown in FIG. 4 to provide alternative mechanisms for matching the impedance of radiating element 1500 to the surrounding environment. Radiating element 1500 further includes a first waveguide port 1530 and a second waveguide port 1535 which support an LHCP and RHCP polarization, respectively. Septum polarizer 1520 converts the TE10 waveguide into substantially equal amplitude and substantially 90° phase shifted TE10 and TE01 waveguide modes at horn 1515. Impedance steps 1525 match the impedance transition from waveguide ports, such as first waveguide port 1530 and second waveguide port 1535. Horn 1515 may be matched to space, air, a vacuum, or another dielectric for the purpose of radiating an RHCP or LHCP electromagnetic wave.

First waveguide port 1530 may be implemented as a "reduced height waveguide," meaning that the short axis of waveguide port 1530 is less than one half of the length of the long axis of waveguide port 1530. The purpose of a reduced height waveguide is to allow for a single combining layer by spacing waveguides closely enough to have multiple waveguide runs side-by-side (as will be discussed below). A length of the long axis of waveguide port 1530 determines its frequency performance of the fundamental mode (TE10, for example), while a height of waveguide port 1530 may be adjusted lower or higher to either make waveguide port 1530 more compact and experience a higher loss or less compact and experience a lower loss. Typical values for waveguide height when propagating the fundamental (lowest order) mode is that the short axis is less than half the length of the long axis of waveguide port 1530. A signal entering first waveguide port 1530 may be converted into an electromagnetic wave that rotates with left-handedness at horn 1515. Second waveguide port 1535 may be oppositely, but similarly, implemented to produce an electromagnetic wave that rotates with right-handedness at horn 1515.

More simply, a signal entering first waveguide port 1530 is converted by various steps (1520*a*, 1520*b*) into a circularly polarized wave at horn 1515. Steps 1520*a* and 1520*b* are merely representative of any number of steps that may be implemented according to the needs and desires of a particular application. This is accomplished by impedance matching features 1525 and the septum polarizer steps 1520*a*, 1520*b*, that convert a unidirectional electric field at first waveguide port 1530 into a rotating LHCP wave at horn 1515. Horn 1515 may be opened to free space, vacuum, air, water, or any dielectric for the purpose of radiating the electromagnetic wave. Similarly, a signal entering at second waveguide port 1535 may be converted for a rotating RHCP wave at horn 1515.

Figure 16A:
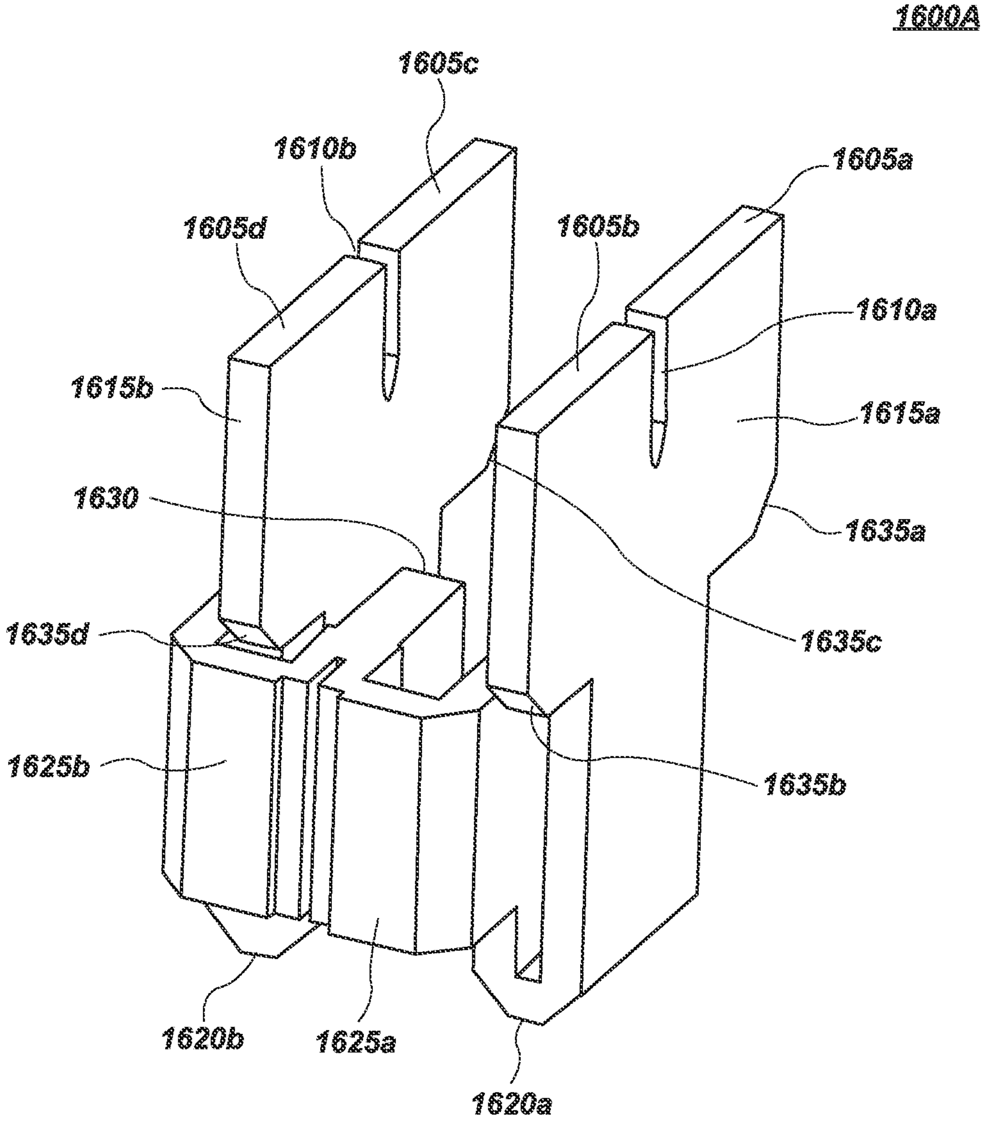
FIG. 16A illustrates a perspective view of an air volume corresponding to another embodiment of a 4 to 1 combiner.

FIG. 16A illustrates a perspective view of an air volume corresponding to another embodiment of a 4 to 1 combiner 1600A. Combiner 1600A may be similar in implementation and description to combiners 500, 600, and 700, shown in FIGS. 5, 6, and 7, respectively, and include like parts performing similar functions, as described herein. For example, combiner 1600A may also be referred to as a "quad combiner," a "connector" or a "corporate feed." Combiner 1600A includes four "reduced height" waveguide ports 1605*a*, 1605*b*, 1605*c*, and 1605*d*. Waveguide ports 1605*a* and 1605*b* may be divided by a septum 1610*a* which assists in combining/splitting for H-plane combiner stage 1615*a*. Similarly, waveguide ports 1605*c* and 1605*d* may be divided by a septum 1610*b* which assists in combining/splitting for H-plane combiner stage 1615*b*. Combiner 1600A implements a U-bend 1620*a* that connects H-plane combiner stage 1615*a* to E-plane combiner stage 1625*a*. Similarly, combiner 1600A implements a U-bend 1620*b* that connects H-plane combiner stage 1615*b* to E-plane combiner stage 1625*b*. E-plane combining stage 1625*a*, associated with waveguide ports 1605*a* and 1605*b* which combines the electromagnetic waves received by waveguide ports 1605*a* and 1605*b* into a single port 1630. E-plane combining stage 1620*b*, associated with waveguide ports 1605*c* and 1605*d* which combines the electromagnetic waves received by waveguide ports 1605*c* and 1605*d* into a single port 1630. An E-plane combiner includes combining stage 1625*a*, 1625*b* and an port 1630.

It should be noted that, an electromagnetic wave may be provided to or received through combiner 1600A, in a manner similar to that described above, based on the intended "flow" of the electromagnetic wave for transmission or reception. Further, combiner 1600A may be implemented with chamfers 1635*a*, 1635*b*, 1635*c*, and 1635*d* in H-plane combiner stages 1615*a* and 1615*b*, as described herein.

Figure 16B:
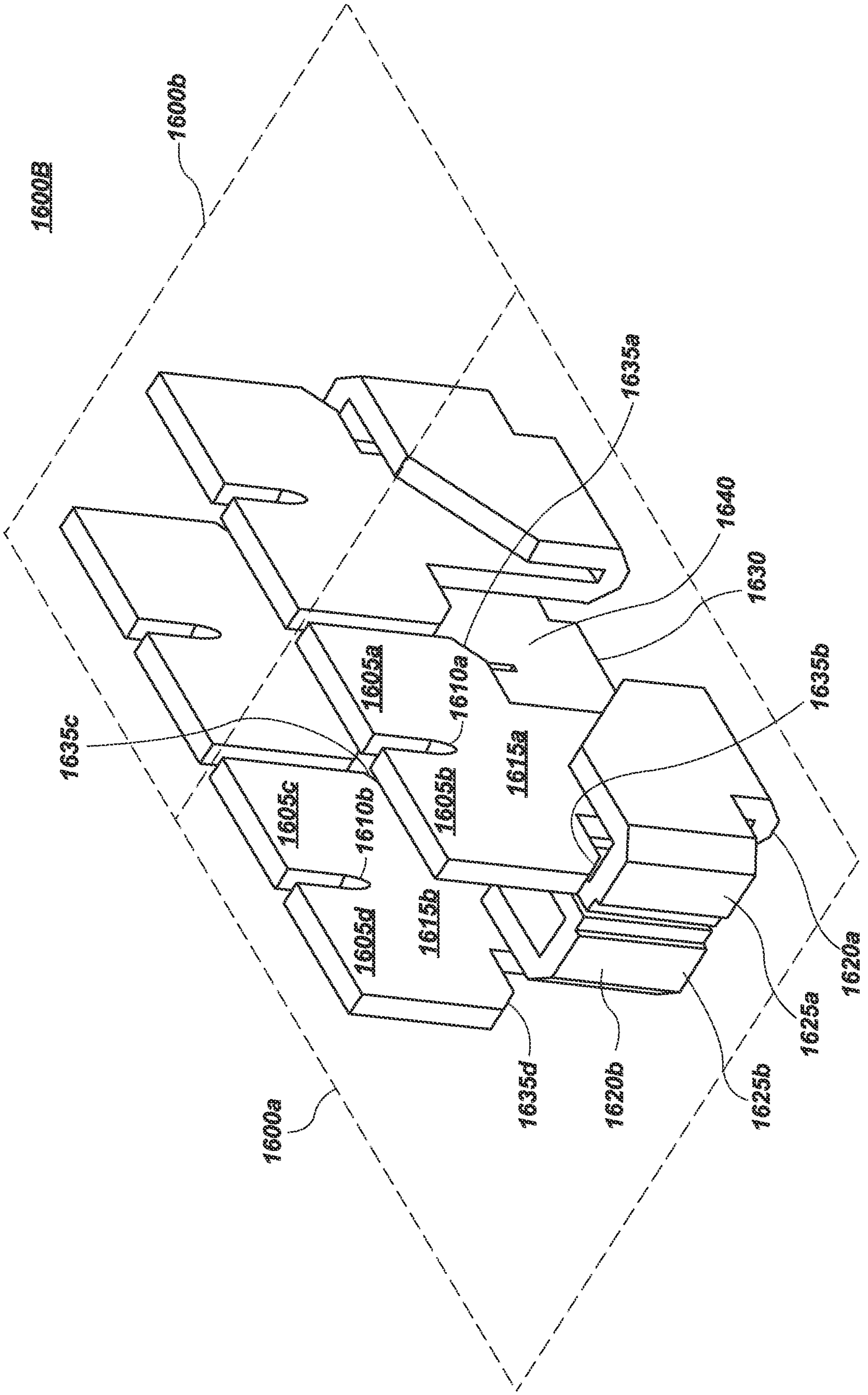
FIG. 16B illustrates a perspective view of an air volume corresponding to another embodiment of an 8 to 1 combiner.

FIG. 16B illustrates a perspective view of an air volume corresponding to another embodiment of an 8 to 1 combiner 1600B. Combiner 1600B includes two combiners, 1600*a* and 1600*b*, that are similar in implementation and description to combiner 1600A, shown in FIG. 16A. Combiner 1600A shown in FIG. 16A may be duplicated to form combiner 1600*a* and 1600*b*. Combiner 1600B, shown in FIG. 16B, because of the duplication, may act as an 8 to 1 combiner. For example, combiner 1600*a* includes four "reduced height" waveguide ports 1605*a*, 1605*b*, 1605*c*, and 1605*d*. Waveguide ports 1605*a* and 1605*b* may be divided by a septum 1610*a* which assists in combining/splitting for H-plane combiner stage 1615*a*. Similarly, waveguide ports 1605*c* and 1605*d* may be divided by a septum 1610*b* which assists in combining/splitting for H-plane combiner stage 1615*b*. Combiner 1600B implements a U-bend 1620*a* that connects H-plane combiner stage 1615*a* to E-plane combiner stage 1625*a*. Similarly, combiner 1600B implements a U-bend 1620*b* that connects H-plane combiner stage 1615*b* to E-plane combiner stage 1625*b*. E-plane combining stage 1625*a*, associated with waveguide ports 1605*a* and 1605*b* which combines the electromagnetic waves received by waveguide ports 1605*a* and 1605*b*. E-plane combining stage 1620*b*, associated with waveguide ports 1605*c* and 1605*d* which combines the electromagnetic waves received by waveguide ports 1605*c* and 1605*d*. Each of these elements may be duplicated in combiner 1600*b*.

As shown in FIG. 16B, combiner 1600B includes an additional H-plane combiner 1640 which combines electromagnetic waves provided by E-plane combiners 1625*a* and 1625*b* (and their analogs in combiner 1600*b*), into a single wave that is provided to or from port 1630. It should be noted that, an electromagnetic wave may be provided to or received through combiner 1600B, in a manner similar to that described above, based on the intended "flow" of the electromagnetic wave for transmission or reception. Further, combiner 1600B may be implemented with chamfers 1635*a*, 1635*b*, 1635*c*, and 1635*d* in H-plane combiner stages 1615*a* and 1615*b* of combiner 1600*a* and with the corresponding elements of combiner 1600*b*, as described herein.

Figure 16C:
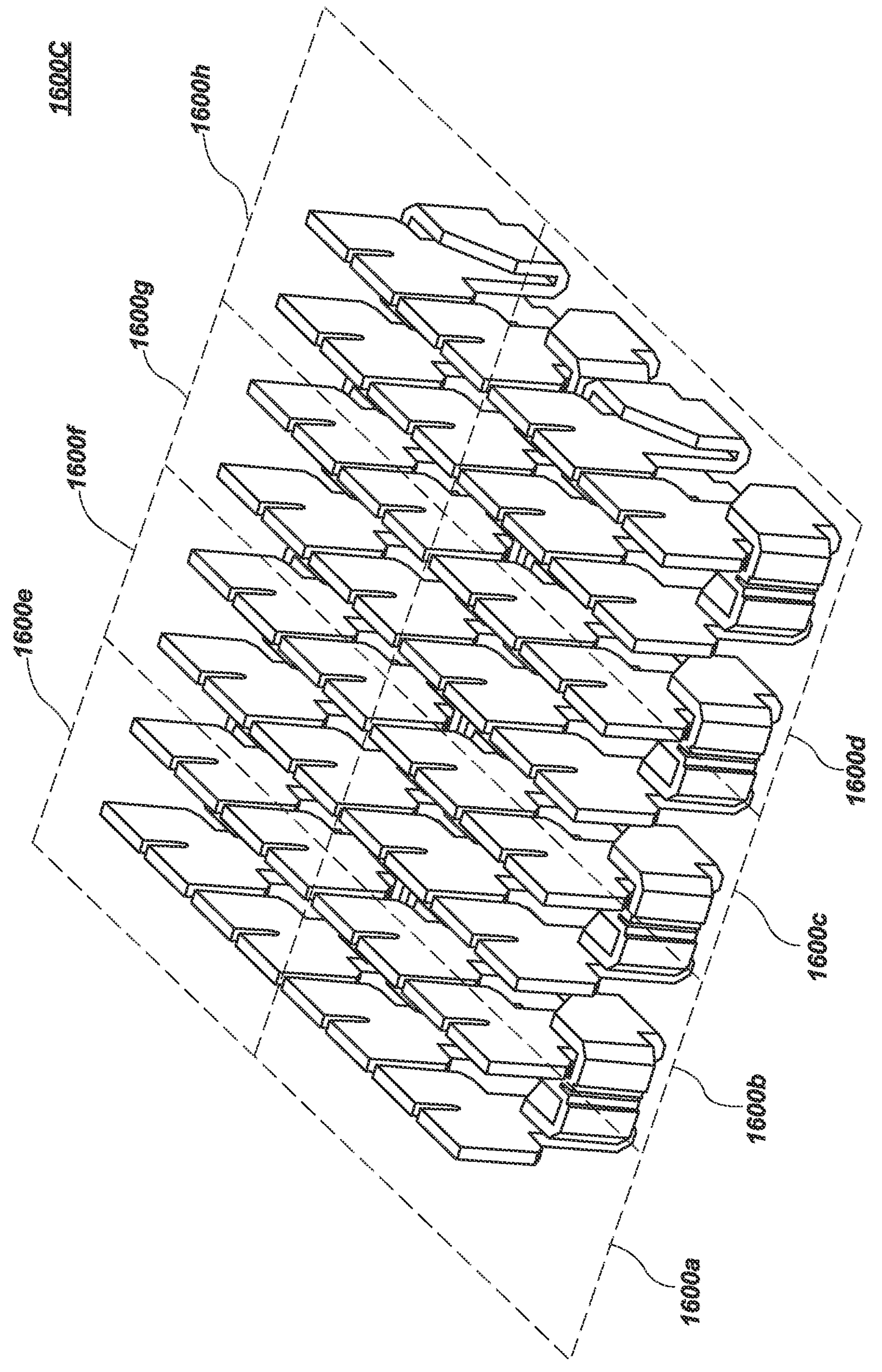
FIG. 16C illustrates a perspective view of an air volume corresponding to another embodiment of a 16 to 1 combiner.

FIG. 16C illustrates a perspective view of an air volume corresponding to another embodiment of four 16 to 1 combiner 1600C. Combiner 1600C in FIG. 16C is constructed by incorporating eight of the 8 to 1 combiners shown in FIG. 16B. For example, combiner 1600C shown in FIG. 16C is simply a scaled up version of the 8 to 1 combiners shown in FIG. 16B and the 4 to 1 combiner shown in FIG. 16A. As shown in FIG. 16C, combiners 1600*a*, 1600*b*, 1600*c*, 1600*d*, 1600*e*, 1600*f*, 1600*g*, and 1600*h* are combined to provide the outputs of the combined E-plane combiner stage from each quadrant feed into a dual-axis monopulse, which will be described below with respect to FIG. 17. However, for purposes of description, combiners 1600*a* and 1600*b* are combined to feed a first quadrant of the waveguide dual-axis monopulse. Likewise, combiners 1600*c* and 1600*d* feed a second quadrant of the waveguide dual-axis monopulse while combiners 1600*e* and 1600*f* feed a third quadrant of the waveguide dual-axis monopulse. Finally, combiners 1600*g* and 1600*h* feed a fourth quadrant of the waveguide dual-axis monopulse. Combiner 1600C, shown in FIG. 16C may be disposed on a bottom layer of an antenna array as will be discussed in more detail below. However, it is to be noted that combiner 1600C may be scaled to any size, such that an array of 128 or 256 or more elements may be simply created by doubling or quadrupling combiner 1600C. Combiner 1600C may provide a combiner feed network, or a corporate feed network, for any polarization of an antenna array, as will be disclosed below.

Figure 17:
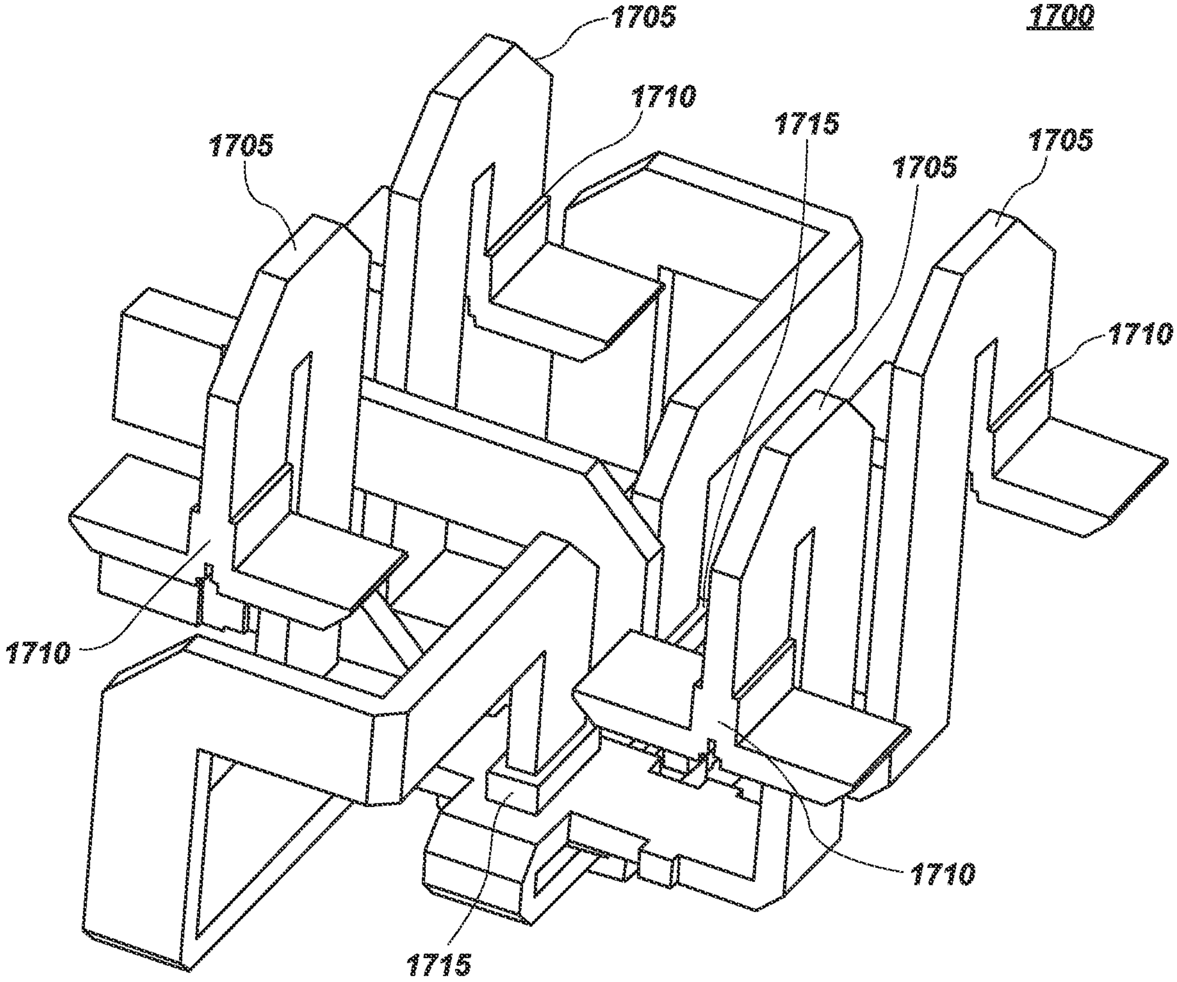
FIG. 17 illustrates a perspective view of another embodiment of an air volume corresponding to a waveguide dual-axis monopulse.

FIG. 17 illustrates a perspective view of another embodiment of an air volume corresponding to a waveguide dual-axis monopulse 1700. Waveguide dual-axis monopulse 1700 is comprised of four single mode rectangular waveguides 1705 which are connected to E-plane combiner stages 1710. The outputs of E-plane combiner stages 1710 are connected to four magic tees 1715 (only two of which are visible in FIG. 17 due to perspective), which generate a sum and three difference signals in a manner such that the combined inputs are one sum channel and three tracking difference (delta) channels. In other words, all four single mode rectangular waveguides 1705 may be added together in phase and three difference (delta) channels (which are pairs of single mode rectangular waveguides 1705 are combined and then subtracted from the remaining pairs). Ports, not shown, may be provided to a plurality of coaxial connectors (or other connectors known in the art) or may be implemented as rectangular waveguide outputs. Simply put, waveguide dual-axis monopulse 1700 may receive electromagnetic waves as an input and may then sum the waves into a single channel and generate difference channels, simultaneously. It is noted again, here, a single-axis monopulse may be substituted for the dual-axis monopulse disclosed herein as well as other monopulses known to ordinarily skilled artisans.

Figure 18A:
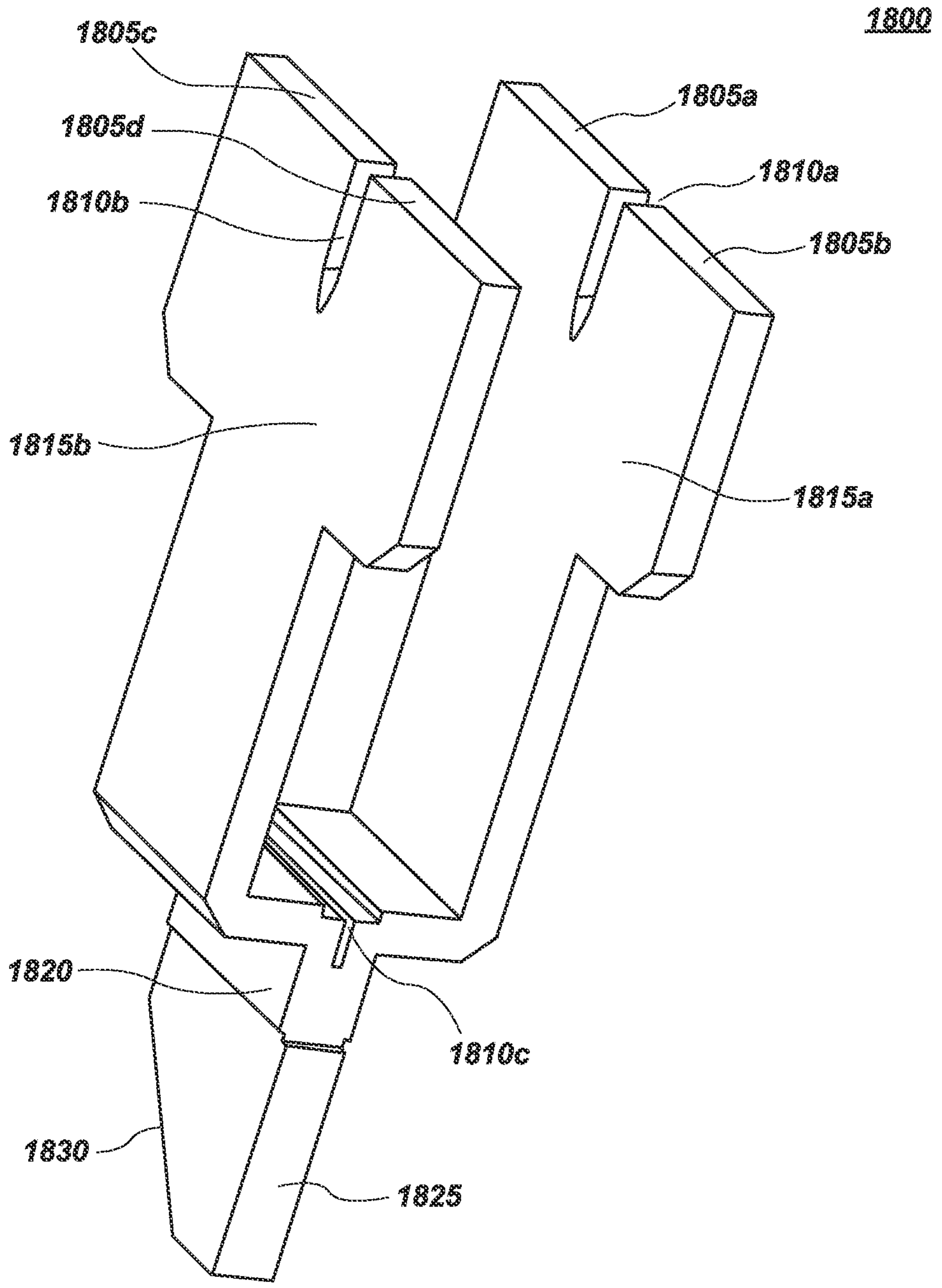
FIG. 18A illustrates a perspective view of an air volume corresponding to another embodiment of a 4 to 1 combiner.

FIG. 18A illustrates a perspective view of an air volume corresponding to another embodiment of a 4 to 1 combiner 1800A. Combiner 1800A may also be referred to as a "quad combiner," a "connector" or a "corporate feed." Combiner 1800A includes four "reduced height" waveguide ports 1805*a*, 1805*b*, 1805*c*, and 1805*d* which are divided by two step septums 1810*a*, and 1810*b*, as shown in FIG. 18A. In the embodiment of combiner 1800A, waveguide ports 1805*a* and 1805*b* are combined in an H-plane "shortwall" combiner stage 1815*a*. Likewise, ports 1805*c* and 1805*d* are combined in an H-plane "shortwall" combiner stage 1815*b*. H-plane "shortwall" combiner stages 1815*a* and 1815*b* combine an electromagnetic wave from rectangular waveguides 1805*a*-1805*d* into two waveguides which are joined at E-plane "broadwall" combiner stage 1820*a* or 1820*b*. E-plane "broadwall" combiner stages 1820*a* and 1820*b* are divided from each other by a septum 1810*c*, which is implemented as a two-step septum. The two-step septums 1810*a*-1810*c* are divided from each other by notches, one being wider than the other as shown in FIG. 18. E-plane "broadwall" combiner stage 1820*a* receives an electromagnetic wave received at waveguide ports 1805*a* and 1805*b* while E-plane "broadwall" combiner stage 1820*b* receives an electromagnetic wave received at waveguide ports 1805*c* and 1805*d*. E-plane "broadwall" combiner stage 1820*a* and 1820*b* flow together into waveguide 1825 and a port 1825 where an electromagnetic wave may be received into or output from combiner 1800A, depending on whether or not a signal is being received or transmitted from an antenna array associated with combiner 1800A.

Thus, combiner 1800A may be implemented with four reduced height waveguide ports 1805*a*-1805*d*, are combined with two H-plane "shortwall" combiner stages 1815*a* and 1815*b* into E-Plane "broadwall" combiner stages 1820*a* and 1820*b* to provide a combined signal at port 1825. Alternatively, if the "flow" is reversed, an electromagnetic signal provided to port 1825 may be split into four equal amplitude signals at waveguide ports 1805*a*-1805*d*. Chamfers may be provided as shown in FIG. 18A.

Figure 18B:
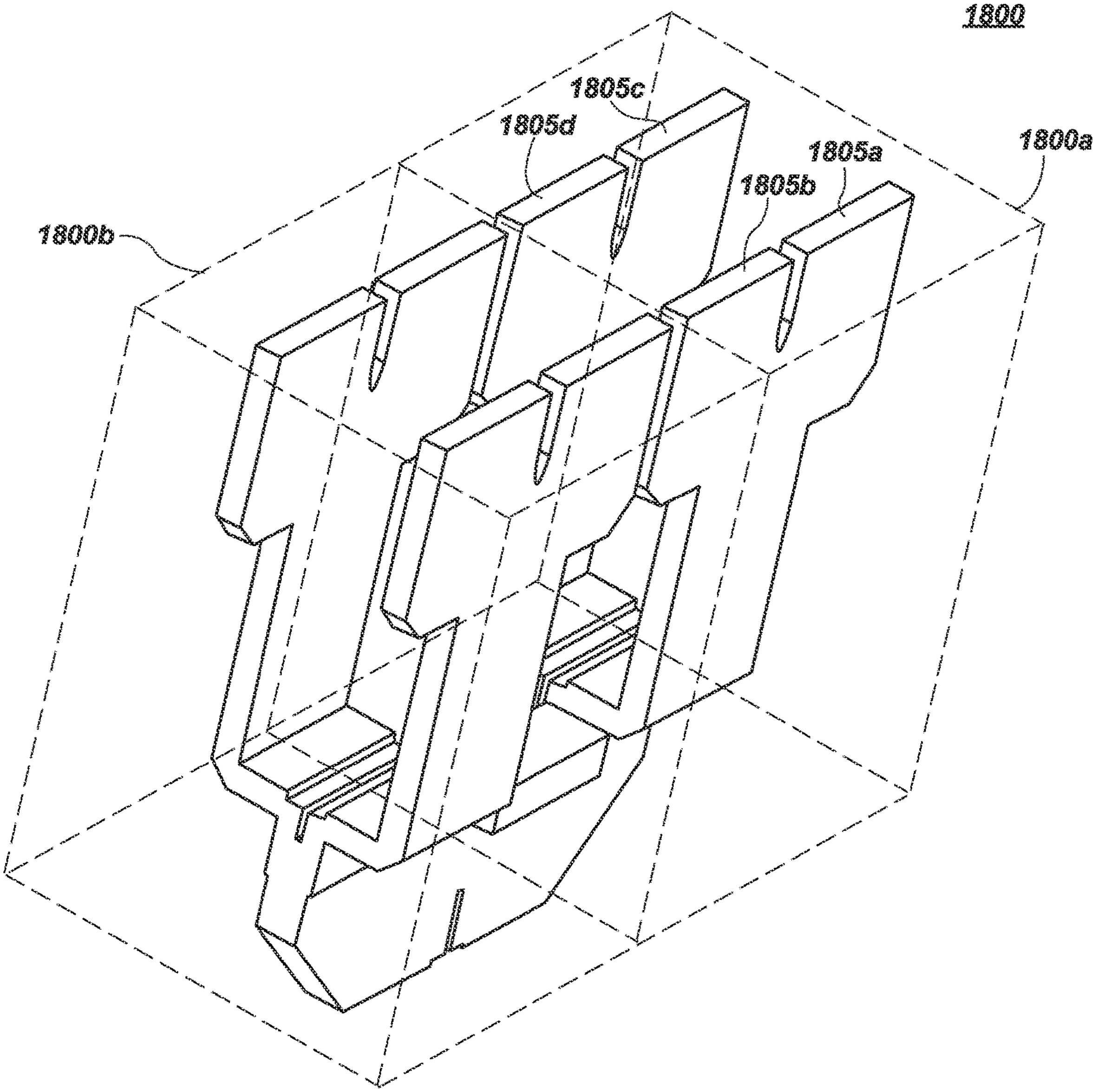
FIG. 18B illustrates a perspective view of an air volume corresponding to another embodiment of an 8 to 1 combiner.

FIG. 18B illustrates a perspective view of an air volume corresponding to another embodiment of an 8 to 1 combiner 1800B that implements two combiners 1800*a* and 1800*b* which are similar to combiner 1800A, shown in FIG. 18A. Each of combiners 1800*a* and 1800*b* include four waveguide ports, representatively illustrated as 1805*a*, 1805*b*, 1805*c*, and 1805*d* with respect to combiner 1800*a*. For example, combiner 1800 provides a combiners 1800*a* and 1800 in a manner consistent with that described with respect to FIG. 18A, above.

Figure 18C:
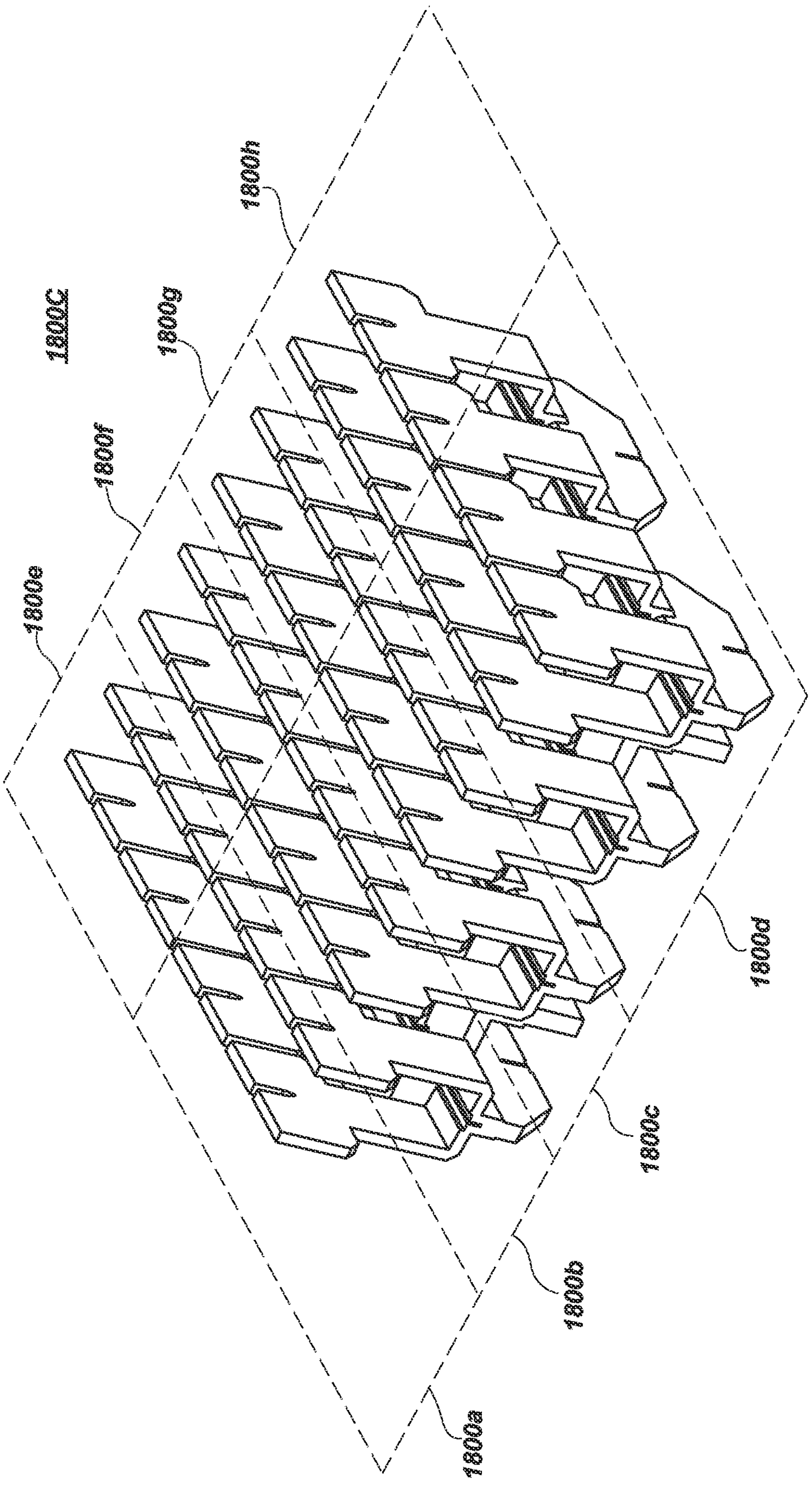
FIG. 18C illustrates a perspective view of an air volume corresponding to another embodiment of a 16 to 1 combiner.

FIG. 18C illustrates a perspective view of an air volume corresponding to another embodiment of four 16 to 1 combiners 1800C. Combiner 1800C in FIG. 18C is constructed by incorporating eight of the 8 to 1 combiners shown in FIG. 18B. For example, combiner 1800C shown in FIG. 18C is simply a scaled up version of the 8 to 1 combiners shown in FIG. 18B and the 4 to 1 combiner shown in FIG. 18A. As shown in FIG. 18C, combiners 1800*a*, 1800*b*, 1800*c*, 1800*d*, 1800*e*, 1800*f*, 1800*g*, and 1800*h* are combined to provide the outputs of the combined E-plane combiner stage from each quadrant feed into a dual-axis monopulse, which will be described below with respect to FIG. 19. Combiner 1800C, shown in FIG. 18C may be disposed on an upper layer of an antenna array as will be discussed in more detail below. However, it is to be noted that combiner 1800C may be scaled to any size, such that an array of 128 or 256 or more elements may be simply created by doubling or quadrupling combiner 1800C. Combiner 1800C may provide a combiner feed network, or a corporate feed network, for an LHCP polarization of an antenna array, as will be disclosed below.

Figure 19:
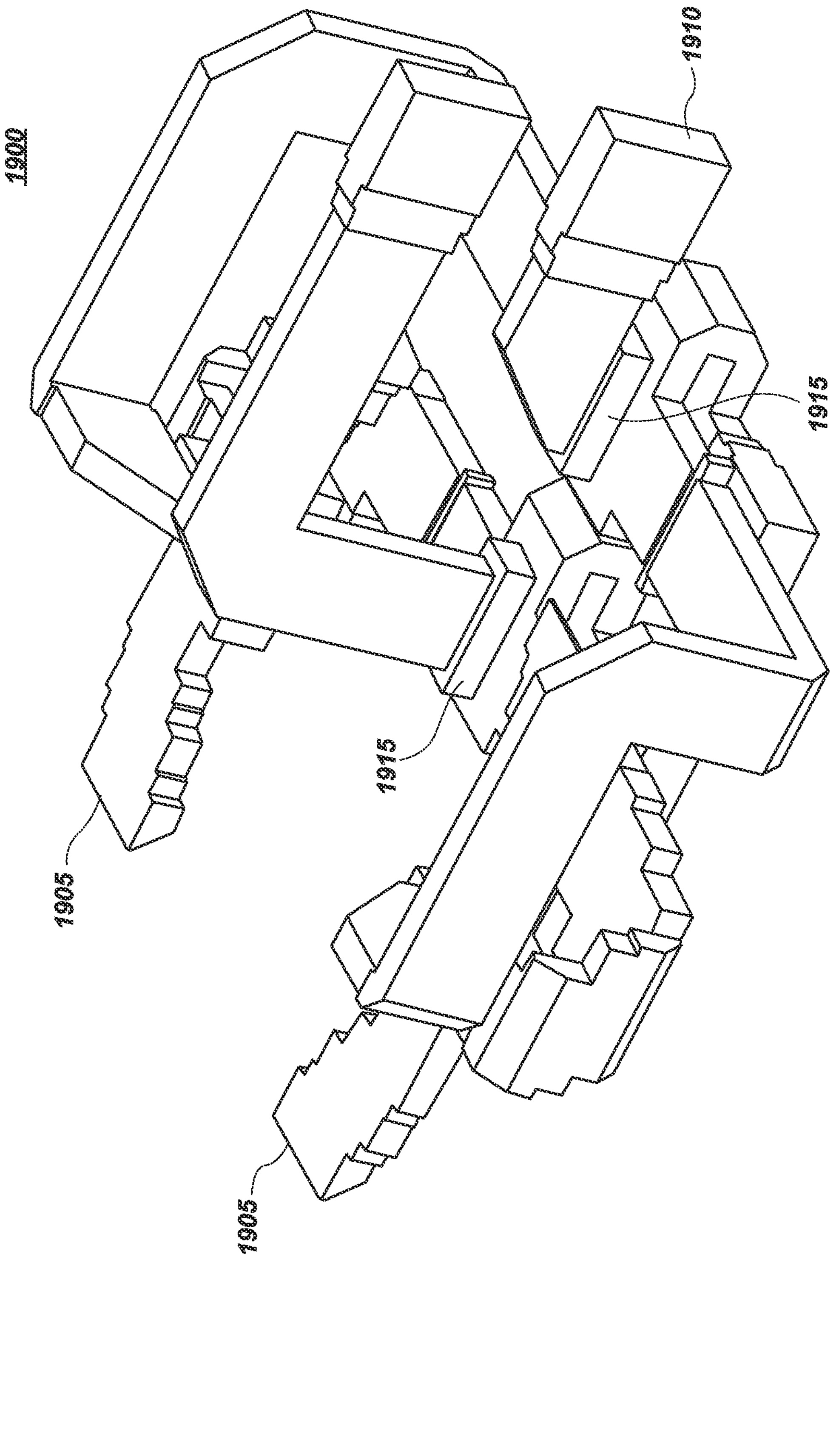
FIG. 19 illustrates a perspective view of another embodiment of an air volume corresponding to a waveguide dual-axis monopulse.

FIG. 19 illustrates a perspective view of another embodiment of an air volume corresponding to a waveguide dual-axis monopulse 1900. Waveguide dual-axis monopulse 1900 is comprised of four single mode rectangular waveguides 1905 (only two of which are shown). Single mode rectangular waveguides 1905 are connected to four magic tees 1915 (only two of which are visible in FIG. 19 due to perspective), which form a sum and three difference signals in a manner such that the combined inputs are one sum channel and three difference (delta) channels. In other words, all four single mode rectangular waveguides 1905 may be added together in phase to form the sum channel and pairs can be added together out of phase to form the three difference (delta) channels (which are pairs of single mode rectangular waveguides 1905 are combined and then subtracted from the remaining pairs). Ports 1910 may be provided to a plurality of coaxial connectors (or other connectors known in the art) or may be implemented as rectangular waveguide outputs. Simply put, waveguide dual-axis monopulse 1900 may receive electromagnetic waves as an input and may then sum the waves into a single channel.

Figure 20A:
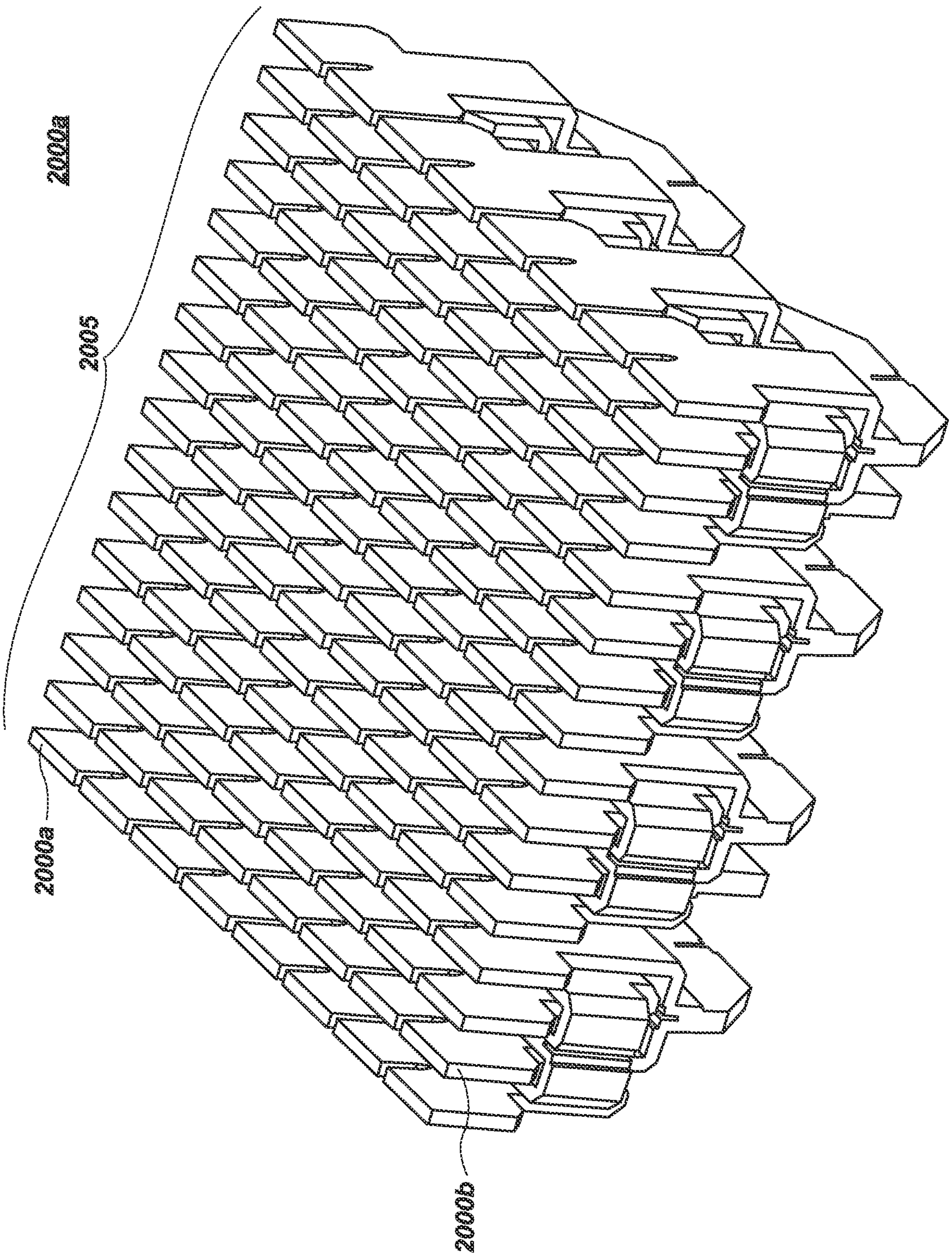
FIG. 20A illustrates a perspective view of an air volume corresponding to four LHCP 16 to 1 combiners with four RHCP 16 to 1 combiners.

FIG. 20A illustrates a perspective view of an air volume corresponding to four LHCP 16 to 1 combiners 2000*b* with four RHCP 16 to 1 combiners 2000*a* to create a combiner network or a corporate feed network 2000A with a plurality of waveguide ports 2005 that may be implemented with radiating elements, not shown in FIG. 20A. Combiner network 2000*a* may be created by printing four 16 to 1 RHCP combiners 2000*a* (discussed with respect to FIG. 19C) within four 16 to 1 LHCP combiners 2000*b* (discussed with respect to FIG. 17C), or vice versa.

Figure 20B:
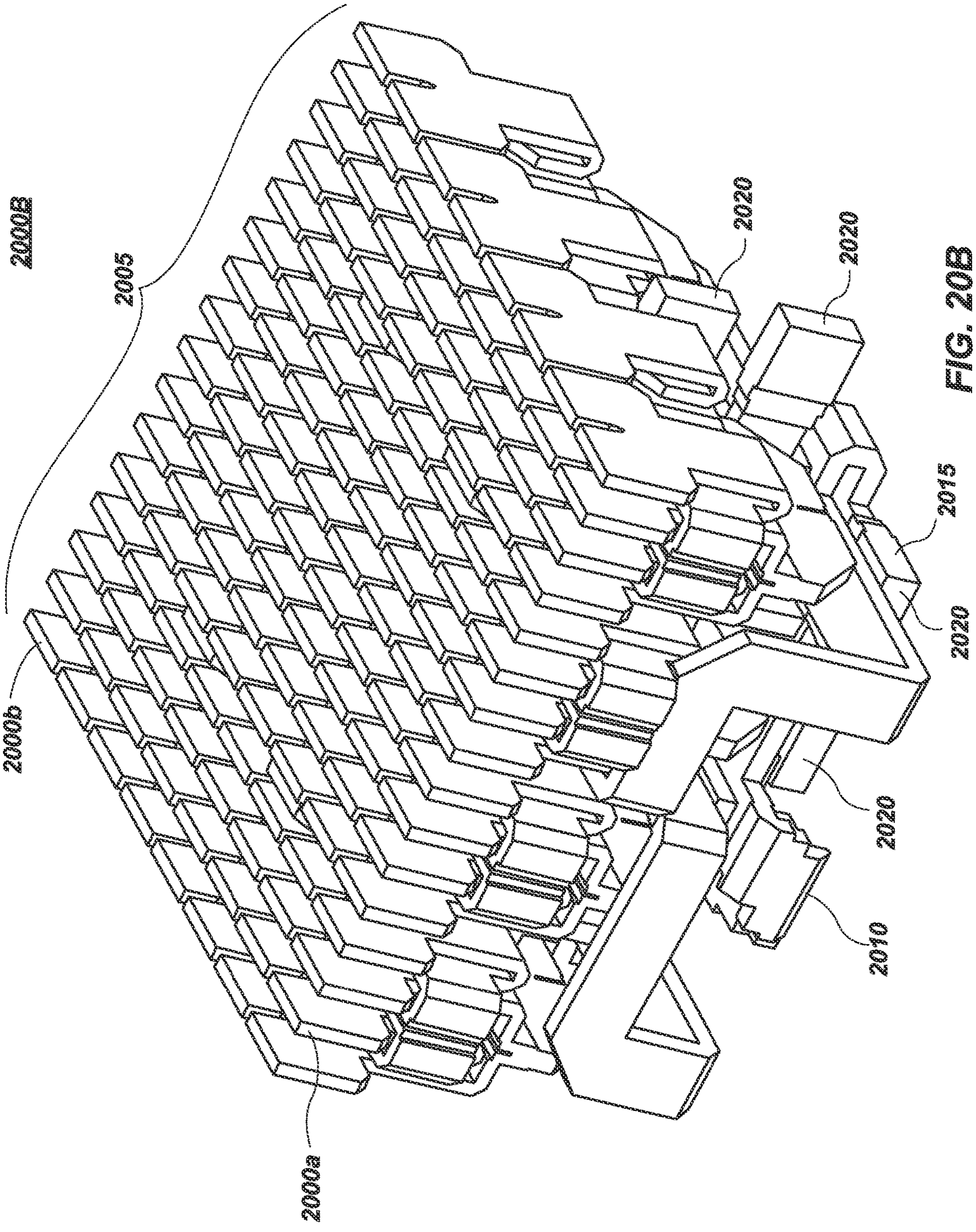
FIG. 20B illustrates a perspective view of an air volume corresponding to a four LHCP 16 to 1 combiners and corresponding integral waveguide dual-axis monopulse with four RHCP 16 to 1 combiners and corresponding integral waveguide dual-axis monopulse.

FIG. 20B illustrates a perspective view of an air volume corresponding to a four LHCP 16 to 1 combiners 2000*b* and corresponding integral waveguide dual-axis monopulse 2010 with four RHCP 16 to 1 combiners 2000*a* and corresponding integral waveguide dual-axis monopulse 2015. As shown in FIG. 20B, waveguide dual-axis monopulse 2015 provides four output ports 2020. Waveguide dual-axis monopulse 2010 also provides four output ports, which are not shown in FIG. 20B, due to perspective. However, waveguide ports 2005 arranged in this fashion, which are implemented as 64 LHCP waveguide ports and 64 RHCP waveguide ports, may be each reduced from 64 waveguides down to 4 waveguides by the use of four 16 to 1 combiners for each of the 64 LHCP waveguide ports and the 64 RHCP waveguide ports.

It should be noted that combiner network 2000A and waveguide dual-axis monopulses 2010 and 2015 may be printed as a single piece element within an antenna array. Combiner network 2000*a* and dual axis monopulses 2010 and 2015 are not discrete pieces that may be installed one within the other. Rather, they are printed as a single element, indivisible from the others within an antenna array to produce a minimal three dimensional volume, reduce weight, and overall size for an antenna array.

Figure 21A:
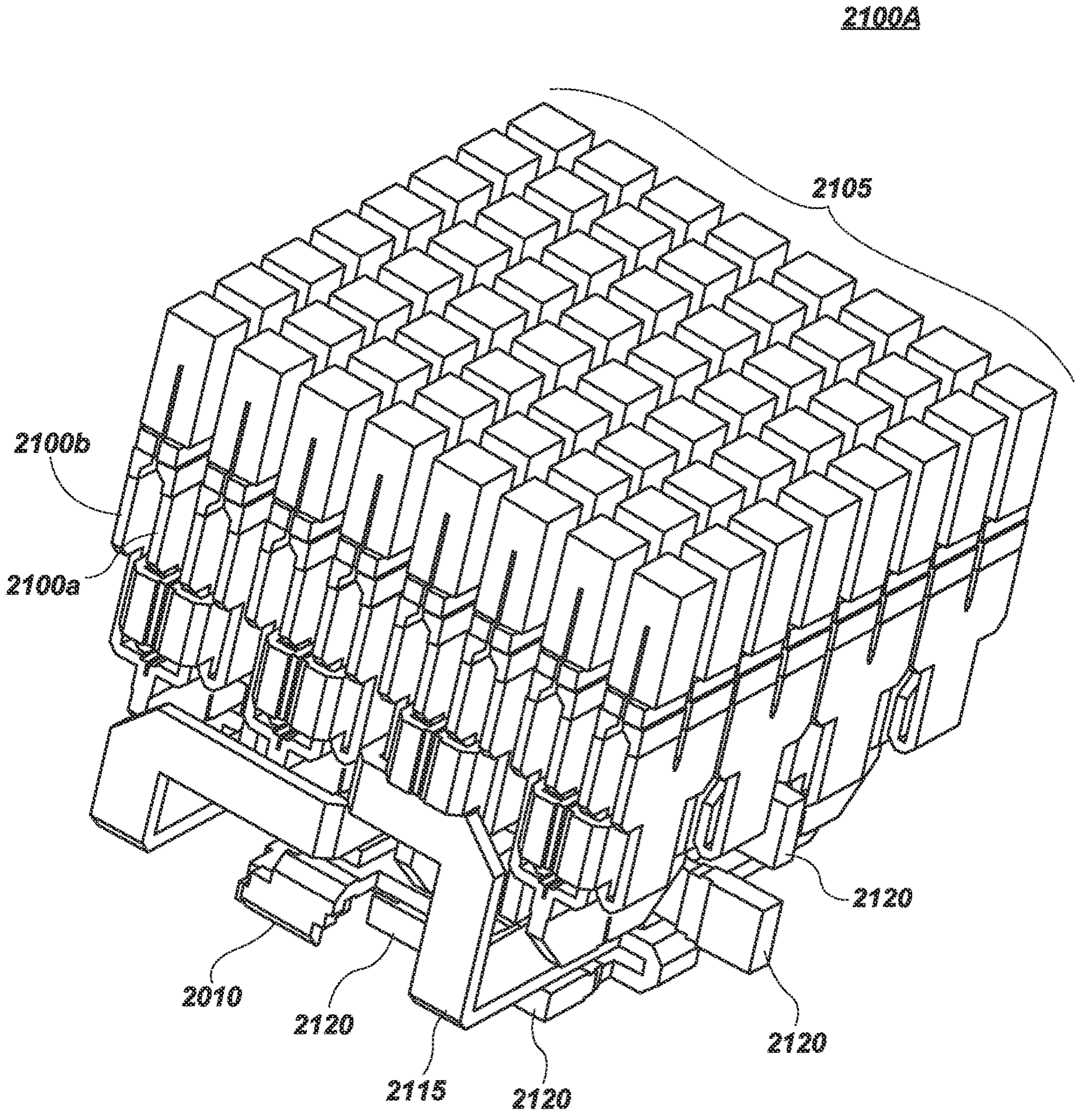
FIG. 21A illustrates a perspective view of an air volume corresponding to a four LHCP 16 to 1 combiners and corresponding integral waveguide dual-axis monopulse with four RHCP 16 to 1 combiners and corresponding integral waveguide dual-axis monopulse with an array of radiating elements.

FIG. 21A illustrates a perspective view of an air volume corresponding to a four LHCP 16 to 1 combiners 2100*b* and corresponding integral waveguide dual-axis monopulse 2110 with four RHCP 16 to 1 combiners 2100*a* and corresponding integral waveguide dual-axis monopulse 2115 with an array of radiating elements 2105 as an integrated antenna array 2100A. FIG. 21A illustrates the inclusion of radiating elements 2105 on combiner network 2000A, shown in FIG. 20A and FIG. 20B which are each reduced into four outputs 2120 associated with waveguide dual-axis monopulse 2115 and four outputs (not shown) associated with waveguide dual-axis monopulse 2110.

Figure 21B:
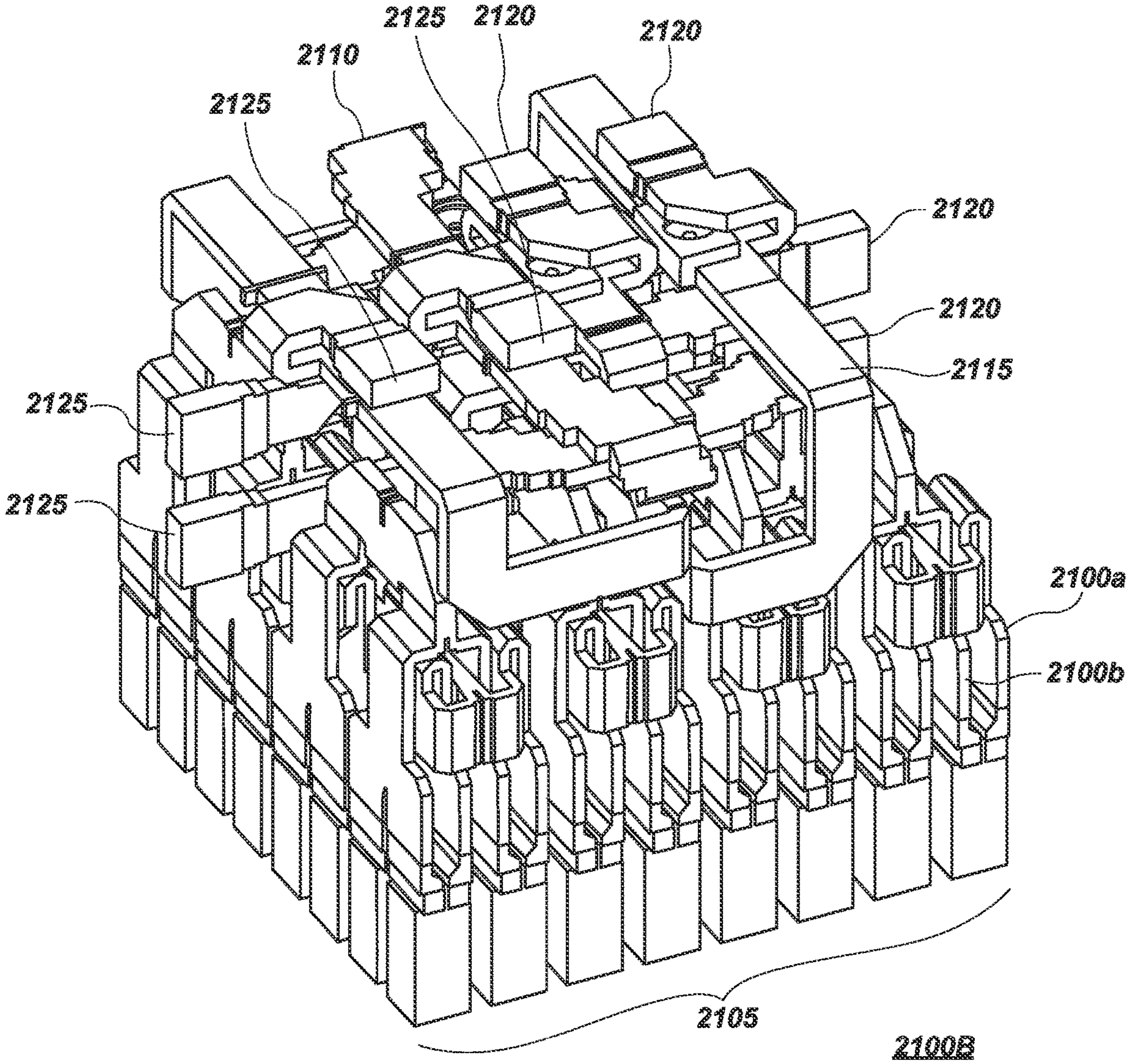
FIG. 21B illustrates a bottom perspective view of an air volume corresponding to a four LHCP 16 to 1 combiners and corresponding integral waveguide dual-axis monopulse with four RHCP 16 to 1 combiners and corresponding integral waveguide dual-axis monopulse with an array of radiating elements.

FIG. 21B illustrates a bottom perspective view of an air volume corresponding to a four LHCP 16 to 1 combiners 2100*b* and corresponding integral waveguide dual-axis monopulse 2110 with four RHCP 16 to 1 combiners 2100*a* and corresponding integral waveguide dual-axis monopulse 2115 with an array of radiating elements 2105 as an integrated antenna array 2100A. FIG. 21A illustrates the inclusion of radiating elements 2105 on combiner network 2100A, shown in FIG. 20A and FIG. 20B which are each reduced into four outputs 2120 associated with waveguide dual-axis monopulse 2115 and four outputs 2125 associated with waveguide dual-axis monopulse 2110.

It should be noted that combiner network 2100A and waveguide dual-axis monopulses 2010 and 2015 may be printed as a single piece element within an antenna array. Combiner network 2000*a* and dual axis monopulses 2010 and 2015 are not discrete pieces that may be installed one within the other. Rather, they are printed as a single element, indivisible from the others within an antenna array to produce a minimal three dimensional volume, reduce weight, and overall size for an antenna array.

Figure 22A:
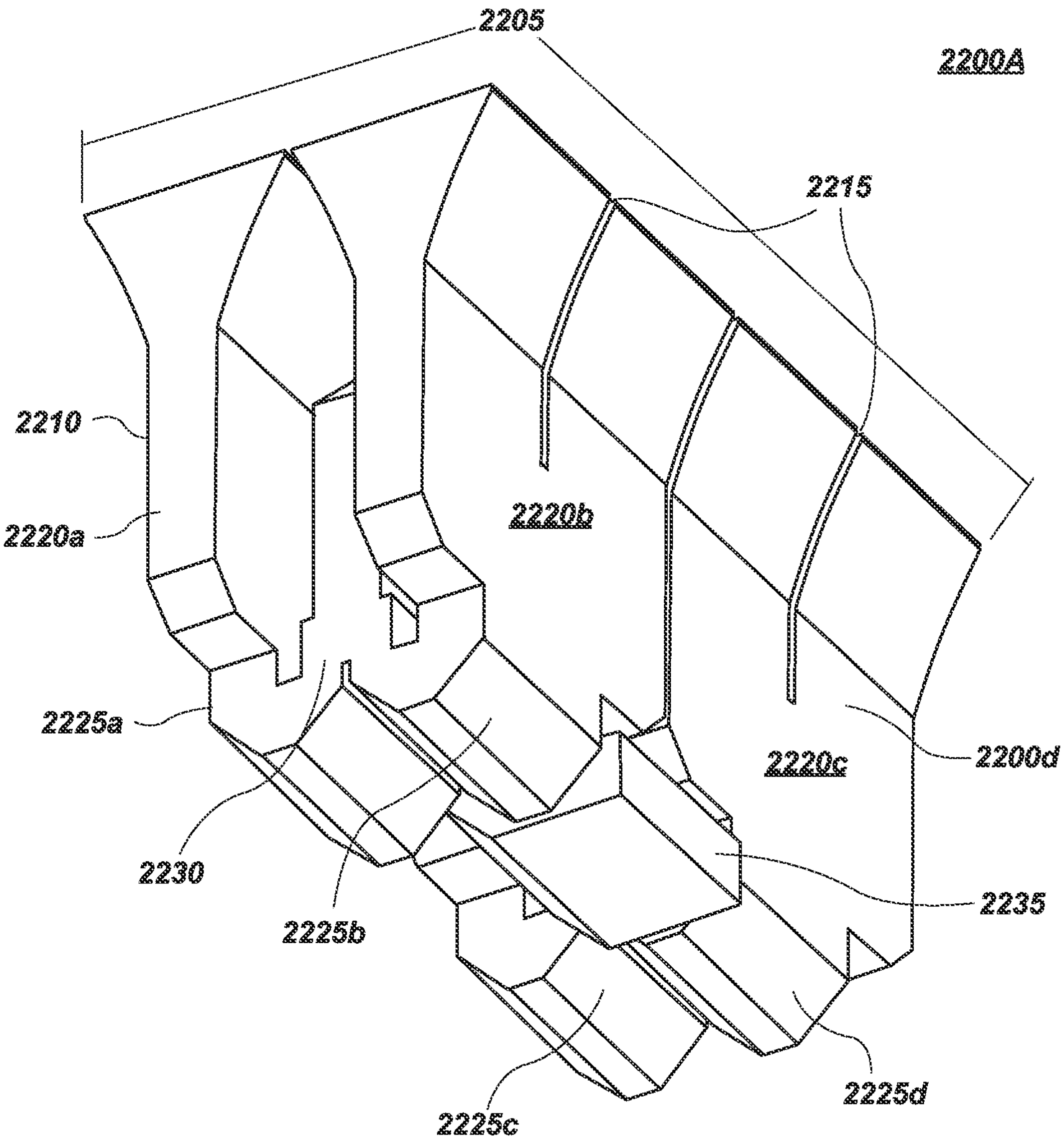
FIG. 22A illustrates a perspective view of an air volume corresponding to an 8 to 1 combiner.

FIG. 22A illustrates a perspective view of an air volume corresponding to an 8 to 1 combiner 2200A. As shown in FIG. 22A, corporate combiner 2200A includes a plurality of radiation elements 2205 which include corresponding horns. Radiation elements 2205 may be linearly polarized as shown in FIG. 22A. Radiation elements 2205 are each connected to an H-plane "shortwall" combiner, such as combiner 2200*a*, 2220*b*, 2220*c* and a combiner 2200*d* (not shown) due to perspective, by a single mode rectangular waveguide 2210, in a manner similar to other H-plane "shortwall" combiners disclosed herein. H-plane combiners 2220*a*-2200*d* may further include septums 2215, as previously disclosed. H-plane combiners 2220*a*-2220*d* are connected by U-bends 2225*a*, 2225*b*, 2225*c*, and 2225*d* to an E-plane "broadwall" combiner stage 2230. For example, U-bends 2225*a* and 2225*b* allow propagation of electromagnetic waves from H-plane "shortwall" combiners 2220*a* and 2220*b* into E-plane "broadwall" combiner stage 2230. Similarly, U-bends 2225*c* and 2225*d* allow propagation of electromagnetic waves from H-plane "shortwall" combiners 2220*c* and 2220*d* into E-plane "broadwall" combiner stage 2230. E-plane "broadwall" combiner stage connects to a port 2235 which allows a combined electromagnetic wave to be received into or propagated out from combiner 2200A.

Figure 22B:
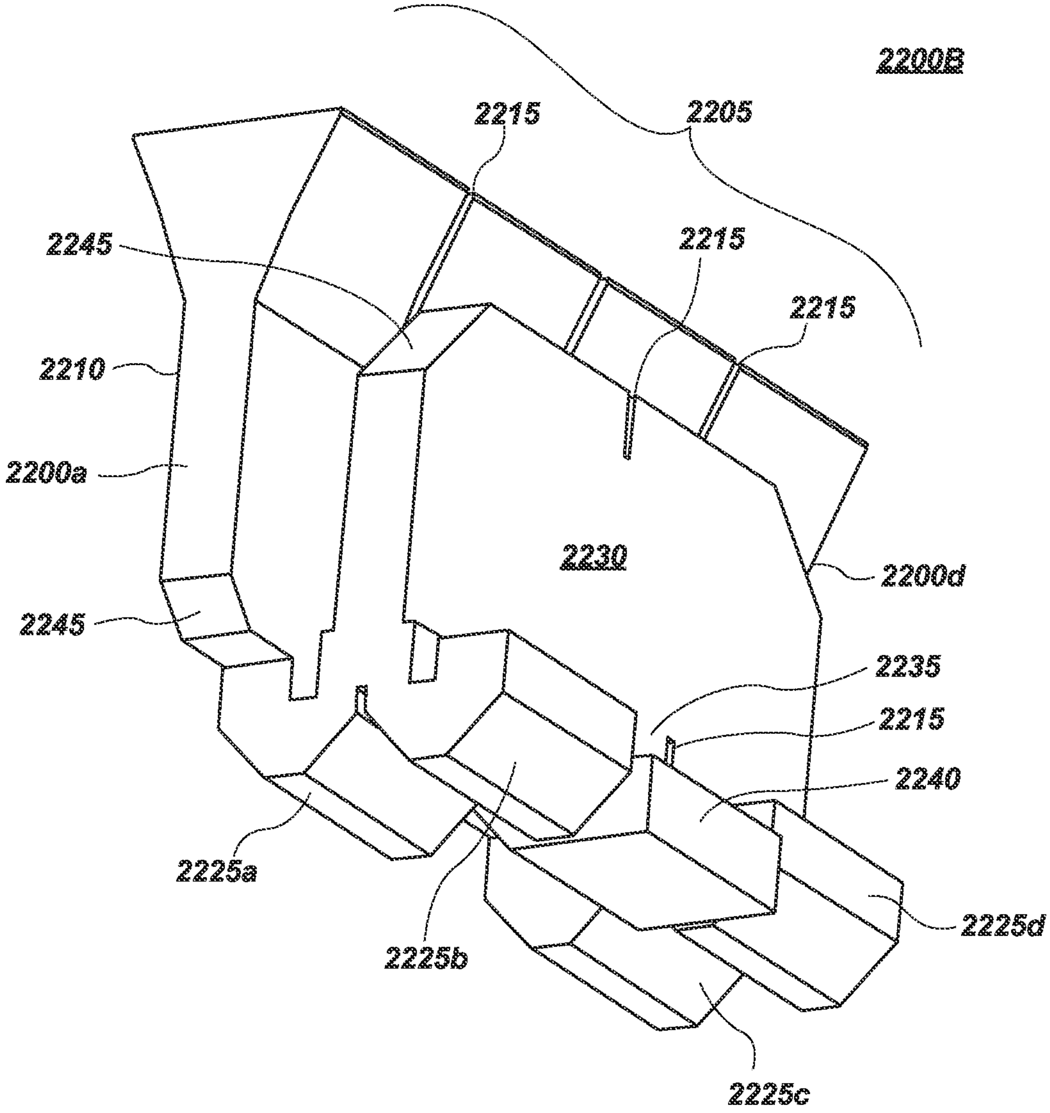
FIG. 22B illustrates a perspective cross-sectional view of an air volume of the 8 to 1 combiner shown in FIG. 22A.

FIG. 22B illustrates a perspective cross-sectional view of an air volume of the 8 to 1 corporate combiner 2200B, which is similar in implementation and description to combiner 2200A, shown in FIG. 22A. As shown in FIG. 22B, combiner 2200B provides a cross sectional view which removes some of radiation elements 2205 and combiners 2200*b* and 2200*c*, for illustration purposes only, to show E-plane combiner stage 2230 in more detail. E-plane combiner stage 2230 provides the electromagnetic wave to an H-plane combiner 2235 which transitions the electromagnetic wave into port 2240 Otherwise, corporate combiner 2200B includes single mode rectangular waveguide 2210, H-plane "shortwall combiners 2200*a* and 2200*d*, a plurality of septums 2215, a plurality of U-bends 2225*a*-2225*d*, E-plane "broadwall" combiner 2230, H-plane "shortwall" combiner 2235, port 2240, and a plurality of chamfers 2245 for impedance matching.

Figure 23A:
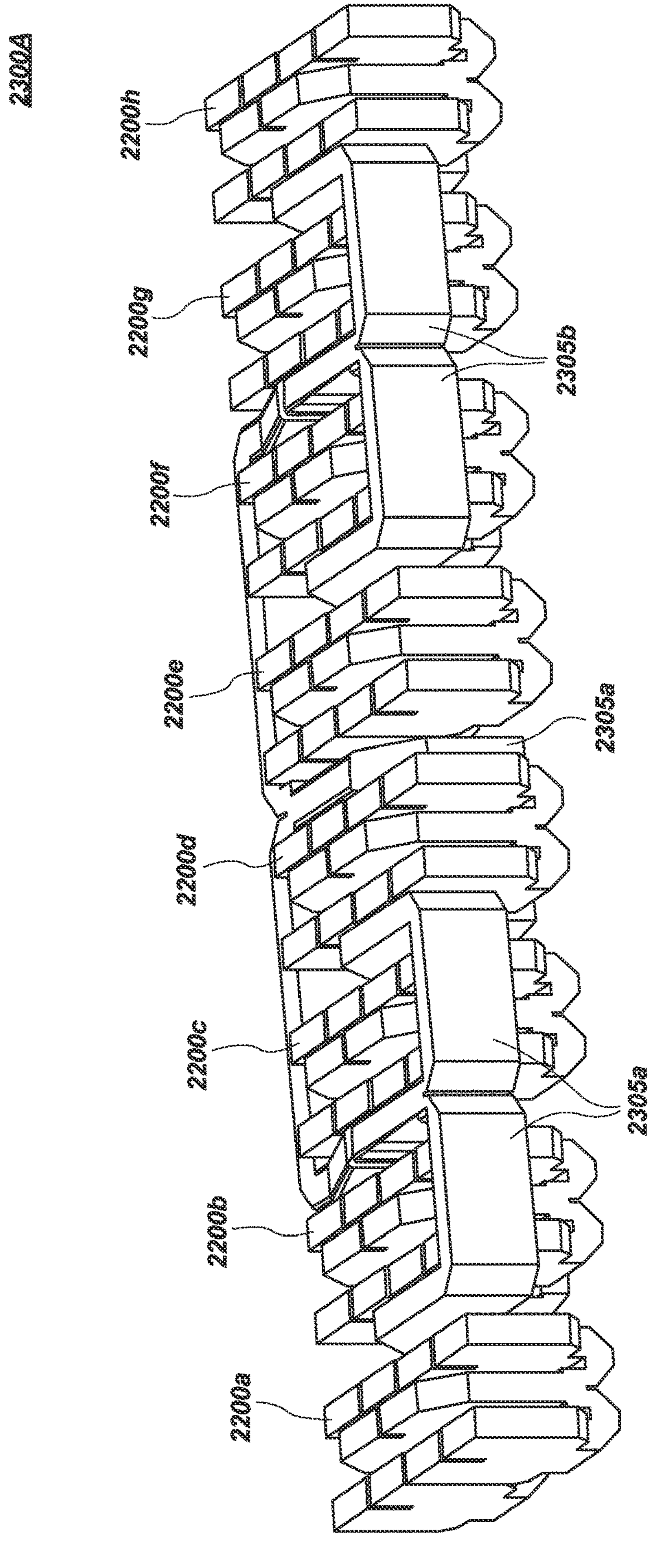
FIG. 23A illustrates a perspective view of an air volume of a linearly polarized antenna array.

FIG. 23A illustrates a perspective view of an air volume of a linearly polarized antenna array 2300A. Linearly polarized antenna array 2300A includes a plurality of corporate combiners 2200A, shown and discussed above with respect to FIG. 22A. As shown in FIG. 23A, linearly polarized antenna array 2300A includes eight combiners, including corporate combiners 2200*a*, 2200*b*, 2200*c*, 2200*d*, 2200*e*, 2200*f*, 2200*g*, and 2200*h*, although the number of combiners illustrated is merely for the purposes of explanation. The number of combiners may be organized to include any number that is a power of 2 according to a specific application (e.g., 2, 4, 8, 16, 32, 64, etc.). Corporate combiners 2200*a*-2200*h*, shown in FIG. 2300A are shown without radiation elements and corresponding horns for purposes of illustration only.

Corporate combiners 2200*a*-2220*h* may combine an electromagnetic wave, as previously discussed with respect to FIG. 22A. As shown in FIG. 23A, each of the combined electromagnetic waves provided by corporate combiners 2200*a*-2200*h* may be further combined by an a second 8 to 1 combiner 2305. Combiner 2305 may connect to corporate combiners 2200*a*-2200*h* via waveguides illustrated as 2305*a* and 2305*b*, as shown in FIG. 23A such that combiner 2305 receives or transmits an electromagnetic wave that is either combined from a plurality of 8 to 1 combiners as inputs into a single 8 to 1 combiner to produce a single output or split from a single input by a single 8 to 1 combiner, the outputs of which are further split into a plurality of 8 to 1 combiners.

Figure 23B:
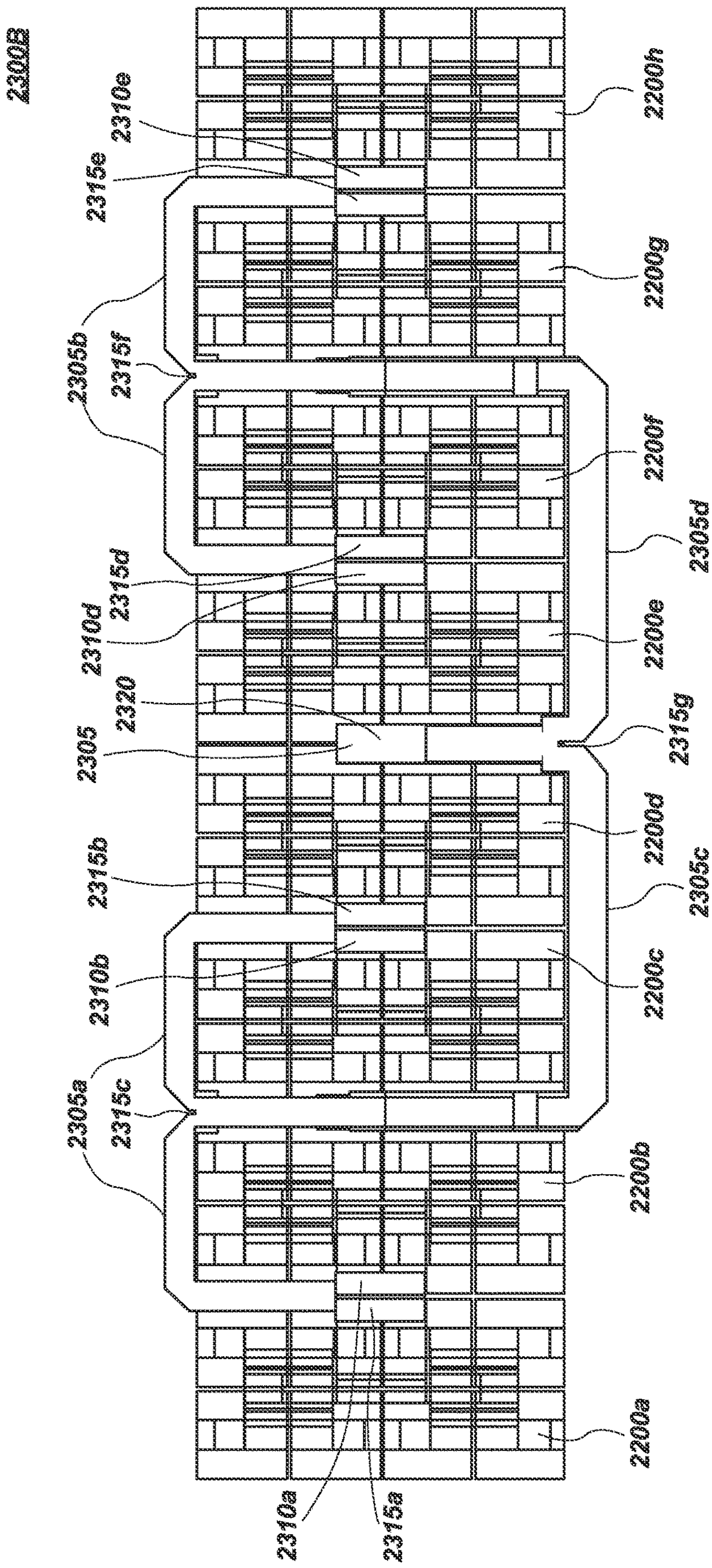
FIG. 23B illustrates a bottom view of an air volume of the linearly polarized antenna array shown in FIG. 23A.

FIG. 23B illustrates a bottom view of an air volume of the linearly polarized antenna array shown in FIG. 23A. FIG. 23B illustrates a linearly polarized antenna array 2300B which includes corporate combiners 2200*a*-2200*h*, as discussed above with respect to FIG. 22A and FIG. 23A (again without radiation elements and corresponding horns for purposes of description). FIG. 23B further illustrates 8 to 1 combiner 2305, shown in FIG. 23B with accompanying waveguides illustrated as 2305*a* and 2305*b*. Combiner 2305 includes a first E-plane "broadwall" combiner 2310*a* which combines an electromagnetic signal received by corporate combiners 2200*a* and 2200*b*. Combiner 2305 includes a second E-plane "broadwall" combiner 2310*b* which combines an electromagnetic signal received by corporate combiners 2200*c* and 2200*d*. Combiner 2305 includes a third E-plane "broadwall" combiner 2310*c* which combines an electromagnetic signal received by corporate combiners 2200*e* and 2200*f*. Combiner 2305 includes a fourth E-plane "broadwall" combiner 2310*d* which combines an electromagnetic signal received by corporate combiners 2200*g* and 2200*h*.

Combiner 2310*a* includes a signal port 2315*a* to receive the combined electromagnetic wave from combiner 2200*a* and combiner 2200*b*. Similarly, combiner 2310*b* includes a signal port 2315*b* to receive the combined electromagnetic wave from corporate combiner 2200*c* and combiner 2200*d*. Combiner 2310*c* includes a signal port 2315*c* to receive the combined electromagnetic wave from corporate combiner 2200*e* and combiner 2200*f*. Finally, combiner 2310*d* includes a signal port 2315*d* to receive the combined electromagnetic wave from corporate combiners 2200*g* and 2200*h*. Combiners 2310*a* and 2310*b* are combined by an E-plane "broadwall" combiner 2315*e* while combiners 2310*c* and 2310*d* are combined by an E-plane "broadwall" combiner 2315*f*. Combiners 2315*e* and 2315*f* are again combined by an E-plane "broadwall" combiner 2315*g* to a waveguide port 2320.

In this manner, an 8 to 1 combiner, such as combiner 2305 may be interleaved between a plurality of 8 to 1 corporate combiners 2200*a*-2220*h* to combine 64 electromagnetic signals into a single electromagnetic wave at waveguide port 2320. Or, alternatively, a single electromagnetic wave input at waveguide port 2320 may be split into eight electromagnetic waves which are split into eight more electromagnetic waves to produce an electromagnetic wave at 64 radiation elements. Finally, it should be noted that, as described herein, the "flow" of an electromagnetic wave from radiation element to port or from port to radiation element may be understood to be interchangeable based on whether a particular antenna array is receiving or transmitting an electromagnetic wave. The "combiners" disclosed herein may also be "splitters" depending on whether or not an electromagnetic wave is being transmitted or received by an antenna array.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. An antenna array comprising:

a plurality of radiating elements;

a plurality of septum polarizers, wherein at least one of the plurality of radiating elements is in electromagnetic communication with one of the plurality of septum polarizers;

a first waveguide combiner network comprising:

a first H-plane combiner; and a first E-plane combiner in electromagnetic communication with the first H-plane combiner; and a mounting interface for mounting the antenna array, wherein the mounting interface comprises one or more of a mounting hole or a connector;

wherein the plurality of radiating elements, the plurality of septum polarizers, the first waveguide combiner network, and the mounting interface are manufactured together as a single metal element by a three-dimensional printing process such that manufacturing the single metal element does not require a separate joining process for joining separate components.

2. The antenna array of claim 1, wherein the first waveguide combiner network further comprises a first port for a first polarization; and wherein the antenna array further comprises a second waveguide combiner network comprising:

a second H-plane combiner;

a second E-plane combiner in electromagnetic communication with the second H-plane combiner; and a second port for a second polarization.

3. The antenna array of claim 1, wherein the first waveguide combiner network further comprises a first port for a first polarization;

wherein the antenna array further comprises a second waveguide combiner network comprising a second port for a second polarization; and wherein the first combiner network and the second combiner network are manufactured together as a single metal element by a three-dimensional printing process such that manufacturing the single metal element does not require a separate joining process for joining separate components.

4. The antenna array of claim 1, wherein the first E-plane combiner is directly connected to the first H-plane combiner by a U-bend.

5. The antenna array of claim 1, wherein the first H-plane combiner of the first waveguide combiner network receives electromagnetic energy from at least a portion of the plurality of radiating elements or transmits electromagnetic energy to at least a portion of the plurality of radiating elements.

6. The antenna array of claim 1, wherein the first waveguide combiner network further comprises a second H-plane combiner directly connected to the first E-plane combiner.

7. The antenna array of claim 1, further comprising a second waveguide combiner network, and wherein each of the first waveguide combiner network and the second combiner network is in electromagnetic communication with the plurality of radiating elements.

8. The antenna array of claim 7, wherein the plurality of radiating elements, the plurality of septum polarizers, the first waveguide combiner network, the second waveguide combiner network, and the mounting interface are manufactured together as the single metal element by the three-dimensional printing process such that manufacturing the single metal element does not require the separate joining process for joining separate components.

9. The antenna array of claim 1, wherein the first waveguide combiner network comprises a 16-to-1 combiner, and wherein the 16-to-1 combiner is manufactured as a component of the single metal element by the three-dimensional printing process such that manufacturing the single metal element does not require a separate joining process for joining separate components.

10. The antenna array of claim 1, wherein the first waveguide combiner network comprises a plurality of 2-to-1 combiners for an arbitrary sized antenna array;

wherein the plurality of radiating elements is divisible by 2; and wherein the plurality of 2-to-1 combiners is manufactured as a component of the single metal element by the three-dimensional printing process such that manufacturing the single metal element does not require a separate joining process for joining separate components.

11. The antenna array of claim 1, wherein at least a portion of the plurality of septum polarizers convert a TE10 waveguide mode into a substantially equal amplitude and substantially 90-degree phase-shifted TE10 and TE01 modes.

12. The antenna array of claim 1, wherein at least one of the plurality of radiating elements comprises a rectangular or square cross-sectional geometry; and wherein the at least one of the plurality of radiating elements is bisected across the rectangular or the square cross-sectional geometry by one septum polarizer of the plurality of septum polarizers.

13. The antenna array of claim 1, wherein the mounting interface is configured for mounting the antenna array to an electronic box comprising a circuit card assembly.

14. The antenna array of claim 1, wherein the connector comprises one or more of a coaxial connector or a subminiature push-on (SMP) connector.

15. The antenna array of claim 1, further comprising a plurality of heat fins, wherein the plurality of radiating elements, the plurality of septum polarizers, the first waveguide combiner network, the mounting interface, and the plurality of heat fins are manufactured together as the single metal element by the three-dimensional printing process such that manufacturing the single metal element does not require the separate joining process for joining separate components.

* * * * *